United States Patent
Maeda et al.

(10) Patent No.: US 10,193,672 B2
(45) Date of Patent: *Jan. 29, 2019

(54) MOBILE COMMUNICATION SYSTEM

(71) Applicant: Mitsubishi Electric Corporation, Tokyo (JP)

(72) Inventors: Miho Maeda, Tokyo (JP); Mitsuru Mochizuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 637 days.

This patent is subject to a terminal disclaimer.

(21) Appl. No.: 14/539,400

(22) Filed: Nov. 12, 2014

(65) Prior Publication Data

US 2015/0071152 A1    Mar. 12, 2015

Related U.S. Application Data

(63) Continuation of application No. 13/640,334, filed as application No. PCT/JP2011/002406 on Apr. 25, 2011, now Pat. No. 8,917,644.

(30) Foreign Application Priority Data

Apr. 28, 2010   (JP) .................................. 2010-103487
Oct. 1, 2010    (JP) .................................. 2010-223903

(51) Int. Cl.
*H04L 5/00*      (2006.01)
*H04W 52/02*     (2009.01)
*H04W 72/04*     (2009.01)

(52) U.S. Cl.
CPC ............ *H04L 5/0048* (2013.01); *H04L 5/005* (2013.01); *H04W 52/028* (2013.01);
(Continued)

(58) Field of Classification Search
None
See application file for complete search history.

(56) References Cited

U.S. PATENT DOCUMENTS 8,811,252 B2   8/2014  Maeda et al.
8,861,420 B2   10/2014 Dahlman et al.
(Continued)

FOREIGN PATENT DOCUMENTS

CN    1823541 A    8/2006
CN    1835636 A    9/2006
(Continued)

OTHER PUBLICATIONS

Korean Office Action dated Jan. 10, 2017 in Patent Application No. 10-2012-7026350 (with Partial English Translation.
(Continued)

*Primary Examiner* — Jutai Kao
(74) *Attorney, Agent, or Firm* — Oblon, McClelland, Maier & Neustadt, L.L.P.

(57) ABSTRACT

A mobile communication system includes a plurality of eNBs that perform radio communication with an UE and an MCE that controls the eNBs. The MCE indicates an MBSFN subframe (MCE) serving as radio resources that transmit a reference signal for power measurement to the UE less frequently than normal to the eNB, the eNB, in addition to the MBSFN subframe (MCE) indicated by the MCE, designates the MBSFN subframe (eNB) serving as the radio resources that transmit a reference signal to the UE less frequently than normal, and in the MBSFN subframe (MCE) and the MBSFN subframe (eNB) the reference signal is transmitted to the UE. In this manner, the reference signal for measuring a power can be transmitted less frequently than normal, and a power consumption of the infrastructure can be reduced.

10 Claims, 22 Drawing Sheets

(52) U.S. Cl.
CPC ..... *H04W 72/0406* (2013.01); *Y02D 70/1224* (2018.01); *Y02D 70/1226* (2018.01); *Y02D 70/1242* (2018.01); *Y02D 70/1244* (2018.01); *Y02D 70/1246* (2018.01); *Y02D 70/1262* (2018.01); *Y02D 70/1264* (2018.01); *Y02D 70/24* (2018.01); *Y02D 70/25* (2018.01)

(56) References Cited

U.S. PATENT DOCUMENTS

| | | | |
|---|---|---|---|
| 8,917,644 B2* | 12/2014 | Maeda | H04L 5/0048 370/311 |
| 8,971,241 B2 | 3/2015 | Palanki et al. | |
| 9,294,219 B2 | 3/2016 | Palanki et al. | |
| 9,306,993 B2 | 4/2016 | Maeda et al. | |
| 2006/0210079 A1 | 9/2006 | Kato | |
| 2006/0234718 A1 | 10/2006 | Barrett et al. | |
| 2008/0232308 A1* | 9/2008 | Dehner | H04W 52/0225 370/329 |
| 2009/0181677 A1* | 7/2009 | Tanigawa | H04W 88/08 455/436 |
| 2009/0252077 A1 | 10/2009 | Khandekar et al. | |
| 2009/0296645 A1 | 12/2009 | Bui | |
| 2010/0034135 A1 | 2/2010 | Kim et al. | |
| 2010/0061344 A1 | 3/2010 | Goransson et al. | |
| 2010/0080139 A1 | 4/2010 | Palanki et al. | |
| 2010/0080166 A1 | 4/2010 | Palanki et al. | |
| 2010/0272004 A1 | 10/2010 | Maeda et al. | |
| 2011/0128903 A1 | 6/2011 | Futaki et al. | |
| 2011/0170471 A1 | 7/2011 | Dahlman et al. | |
| 2012/0088515 A1 | 4/2012 | Choi et al. | |
| 2012/0238273 A1* | 9/2012 | Lim | H04W 16/04 455/436 |
| 2014/0362756 A1 | 12/2014 | Maeda et al. | |
| 2015/0055545 A1 | 2/2015 | Palanki et al. | |
| 2015/0124685 A1 | 5/2015 | Dahlman et al. | |

FOREIGN PATENT DOCUMENTS

| | | |
|---|---|---|
| CN | 101262691 A | 9/2008 |
| CN | 101500195 A | 8/2009 |
| JP | 2012-504912 A | 2/2012 |
| WO | WO 2008/127185 A1 | 10/2008 |
| WO | WO 2009/078152 A1 | 6/2009 |
| WO | WO 2010/001928 A1 | 1/2010 |
| WO | WO 2010/006285 A2 | 1/2010 |
| WO | WO 2010/033065 A1 | 3/2010 |

OTHER PUBLICATIONS

Combined Office Action and Search Report dated Dec. 18, 2014 in Chinese Patent Application No. 201180021251.2 (with partial English translation and English translation of category of cited documents).
Extended European Search Report dated Apr. 22, 2016 in Patent Application No. 11774611.5.
International Search Report dated Jul. 19, 2011 in corresponding International Application No. PCT/JP2011/002406 filed Apr. 25, 2011.
Written Opinion dated Jul. 19, 2011 in corresponding International Application No. PCT/JP2011/002406 filed Apr. 25, 2011 (with an English Translation).
International Preliminary Report on Patentability dated Dec. 10, 2012 in corresponding International Application No. PCT/JP2011/002406 filed on Apr. 25, 2011 (with an English Translation).
Ericsson, ST-Ericsson, "Extended cell DTX for enhanced energy-efficient network operation", 3GPP TSG-RAN WG1 #59, R1-095011, Nov. 9-13, 2009, 198 Pages.
3rd Generation Partnership Project; Technical Specification Group Radio Access Network; Evolved Universal Terrestrial Radio Access (E-UTRA) Radio Resource Control (RRC); Protocol specification (Release 9), 3GPP TS 36.331, V9.1.0 (Dec. 2009), © 2009 3GPP Organizational Partners, 232 Pages.
"3rd Generation Partnership Project; Technical Specification Group Radio Access Network; Evolved Universal Terrestrial Radio Access (E-UTRA); User Equipment (UE) procedures in idle mode (Release 9)", 3GPP TS 36.304, V9.1.0 (Dec. 2009), © 2009 3GPP Organizational Partners, 31 Pages.
"LS on HNB/HeNB Open Access Mode", 3GPP TSG-SA1 #42, 3GPP SA WG1, S1-083461, Oct. 13-17, 2008, 2 Pages.
"LS on CSG cell identification", 3GPP TSG-RAN WG 2 meeting #62, RAN2, R2-082899, May 5-9, 2008, pp. 1-2.
3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814, V9.0.0 (Mar. 2010), © 2010 3GPP Organizational Partners, 105 Pages.
3rd Generation Partnership Project; Technical Specification Group Radio Access Network; Feasibility study for Further Advancement for E-UTRA (LTE-Advanced)(Release 9), 3GPP TR 36.912 V9.0.0 (Sep. 2009), © 2009 3GPP Organizational Partners, 256 Pages.
3rd Generation Partnership Project; Technical Specification Group Radio Access Network; Evolved Universal Terrestrial Access Network (E-UTRAN); M2 Application Protocol (M2AP)(Release 9), 3GPP TS 36.443, V9.0.0 (Dec. 2009), © 2009 3GPP Organizational Partners, 72 Pages.
Huawei, "Opportunities for Energy Savings in LTE Networks", 3GPP TSG RAN WG1 Meeting #59 bis, R1-100275, Jan. 18-22, 2010, 4 Pages.
"Consideration on Possible Solutions for Network Energy Saving", 3GPP TSG RAN WG1 Meeting #60, R1-101620, Feb. 22-26, 2010, 7 Pages.
Samsung, "Consideration on Extended Cell DTX", 3GPP TSG RAN WG1 #59, R1-100144, Jan. 22, 2010, 5 Pages.
Huawei, "Energy saving techniques for LTE", 3GPP TSG RAN WG2 #69, R2-101213, Feb. 26, 2010, 6 Pages.
3rd Generation Partnership Project; Technical Specification Group Radio Access Network; Evolved Universal Terrestrial Radio Access (E-UTRA) and Evolved universal Terrestrial Radio Access Network (E-UTRAN); Overall description; Stage 2 (Release 9), 3GPP TS 36.300, V9.2.0, © 2009 3GPP Organizational Partners, Dec. 2009, pp. 1-176.
Office Action dated Sep. 6, 2016 in Japanese Patent Application No. 2015-129959 (with Partial English translation).
Huawei, "LTE non-CA based HetNet support", (online), 3GPP TSG RAN WG1 meeting #60bis, R1-101982, Internet, http://www.3gpp.org/ftp/tsg_ran/WG1_RL1/TSGR1_60b/Docs/R1-101982.zip, Apr. 12-16, 2010, pp. 2-8.
ZTE, "Improvement on MBSFN subframe signalling," (online), 3GPP TSG-RAN WG2#63, R2-083974, Internet, http://www.3gpp.org/ftp/tsg_ran/WG2_RL2/TSGR2_63/Docs/R2-083974.zip, Aug. 18, 2008, pp. 1-4.
NEC Group, "Cross-carrier CFI Signalling," (online), 3GPP TSG-RAN WG1#60bis, R1-102258, Internet, http://www.3gpp.org/ftp/tsg_ran/WG1_RL1/TSGR1_60b/Docs/R1-102258.zip, Apr. 12-16, 2010, 5 pages.
Office Action dated Jan. 30, 2018 in Chinese Patent Application No. 201610020653.5, with English-language Translation, 23 pages.
Office Action dated Jan. 24, 2018 in Korean Patent Application No. 10-2017-7029979, with English-language Translation, 7 pages. (The reference cited therein was previously filed.).
Australian Office Action dated Jun. 16, 2017 in Australian Patent Application No. 2016203212, 5 pages.
Australian Office Action dated Jun. 1, 2018 in Australian Patent Application No. 2016203212, 4 pages.
Peng, R.-H., "LTE PHY Layer Overview", University of Utah, Jan. 27, 2009, retrieved from the internet: <URL: http://www.ece.utah.edu/~peng/LTE%20PHY%20layer%20overview2.pdf>, pp. 1-14.
Office Action dated Aug. 20, 2018 in Chinese Patent Application No., 201610020653.5, with partial English-language translation, 21 pages.

(56) References Cited

OTHER PUBLICATIONS

Office Action dated Jan. 16, 2018 in Japanese Patent Application No. 2016-252743, 4 pages (with English-language Translation).

\* cited by examiner

F I G. 3
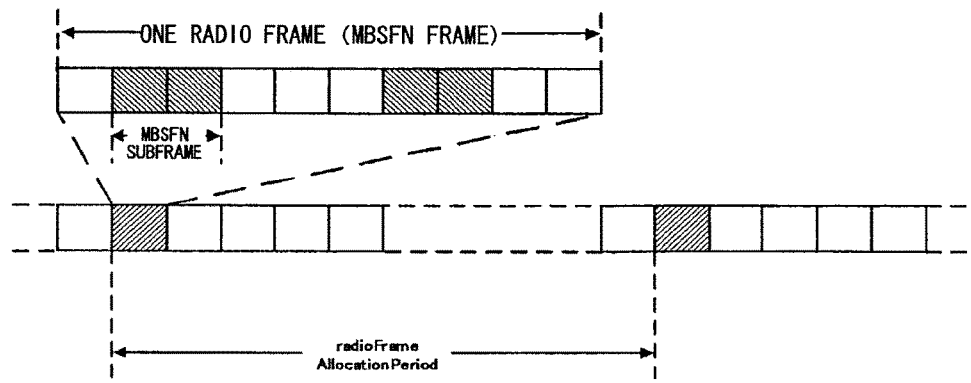
F I G. 4
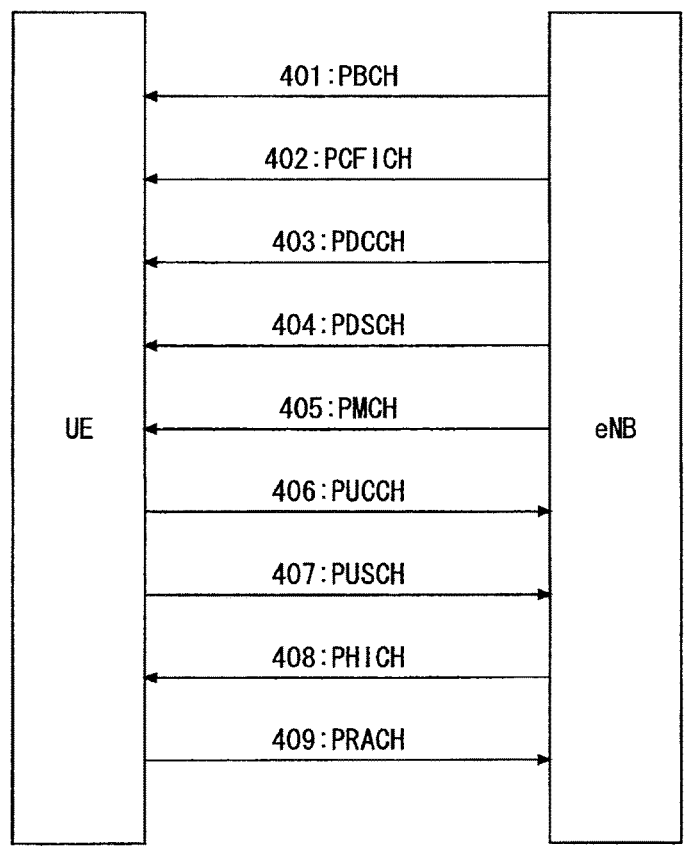

F I G . 5
[A]
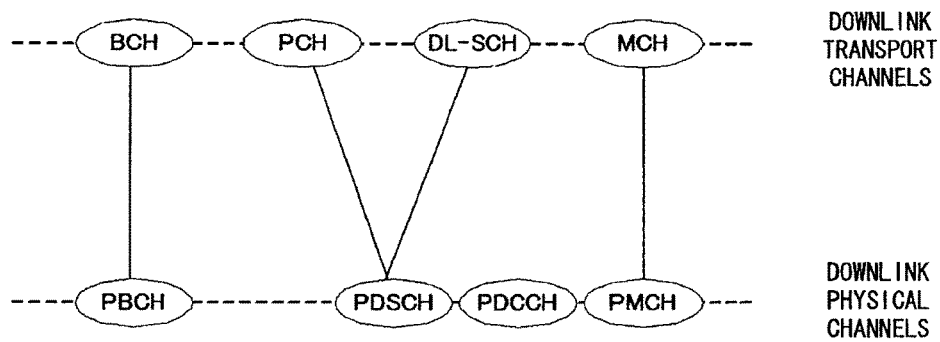
[B]
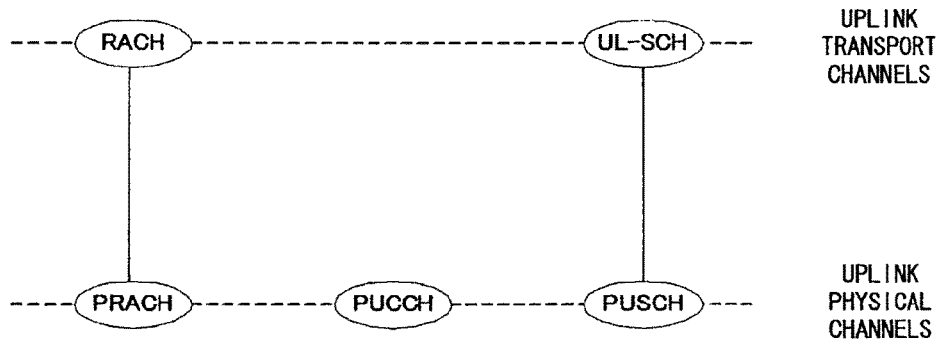

F I G . 6
[A]
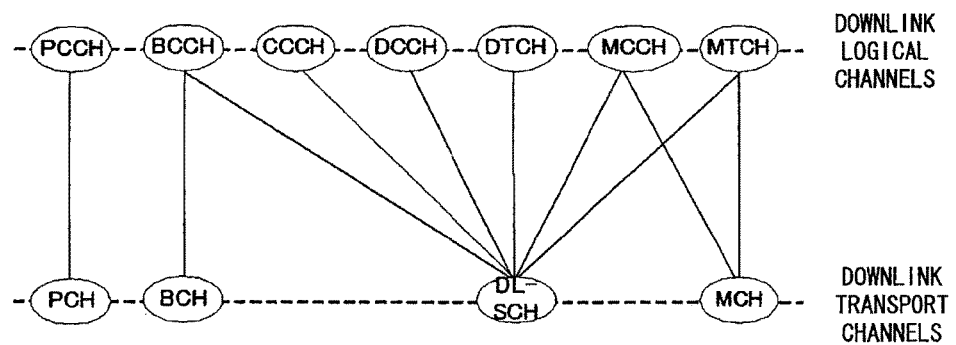
[B]
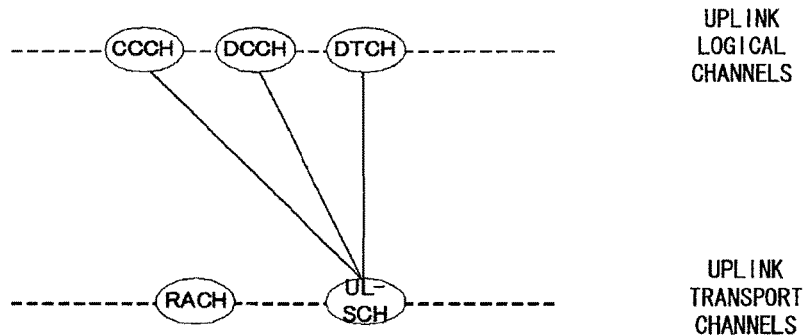

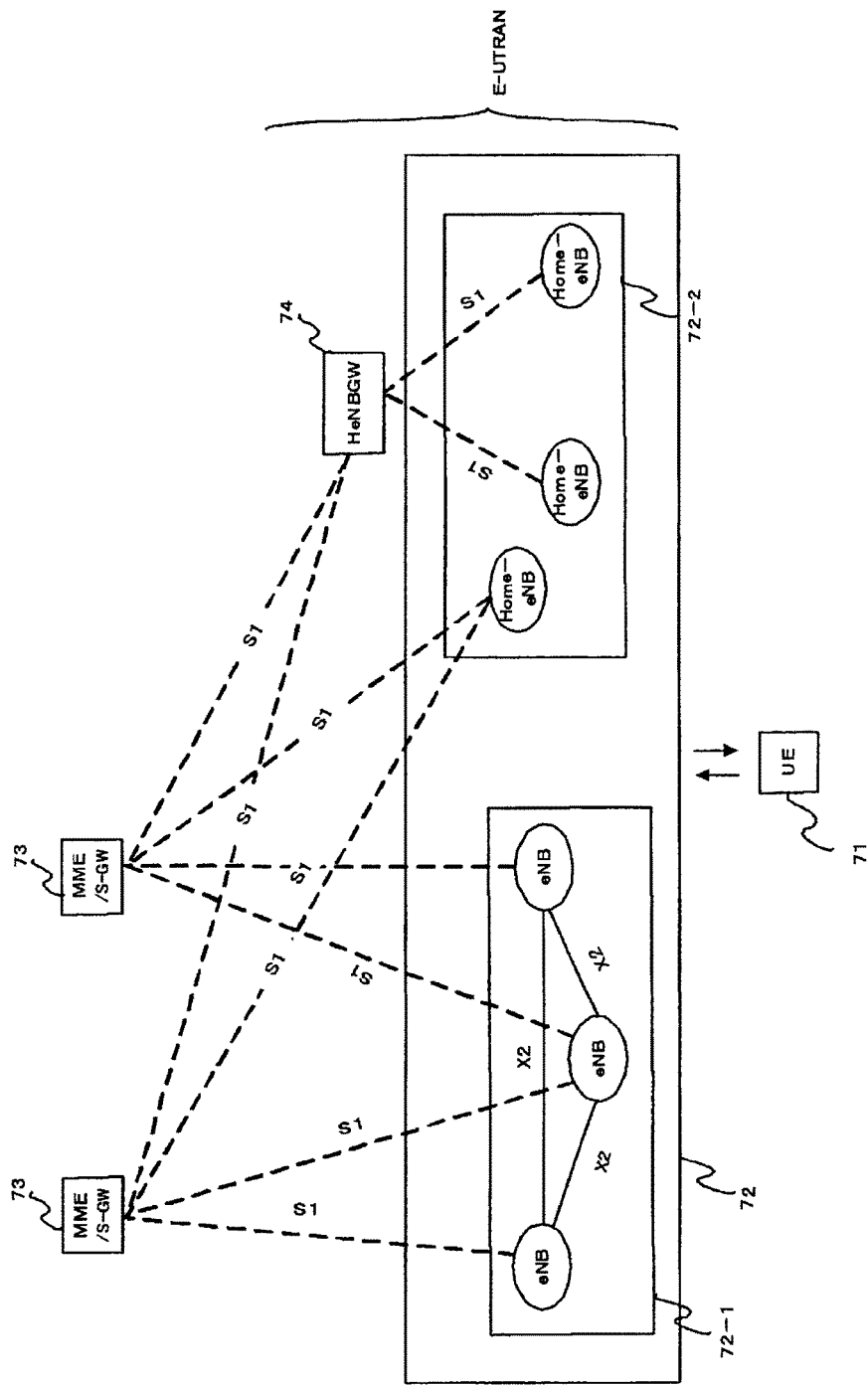
F I G. 7

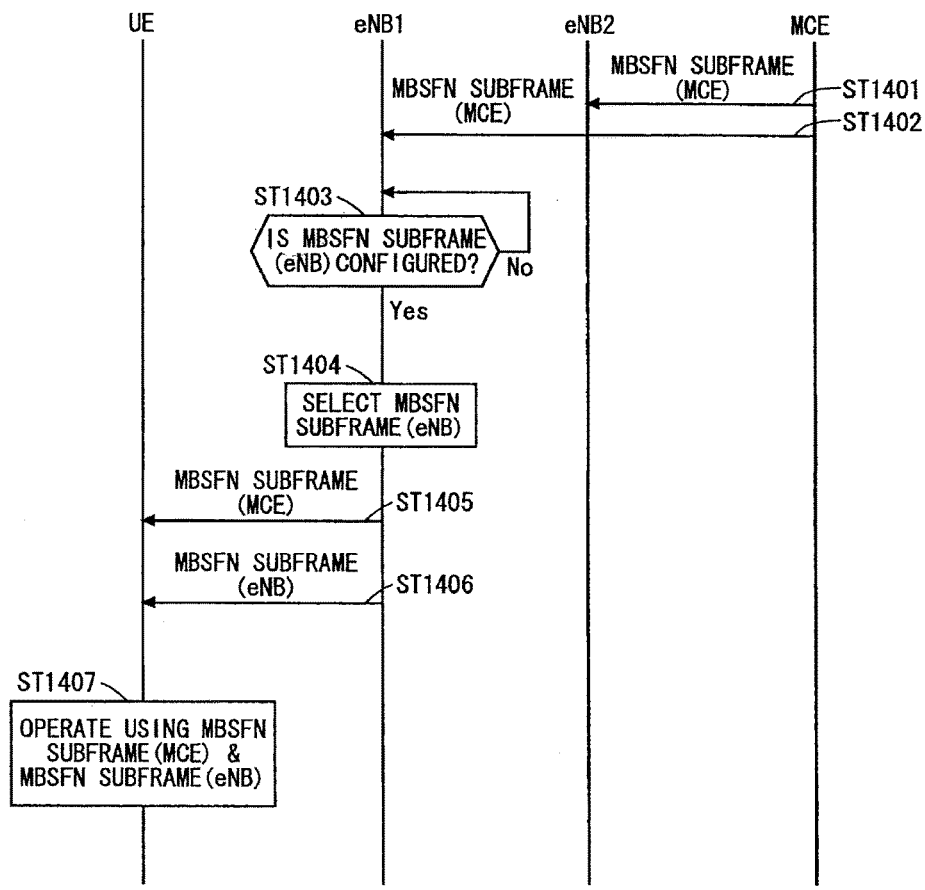

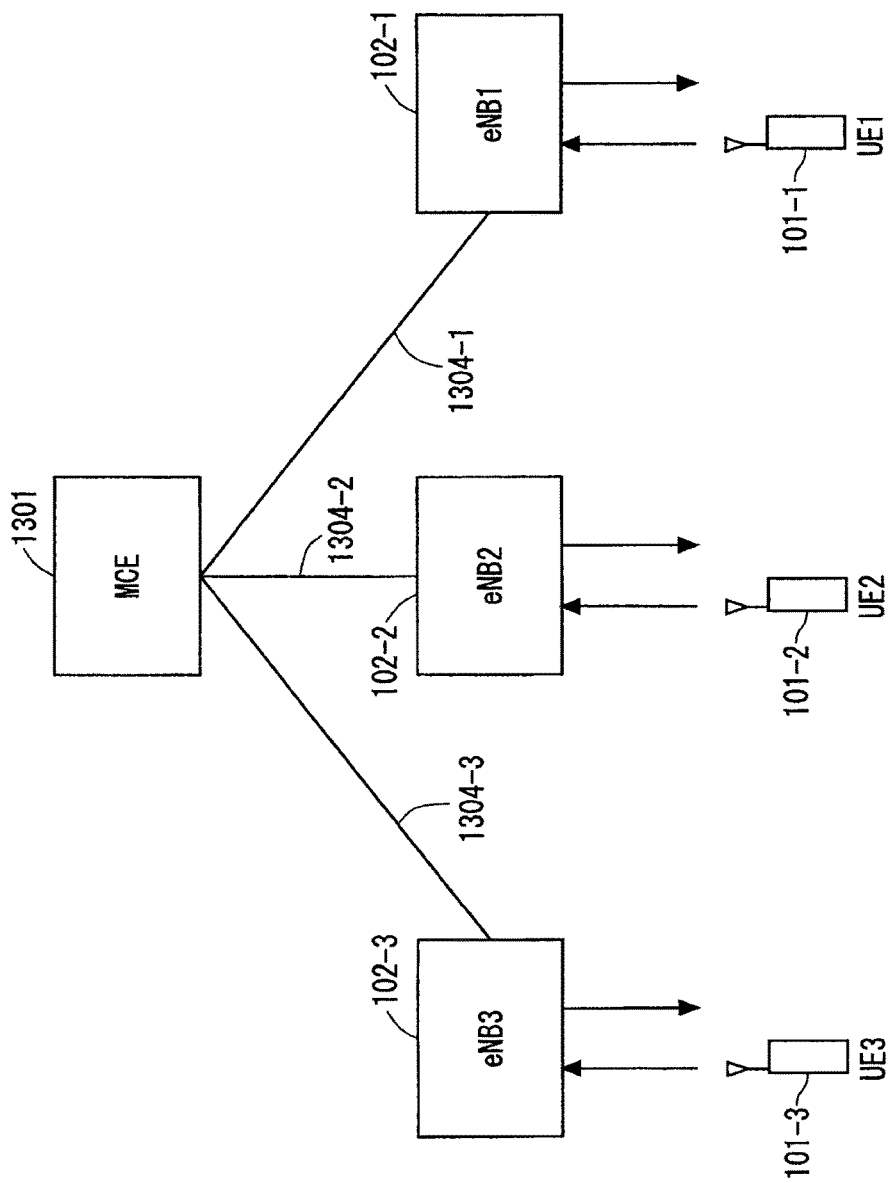
F I G. 1 5

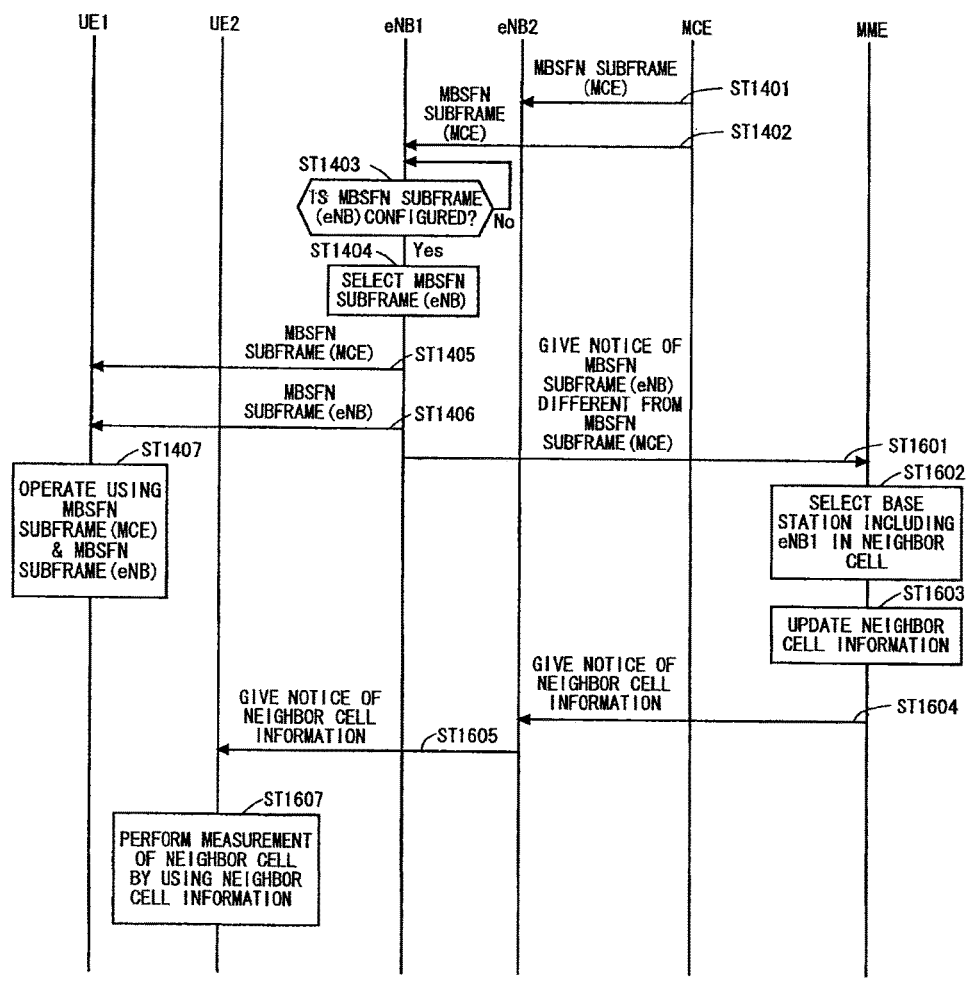
F I G. 1 6

F I G . 1 9

| PRIORITY ORDER | SUBFRAME NUMBER |
|---|---|
| 1 | #1 |
| 2 | #2 |
| 3 | #6 |
| 4 | #7 |
| 5 | #3 |
| 6 | #8 |

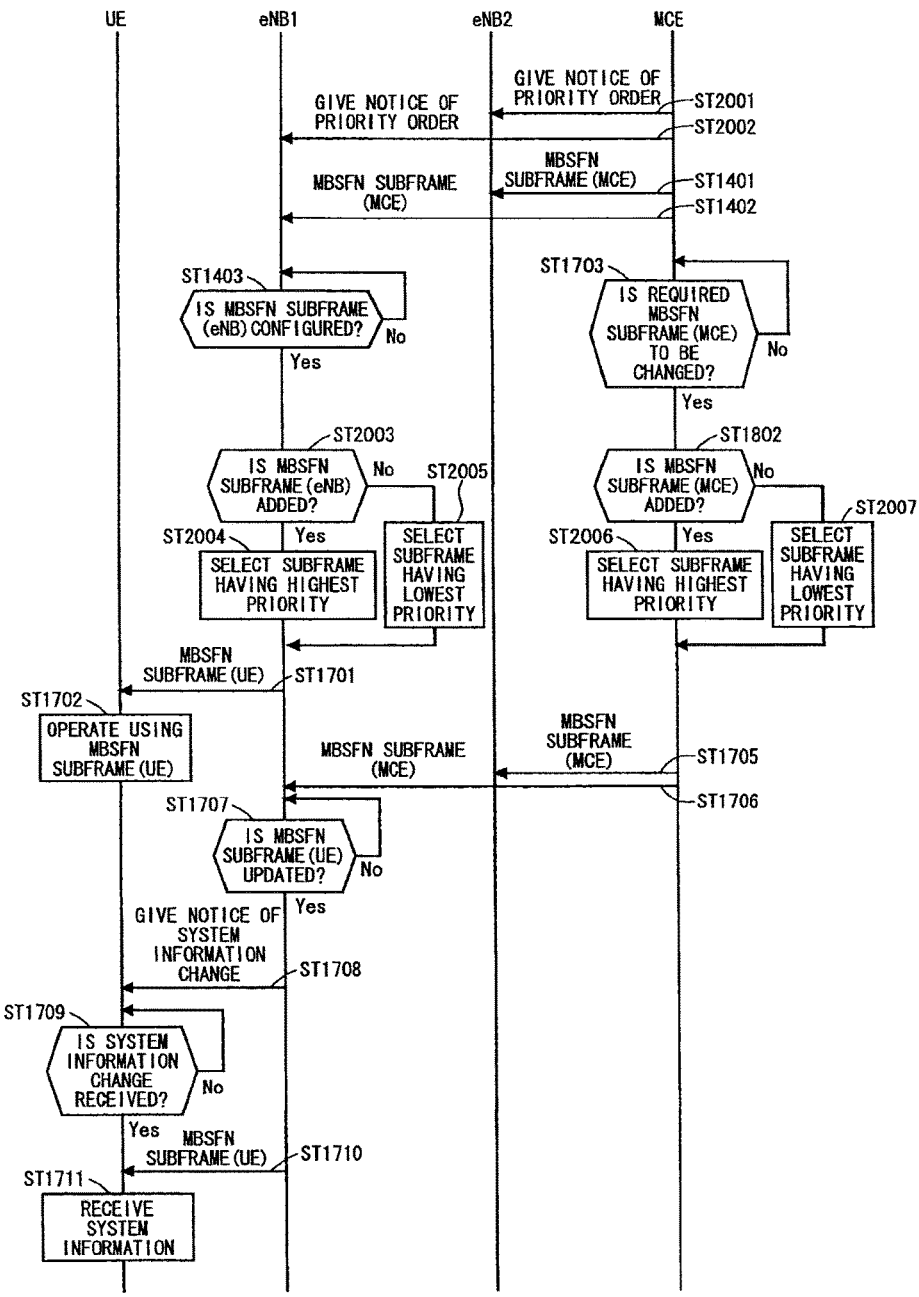

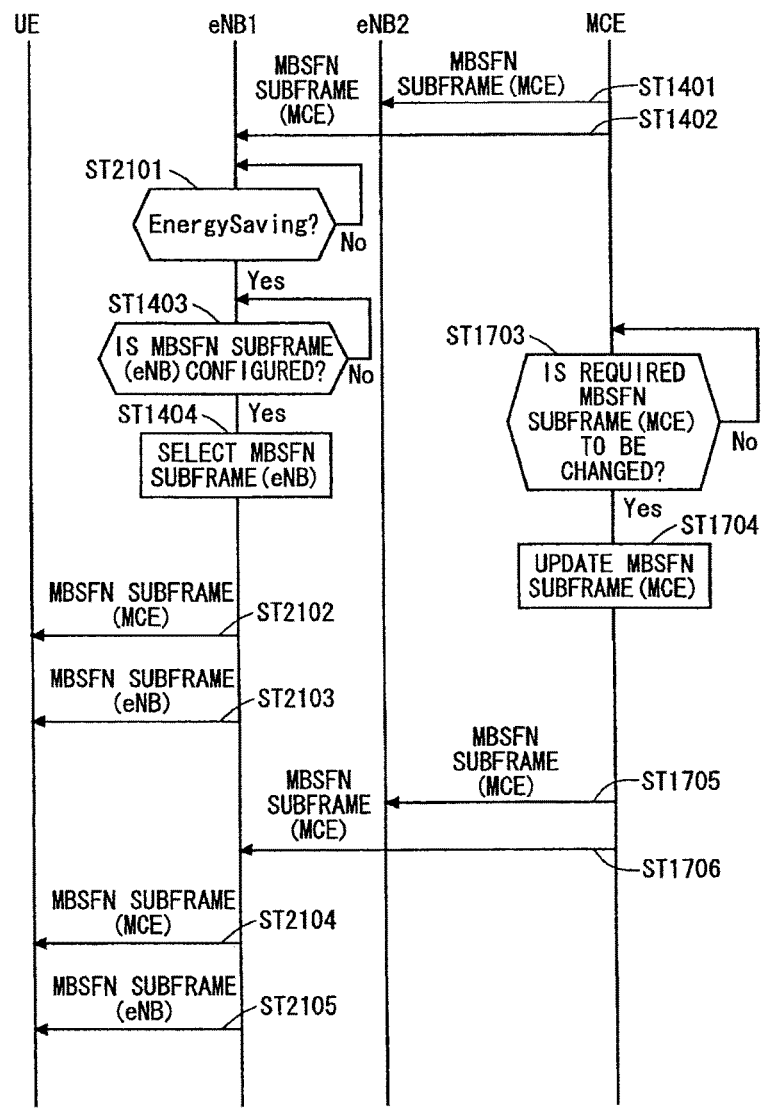
F I G . 2 1

FIG. 22

| Ns | PO When is=0 | PO When is=1 | PO When is=2 | PO When is=3 |
|---|---|---|---|---|
| 1 | #9 | — | — | — |
| 2 | #4 | #9 | — | — |
| 4 | #0 | #4 | #5 | #9 |

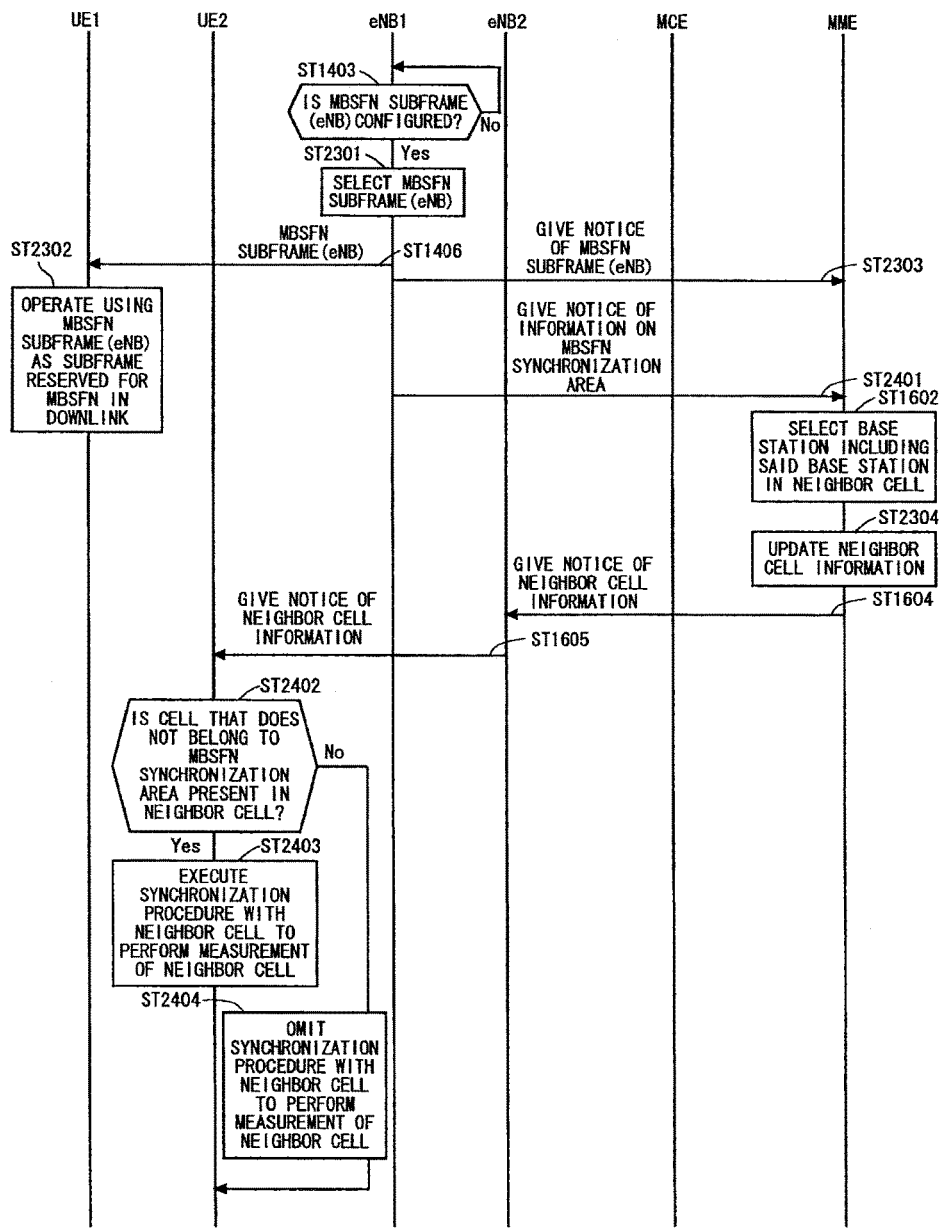

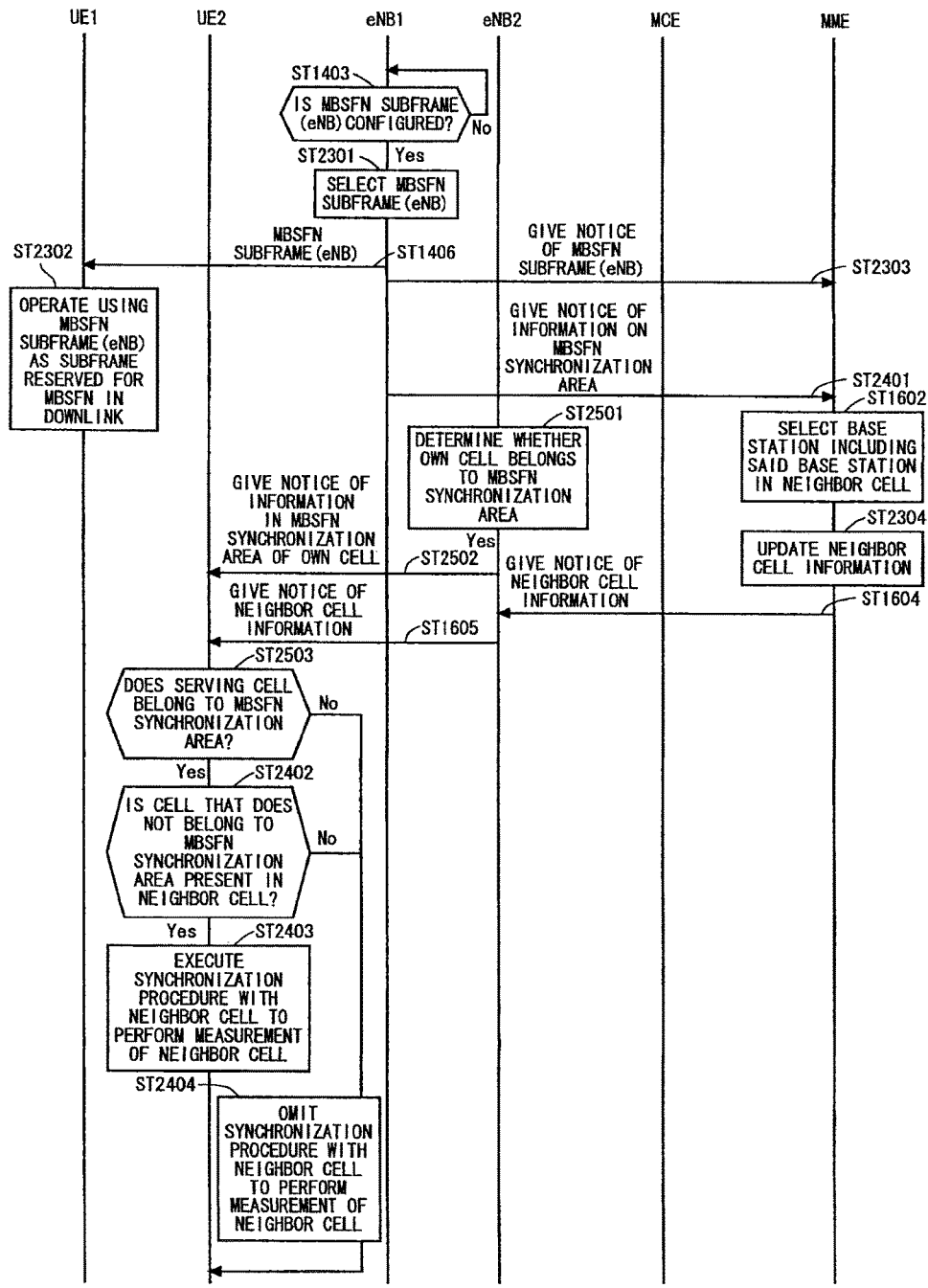

MOBILE COMMUNICATION SYSTEM

CROSS-REFERENCE TO RELATED APPLICATIONS

This application is a continuation of U.S. application Ser. No. 13/640,334 filed Oct. 10, 2012, the entire content of which is incorporated herein by reference. U.S. application Ser. No. 13/640,334 is a National Phase of PCT/JP2011/002406 filed Apr. 25, 2011 and claims priority to Japanese Patent Application Nos. 2010-103487 filed Apr. 28, 2010 and 2010-223903 filed Oct. 1, 2010.

TECHNICAL FIELD

The present invention relates to a mobile communication system in which a base station performs radio communication with a plurality of user equipments.

BACKGROUND ART

Commercial service of W-CDMA (Wideband Code division Multiple Access) system among so-called third-generation communication systems has been offered in Japan since 2001. In addition, HSDPA (High Speed Downlink Packet Access) service for achieving higher-speed data transmission using a downlink has been offered by adding a channel for packet transmission (HS-DSCH: High Speed-Downlink Shared Channel) to the downlink (dedicated data channel, dedicated control channel). Further, in order to increase the speed of data transmission in an uplink direction, service of an HSUPA (High Speed Uplink Packet Access) system has been offered. W-CDMA is a communication system defined by the 3GPP (3rd Generation Partnership Project) that is the standards organization regarding the mobile communication system, where the specifications of Release 8 version are produced.

Further, 3GPP is studying new communication systems referred to as "long term evolution (LTE)" regarding radio areas and "system architecture evolution (SAE)" regarding the overall system configuration including a core network (merely referred to as network as well) as communication systems independent of W-CDMA. In the LTE, an access scheme, a radio channel configuration and a protocol are totally different from those of the current W-CDMA (HS-DPA/HSUPA). For example, as to the access scheme, code division multiple access is used in the W-CDMA, whereas in the LTE, OFDM (Orthogonal Frequency Division Multiplexing) is used in a downlink direction and SC-FDMA (Single Career Frequency Division Multiple Access) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (GPRS) of the W-CDMA. Therefore, for differentiation from the W-CDMA communication system, a base station that communicates with a user equipment (UE) and a radio network controller that transmits/receives control data and user data to/from a plurality of base stations are referred to as an eNB (E-UTRAN NodeB) and an EPC (Evolved Packet Core) (also referred to as access gateway (aGW: Access Gateway)), respectively, in the LTE communication system. Unicast service and E-MBMS service (Evolved Multimedia Broadcast Multicast Service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 describes the current decisions by 3GPP regarding an overall architecture in the LTE system. The overall architecture (Chapter 4.6.1 of Non-Patent Document 1) is described with reference to FIG. 1. FIG. 1 is a diagram illustrating the configuration of the LTE communication system. With reference to FIG. 1, the E-UTRAN (Evolved Universal Terrestrial Radio Access) is composed of one or a plurality of base stations 102, provided that a control protocol (for example, RRC (Radio Resource Management)) and a user plane (for example, PDCP: Packet Data Convergence Protocol, RLC: Radio Link Control, MAC: Medium Access Control, and PHY: Physical Layer) for a user equipment 101 are terminated in the base station 102. The base stations 102 perform scheduling and transmission of paging signal (also referred to as paging messages) notified from an MME 103 (Mobility Management Entity). The base stations 102 are connected to each other by means of an X2 interface. In addition, the base stations 102 are connected to an EPC (Evolved Packet Core) by means of an S1 interface, more specifically, connected to the MME 103 (Mobility Management Entity) by means of an S1_MME interface and connected to an S-GW 104 (Serving Gateway) by means of an S1_U interface. The MME 103 distributes the paging signaling to multiple or a single base station 102. In addition, the MME 103 performs mobility control of an idle state. When the user equipment is in the idle state and an active state, the MME 103 manages a list of tracking areas. The S-GW 104 transmits/receives user data to/from one or a plurality of base stations 102. The S-GW 104 serves as a local mobility anchor point in handover between base stations. Moreover, there is provided a P-GW (PDN Gateway), which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_Idle and RRC_CONNECTED. In RRC_IDLE, PLMN (Public Land Mobile Network) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell. RRC_IDLE is also merely referred to as IDLE or an idle state. RRC_CONNECTED is also merely referred to as CONNECTED.

The current decisions by 3GPP regarding the frame configuration in the LTE system are described in Non-Patent Document 1 (Chapter 5). Description is given with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. MBSFN Transmission is a simulcast transmission technique realized by simultaneous transmission of the same waveforms from a plurality of cells. MBSFN transmission from a plurality of cells in an MBSFN area appears as one transmission by a user equipment. MBSFN is a network that supports the MBSFN transmission. Hereinafter, a subframe for MBSFN transmission is referred to as an MBSFN subframe. Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. The MBSFN frame is repeated in a radio Frame Allocation Period. An MBSFN subframe is a subframe allocated for MBSFN in a radio frame defined by the radio frame allocation period and a radio Frame Allocation Offset, and is a subframe to transmit multimedia data. A radio frame that satisfies the following equation (1) is a radio frame including the MBSFN subframe.

SFN Mod radioFrameAllocationPeriod= radioFrameAllocationOffset    Equation (1)

Allocation of the MBSFN subframe is performed by 6 bits. The leftmost bit defines MBSFN allocation of a second (#1) subframe. A second bit defines MBSFN allocation of a third subframe (#2), a third bit defines MBSFN allocation of a fourth subframe (#3), a fourth bit defines MBSFN allocation of a seventh subframe (#6), a fifth bit defines MBSFN allocation of an eighth subframe (#7), and a sixth bit defines MBSFN allocation of an ninth subframe (#8). When the bit shows "1", it is shown that a corresponding subframe is allocated for MBSFN.

Non-Patent Document 1 describes the current decisions by 3GPP regarding the channel configuration in the LTE system. It is assumed that the same channel configuration is used in a CSG cell (Closed Subscriber Group cell) as that of a non-CSG cell. A physical channel (Chapter 5 of Non-Patent Document 1) is described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe. A physical downlink control channel (PDCCH) 403 is a downlink channel transmitted from the base station 102 to the user equipment 101. The PDCCH notifies the resource allocation, HARQ information related to DL-SCH (downlink shared channel that is one of the transport channels shown in FIG. 5) and the PCH (paging channel that is one of the transport channels shown in FIG. 5). The PDCCH carries an uplink scheduling grant. The PDCCH carries ACK/Nack that is a response signal to uplink transmission. The PDCCH is also referred to as an L1/L2 control signal as well. A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries ACK/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH. A physical hybrid ARQ indicator channel (PHICH) 408 is a downlink channel transmitted from the base station 102 to the user equipment 101. The PHICH carries ACK/Nack that is a response to uplink transmission. A physical random access channel (PRACH) 409 is an uplink channel transmitted from the user equipment 101 to the base station 102. The PRACH carries a random access preamble.

A downlink reference signal is a known symbol serving as a mobile communication system. The physical layer measurement objects of a user equipment include, for example, reference symbol received power (RSRP).

The transport channel (Chapter 5 of Non-Patent Document 1) is described with reference to FIG. 5. FIG. 5 is a diagram illustrating transport channels used in the LTE communication system. Part [A] of FIG. 5 shows mapping between a downlink transport channel and a downlink physical channel. Part [B] of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH). Retransmission control according to a HARQ (Hybrid ARQ) is applied to a downlink shared channel (DL-SCH). Broadcast to the entire base station (cell) is enabled. The DL-SCH supports dynamic or semi-static resource allocation. The semi-static resource allocation is also referred to as persistent scheduling. The DL-SCH supports DRX (Discontinuous reception) of a user equipment for enabling the user equipment to save power. The DL-SCH is mapped to the physical downlink shared channel (PDSCH). The paging channel (PCH) supports DRX of the user equipment for enabling the user equipment to save power. Broadcast to the entire base station (cell) is required. The PCH is mapped to a physical resource such as the physical downlink shared channel (PDSCH) that can be used dynamically for traffic or a physical resource such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to an HARQ (Hybrid ARQ) is applied to an uplink shared channel (UL-SCH). The DL-SCH supports dynamic or semi-static resource allocation. The UL-SCH is mapped to the physical uplink shared channel (PUSCH). A random access channel (RACH) shown in part [B] of FIG. 5 is limited to control information. There is a collision risk. The RACH is mapped to the physical random access channel (PRACH).

The HARQ is described. The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission. An example of the retransmission method is described. In a case where the receiver fails to successfully decode the received data (in a case where a cyclic redundancy check (CRC) error occurs (CRC=NG)), the receiver transmits "Nack" to the transmitter. The transmitter that has received "Nack" retransmits the data. In a case where the receiver successfully decodes the received data (in a case where a CRC error does not occur (CRC=OK)), the receiver transmits "AcK" to the transmitter. The transmitter that has received "Ack" transmits the next data. Examples of the HARQ system include "chase combining". In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is IR (incremental redundancy). The IR is aimed to increase redundancy, where a parity bit is transmitted in retransmission to increase the redundancy by combining the first transmission and retransmission, to thereby improve the quality by an error correction function.

A logical channel (Chapter 6 of Non-Patent Document 1) is described with reference to FIG. 6. FIG. 6 is a diagram illustrating logical channels used in an LTE communication system. Part [A] of FIG. 6 shows mapping between a downlink logical channel and a downlink transport channel. Part [B] of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel. A paging control channel (PCCH) is a downlink channel for transmitting paging signals. The PCCH is used when the network does not know the cell location of a user equipment. The PCCH that is a logical channel is mapped to the paging channel (PCH) that is a transport channel. A common control channel (CCCH) is a channel for transmission control information between user equipments and a base station. The CCCH is used in a case where the user equipments have no RRC connection with the network. In downlink, the CCCH is mapped to the downlink shared channel (DL-SCH) that is a transport channel. In uplink, the CCCH is mapped to the uplink shared channel uplink shared channel (UL-SCH) that is a transport channel.

A multicast control channel (MCCH) is a downlink channel for point-to-multipoint transmission. The MCCH is a channel used for transmission of MBMS control information for one or several MTCHs from a network to a user equipment. The MCCH is a channel used only by a user equipment during reception of the MBMS. The MCCH is mapped to the downlink shared channel (DL-SCH) or multicast channel (MCH) that is a transport channel. A dedicated control channel (DCCH) is a channel that transmits dedicated control information between a user equipment and a network. The DCCH is mapped to the uplink shared channel (UL-SCH) in uplink and mapped to the downlink shared channel (DL-SCH) in downlink. A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink. A multicast traffic channel (MTCH) is a downlink channel for traffic data transmission from a network to a user equipment. The MTCH is a channel used only by a user equipment during reception of the MBMS. The MTCH is mapped to the downlink shared channel (DL-SCH) or multicast channel (MCH).

GCI represents a global cell identity. In the LTE and UMTS (Universal Mobile Telecommunication System), a CSG cell (Closed Subscriber Group cell) is introduced. The CSG is described below (Chapter 3.1 of Non-Patent Document 3). The CSG (Closed Subscriber Group) is a cell in which subscribers who are allowed to use are specified by an operator (cell for specific subscribers). The specific subscribers are allowed to make access one or more E-UTRAN cells of a PLMN (public land mobile network). One or more E-UTRAN cells in which the specific subscribers are allowed to make access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier. The locations of user equipments are traced based on an area composed of one or more cells. The locations are traced for enabling tracing of the locations of user equipments and calling (calling of user equipments) even in an idle state. An area for tracing locations of user equipments is referred to as a tracking area. A CSG whitelist is a list stored in the USIM (Universal Subscriber Identity Module) in which all CSG IDs of the CSG cells to which the subscribers belong are recorded. The CSG whitelist is also referred to as an allowed CSG ID list in some cases.

A "suitable cell" is described below (Chapter 4.3 of Non-Patent Document 3). The "suitable cell" is a cell on which a UE camps (Camp ON) to obtain normal service. Such a cell satisfies a condition in which (1) the cell is part of a selected PLMN, a registered PLMN, or a PLMN of "Equivalent PLMN list", (2) the cell further satisfies the following conditions by the latest information provided by an NAS (non-access stratum), and (a) the cell is not a barred cell. (b) The cell is not part of an "LAs barred for roaming" list, but part of at least one tracking area (TA). In this case, the cell must fulfill the (1), (c) the cell satisfies a cell selection criteria, (d) the cell, that is specified as a CSG cell by system information (SI) is part of a "CSG whitelist" of the UE (included in the CSG whitelist of the UE).

An "acceptable cell" is described below (Chapter 4.3 of Non-Patent Document 3). This is the cell on which a UE camps to obtain limited service (emergency calls). Such a cell shall fulfill all the following requirements. That is, the minimum required set for initiating an emergency call in an E-UTRAN network are as follows. (1) the cell is not a barred cell. (2) The cell shall fulfill the cell selection criteria.

Camping on a cell represents the state where a UE has completed the cell selection/reselection process and the UE has selected a cell for monitoring the system information and paging information.

3GPP is studying base stations referred to as Home-NodeB (Home-NB, HNB) and Home-eNodeB (Home-eNB, HeNB). HNB/HeNB is a base station for, for example, household, corporation or commercial access service in UTRAN/E-UTRAN. Non-Patent Document 4 discloses three different modes of the access to the HeNB and HNB. Those are an open access mode, a closed access mode and a hybrid access mode. The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed to access at the same time. In other words, a cell in the hybrid access mode (also referred to as hybrid cell) is the cell that supports both the open access mode and the closed access mode.

In 3GPP, as Release 10, the standards of "long term evolution advanced" (LTE-A) are being established (Non-Patent Document 6 and Non-Patent Document 7).

In the LTE-A system, it is examined that a relay (relay node (RN)) is supported to obtain a high communication speed, a high throughput at cell edge, a new coverage area and the like. The relay node is wirelessly connected to a radio access network through a donor cell (donor eNB or DeNB). Within the range of the donor cell, a link from an NW to a relay node shares the same frequency band as that of a link from a network to a UE. In this case, the UE of Release 8 can also be connected to the donor cell. A link between a donor cell and a relay node is referred to as a backhaul link, and a link between a relay node and a UE is referred to as an access link.

As a backhaul link multiplexing method in FDD, transmission from a DeNB to an RN is performed in a downlink (DL) frequency band, transmission from an RN to a DeNB is an uplink (UL) frequency band. As a resource splitting method in a relay, a link from a DeNB to an RN and a link from an RN to a UE are time-multiplexed in one frequency band, and a link from an RN to a DeNB and a link from a UE to an RN are time-multiplexed in one frequency band. In this manner, in the relay, transmission of the relay can be prevented from interfering with reception of its own relay.

PRIOR ART DOCUMENTS

Non-Patent Documents

Non-Patent Document 1: 3GPP TS36. 300 V9. 2. 0 Chapter 4. 6. 1, Chapter 4. 6. 2, Chapter 5, Chapter 6, and Chapter 10.7
Non-Patent Document 2: 3GPP TS36.331 V9.1.0
Non-Patent Document 3: 3GPP TS36. 304 V9.1.0 Chapter 3.1, Chapter 4.3 and Chapter 5.2.4
Non-Patent Document 4: 3GPP S1-083461
Non-Patent Document 5: 3GPP R2-082899
Non-Patent Document 6: 3GPP TR 36. 814 V9. 0. 0
Non-Patent Document 7: 3GPP TR 36. 912 V9. 0. 0
Non-Patent Document 8: 3GPP R1-095011
Non-Patent Document 9: 3GPP TS36.443 V9.0.0
Non-Patent Document 10: 3GPP R1-100275
Non-Patent Document 11: 3GPP R1-101620

SUMMARY OF THE INVENTION

Problem to be Solved by the Invention

In 3GPP, lower power consumption (energy saving) of an infrastructure is being discussed. It is examined that lower power consumption of a base station can be achieved by reducing transmission time of CRS by using an MBSFN subframe.

It is an object of the present invention to provide a mobile communication system that can efficiently reduce a power consumption of an infrastructure.

Means for Solving the Problems

The present invention relates to a mobile communication system including a plurality of base stations that perform radio communication with user equipments and a radio network controller that controls the plurality of base stations, wherein the radio network controller indicates a low-frequency resource that is a radio resource for transmitting a reference signal for measuring a power to the user equipments less frequently than normal to the base stations, the base station indicates, in addition to the low-frequency resource indicated by the radio network controller, a low-frequency resource that is a radio resource for transmitting the reference signal to the user equipment less frequently than normal, and the base station transmits the reference signal to the user equipment less frequently than normal in the low-frequency resource indicated by the radio network controller and the low-frequency resource additionally designated by the base station itself.

Effects of the Invention

According to the present invention, in addition to the radio resource indicated by the radio network controller, in the radio resource designated by the base station itself, the reference signal for measuring a power can be transmitted less frequently than normal, and a power consumption of the infrastructure can be reduced.

BRIEF DESCRIPTION OF DRAWINGS

FIG. 3 is a diagram illustrating the configuration of the MBSFN (Multimedia Broadcast multicast service Single Frequency Network) frame.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 7 is a block diagram showing the overall configuration of a mobile communication system currently under discussion of 3GPP.

FIG. 14 is a diagram illustrating a sequence of a mobile communication system when the solution of the first embodiment is used.

FIG. 15 is a location diagram illustrating a problem of a first modification of the first embodiment.

FIG. 16 is a diagram illustrating a sequence of a mobile communication system when the solution of the first modification of the first embodiment is used.

FIG. 19 is a specific example of information of a priority order when a third modification of the first embodiment is used.

FIG. 20 is a diagram illustrating a sequence of a mobile communication system when a solution of a third modification of the first embodiment is used.

FIG. 21 is a diagram illustrating a sequence of a mobile communication system when a solution of a fifth modification of the first embodiment is used.

FIG. 22 is a generation pattern of paging occasion currently under discussion of 3GPP.

FIG. 24 is a diagram illustrating a sequence of a mobile communication system when a solution of a first modification of the third embodiment is used.

FIG. 25 is a diagram illustrating a sequence of a mobile communication system when a solution of a second modification of the third embodiment is used.

EMBODIMENTS FOR CARRYING OUT THE INVENTION

First Embodiment

FIG. 7 is a block diagram showing an overall configuration of an LTE mobile communication system, which is currently under discussion of 3GPP. In current 3GPP, an overall configuration of a system including a CSG (Closed Subscriber Group) cell (Home-eNodeB (Home-eNB, HeNB) of e-UTRAN and Home-NB (HNB) of UTRAN) and a non-CSG cell (eNodeB (eNB) of e-UTRAN, NodeB (NB) of UTRAN and BSS of GERAN) is examined. For the e-UTRAN, the configuration shown in FIG. 7 is proposed (Chapter 4.6.1. of Non-Patent Document 1).

FIG. 7 is described. A user equipment (UE) 71 performs transmission/reception to/from a base station 72. The base stations 72 are classified into an eNB 72-1 and Home-eNBs 72-2. The eNB 72-1 is connected to MMEs 73 through S1 interfaces, and control information is communicated between the eNB and the MMEs. A plurality of MMEs 73 may be connected to one eNB 72-1. The eNBs are connected to each other by means of an X2 interface, and control information is communicated between the eNBs.

The Home-eNB 72-2 is connected to the MME 73 by means of the S1 interface, and control information is communicated between the Home-eNB and the MME. A plurality of Home-eNBs are connected to one MME. Alternatively, the Home-eNBs 72-2 are connected to the MMEs 73 through a HeNBGW (Home-eNB Gateway) 74. The Home-eNBs 72-2 are connected to the HeNBGW 74 by means of the S1 interfaces, and the HeNBGW 74 is connected to the MMEs 73 through an S1 interface. One or a plurality of Home-eNBs 72-2 are connected to one HeNBGW 74, and information is communicated therebetween through the S1 interface. The HeNBGW 74 is connected to one or a plurality of MMEs 73, and information is communicated therebetween through the S1 interface.

Further, 3GPP is currently studying the configuration below. The X2 interface between the Home-eNBs 72-2 is not supported. The HeNBGW 74 appears to the MME 73 as the eNB 72-1. The HeNBGW 74 appears to the Home-eNB 72-2 as the MME 73. The S1 interface between the Home-eNB 72-2 and the EPC is the same irrespective of whether or not the Home-eNB 72-2 is connected to the EPC through the HeNBGW 74. The mobility to the Home-eNB 72-2 or the mobility from the Home-eNB 72-2 that spans the MMEs 73 is not supported. The Home-eNB 72-2 supports a single cell.

Figure 8:
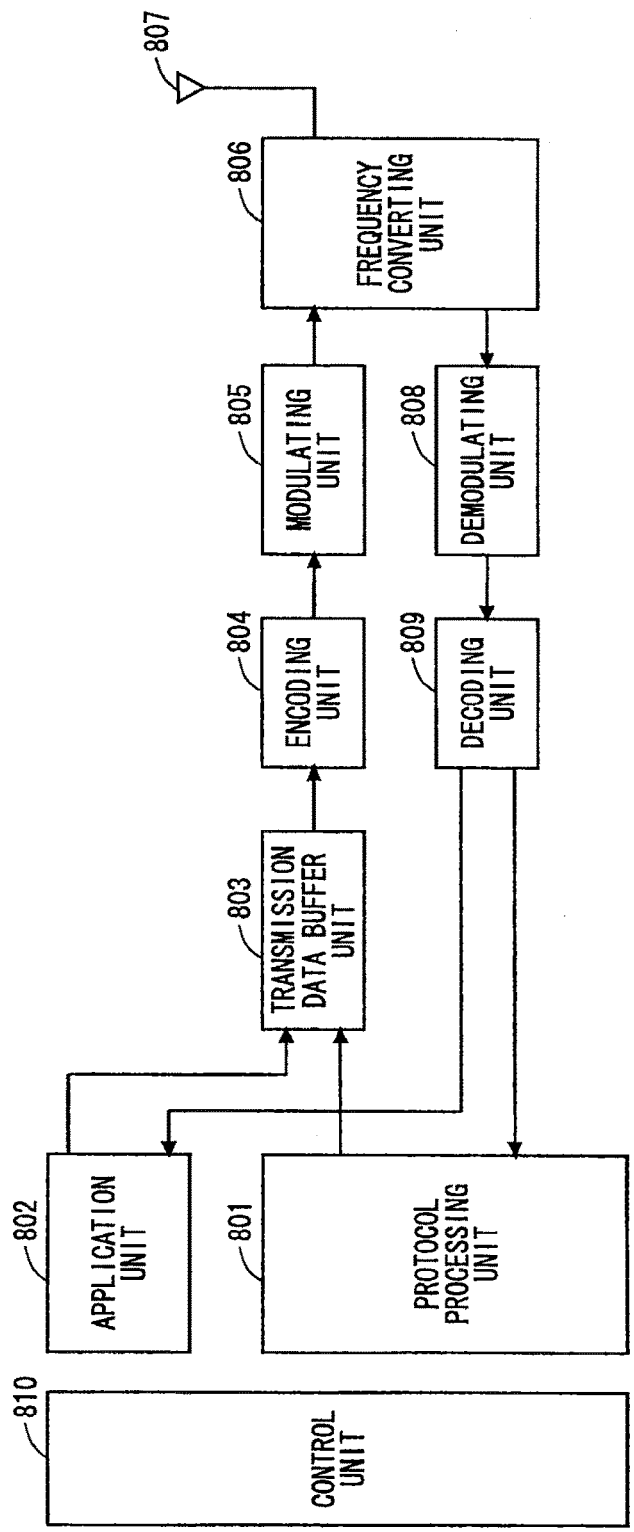
FIG. 8 is a block diagram showing the configuration of a user equipment 71 according to the present invention.

FIG. 8 is a block diagram showing the configuration of the user equipment (equipment 71 of FIG. 7) according to the present invention. The transmission process of the user equipment shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to a base station 72. A user equipment 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of process of the user equipment is controlled by a control unit 810. This means that, though not shown, the control unit 810 is connected to the respective units (801 to 809).

Figure 9:
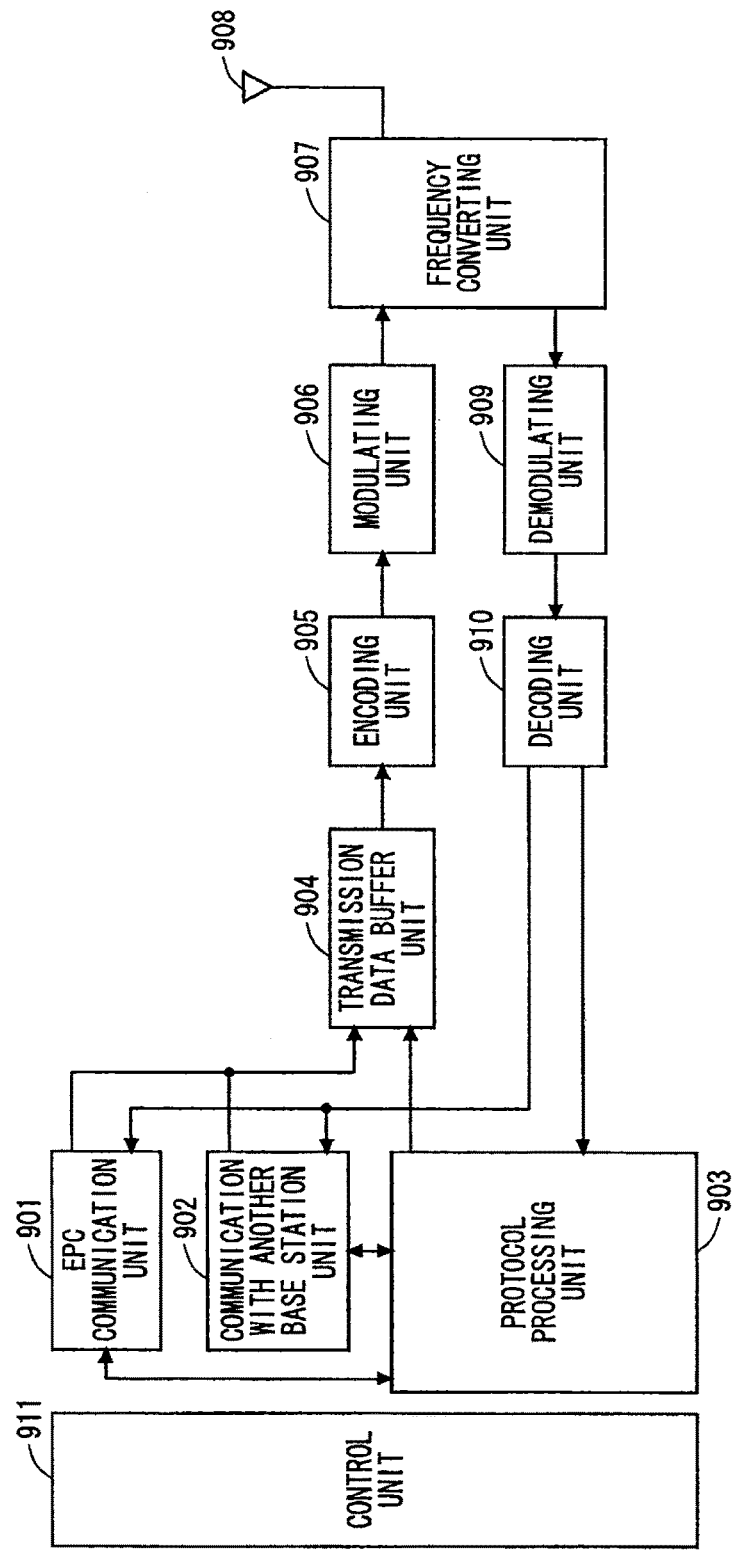
FIG. 9 is a block diagram showing the configuration of a base station 72 according to the present invention.

FIG. 9 is a block diagram showing the configuration of the base station (base station 72 of FIG. 7) according to the present invention. The transmission process of the base station shown in FIG. 9 is described. An EPC communication unit 901 performs data transmission/reception between the base station 72 and the EPCs (such as MME 73 and HeNBGW 74). A communication with another base station unit 902 performs data transmission/reception to/from another base station. The X2 interface between the HomeeNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from the protocol processing unit 903. The control data from the protocol processing unit 903, and the user data and control data from the EPC communication unit 901 and the communication with another base station unit 902 are stored in the transmission data buffer unit 904. The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71. While, the reception process of the base station 72 is executed as follows. A radio signal from one or a plurality of user equipments 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of process by the base station 72 is controlled by a control unit 911. This means that, though not shown, the control unit 911 is connected to the respective units (901 to 910).

The functions of the Home-eNB 72-2 currently under discussion of 3GPP are described below (Chapter 4.6.2 of Non-Patent Document 1). The Home-eNBs 72-2 has the same function as that of the eNB 72-1. In addition, when the Home-eNB 72-2 is connected to the HeNBGW 74, the Home-eNB 72-2 has the following function. The Home-eNB 72-2 has a function of discovering a suitable serving HeNBGW 74. In a case where the Home-eNB 72-2 is connected to one HeNBGW 74 only, that is, in a case of connection to the HeNBGW 74, the Home-eNB 72-2 does not use the Flex function of the S1 interface. When the Home-eNB 72-2 is connected to the HeNBGW 74, it is not simultaneously connected to another HeNBGW 74 or another MME 73. The TAC and PLMN ID used by the Home-eNB 72-2 are supported by the HeNBGW 74. When the Home-eNB 72-2 is connected to the HeNBGW 74, selection of the MME 73 at "UE attachment" is performed by the HeNBGW 74 instead of the Home-eNB 72-2. The Home-eNB 72-2 may be deployed without network planning. Accordingly, the Home-eNB 72-2 may be moved from one geographical area to another geographical area. Accordingly, the Home-eNB 72-2 may be required to be connected to a different HeNBGW 74 depending on its location.

Figure 10:
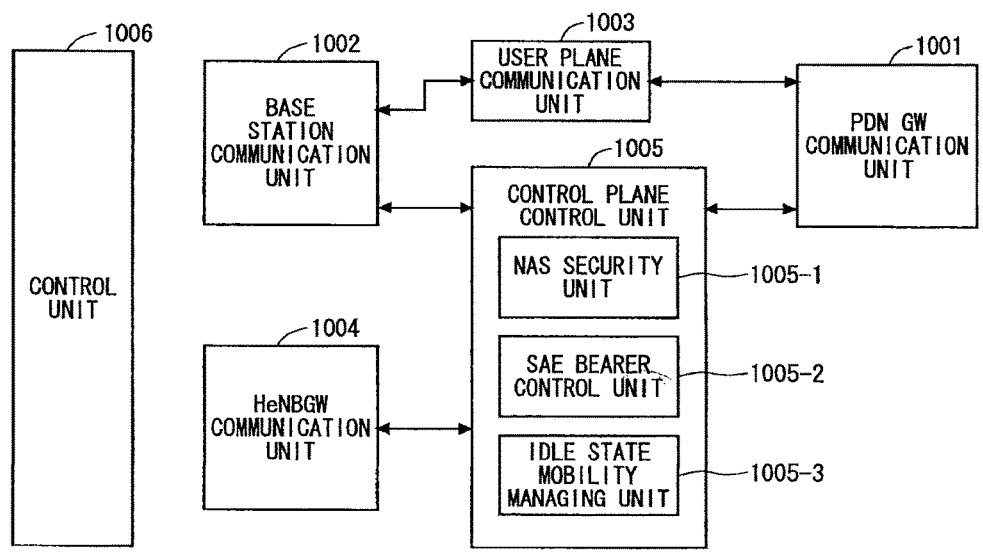
FIG. 10 is a block diagram showing the configuration of an MME according to the present invention.

FIG. 10 is a block diagram showing the configuration of an MME (Mobility Management Entity) according to the present invention. A PDN GW communication unit 1001 performs data transmission/reception between an MME 73 and a PDN GW. A base station communication unit 1002 performs data transmission/reception between the MME 73 and the base station 72 by means of the S1 interface. In the case where the data received from the PDN GW is user data, the user data is transmitted from the PDN GW communication unit 1001 to the base station communication unit 1002 through a user plane processing unit 1003 and is then transmitted to one or a plurality of base stations 72. In the case where the data received from the base station 72 is user data, the user data is transmitted from the base station communication unit 1002 to the PDN GW communication unit 1001 through the user plane processing unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005. A HeNBGW communication unit 1004 is provided in the case where the HeNBGW 74 is provided, which performs data transmission/reception by means of the interface (IF) between the MME 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2 and an idle state mobility managing unit 1005-3, and performs overall process for the control plane. The NAS security unit 1005-1 provides security or the like of an NAS (Non-Access Stratum) message. The SAE bearer control unit 1005-2 manages, for example, an SAE (System Architecture Evolution) bearer. The idle state mobility managing unit 1005-3 performs, for example, mobility management of an idle state (LTE-IDLE state, which is merely referred to as idle as well), generation and control of paging signaling in an idle state, addition, deletion, update and search of a tracking area (TA) of one or a plurality of user equipments 71 being served thereby, and tracking area list (TA List) management. The MME begins a paging protocol by transmitting a paging message to the cell belonging to a tracking area (TA) in which the UE is registered. The idle state mobility managing unit 1005-3 may manage the CSG of the Home-eNBs 72-2 to be connected to the MME, CSG-IDs and a whitelist. In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated or searched). For example, one or a plurality of CSG-IDs with which user registration has been performed by a user equipment may be stored in the whitelist. The above-mentioned management related to the CSG may be performed by another part of the MME 73. A series of process by an MME 73 is controlled by a control unit 1006. This means that, though not shown, the control unit 1006 is connected to the respective units (1001 to 1005).

The function of the MME 73 currently under discussion of 3GPP is described below (Chapter 4.6.2 of Non-Patent Document 1). The MME 73 performs access control for one or a plurality of user equipments being members of CSGs (Closed Subscriber Groups). The execution of paging optimization is recognized as an option.

Figure 11:
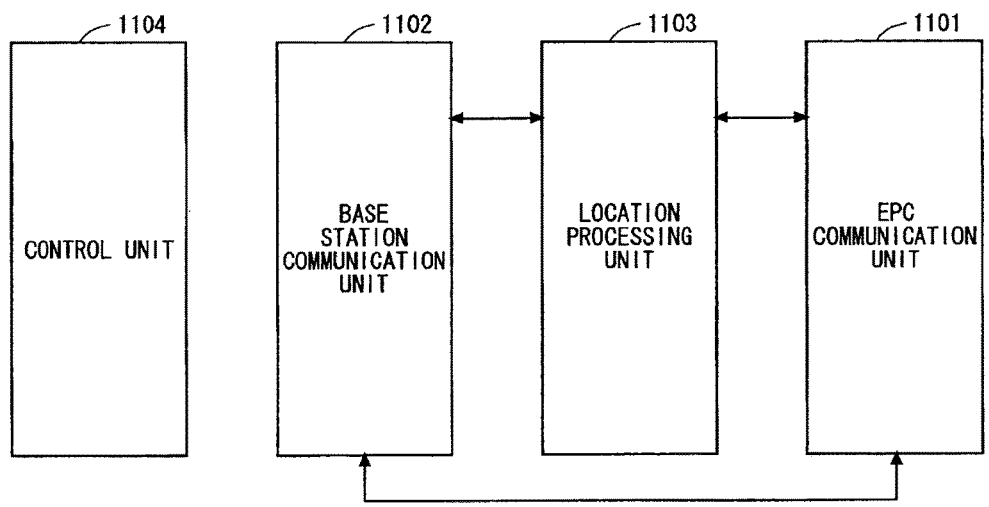
FIG. 11 is a block diagram showing the configuration of a HeNBGW according to the present invention.

FIG. 11 is a block diagram showing the configuration of the HeNBGW according to the present invention. An EPC communication unit 1101 performs data transmission/reception between the HeNBGW 74 and the MME 73 by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs, the registration information or the like among the data transmitted from the MME 73 through the EPC communication unit 1101. The data processed by the location processing unit 1103 is transmitted to the base station communication unit 1102 and is transmitted to one or a plurality of Home-eNBs 72-2 through the S1 interface. The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of process by the HeNBGW 74 is controlled by a control unit 1104. This means that, though not shown, the control unit 1104 is connected to the respective units (1101 to 1103).

The function of the HeNBGW 74 currently under discussion of 3GPP is described below (Chapter 4.6.2 of Non-Patent Document 1). The HeNBGW 74 relays an S1 application. The HeNBGW 74 terminates the S1 application that is not associated with the user equipment 71 though it is a part of the procedures of the MME 73 toward the Home-eNB 72-2. When the HeNBGW 74 is deployed, the procedure that is not associated with the user equipment 71 is communicated between the Home-eNB 72-2 and the HeNBGW 74 and between the HeNBGW 74 and the MME 73. The X2 interface is not set between the HeNBGW 74 and another node. The execution of paging optimization is recognized as an option.

Figure 12:
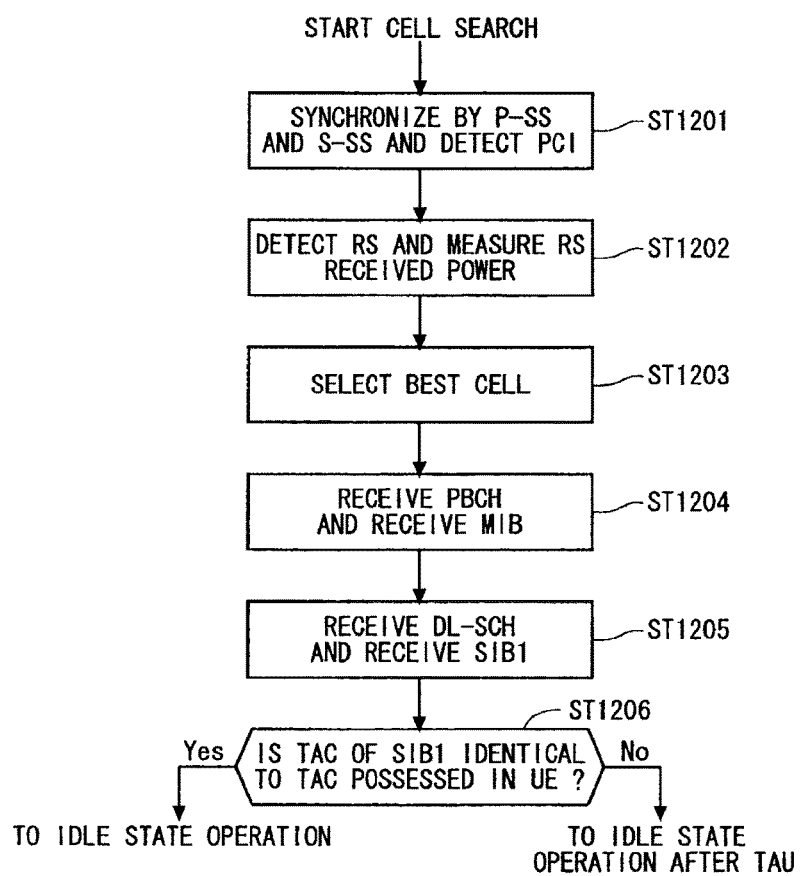
FIG. 12 is a flowchart showing an outline of cell search performed by a user equipment (UE) in the LTE communication system.

Next, an example of a typical cell search method in a mobile communication system is described. FIG. 12 is a flowchart showing an outline from cell search to an idle state operation performed by a user equipment (UE) in the LTE communication system. When the cell search is started by the user equipment, in Step ST1201, the slot timing and frame timing are synchronized by a primary synchronization signal (P-SS) and a secondary synchronization signal (S-SS) transmitted from a neighbor base station. Synchronization codes, which correspond to PCIs (Physical Cell Identities) assigned per cell one by one, are assigned to the synchronization signals (SS) including the P-SS and S-SS. The number of PCIs is currently studied in 504 ways, and these 504 ways of PCIs are used for synchronization, and the PCIs of the synchronized cells are detected (specified). Next, in Step ST1202, a reference signal RS (cell-specific Reference Signal: CRS), which is transmitted from the base station per cell, is detected and the received power (also referred to as an RSRP) is measured. The code corresponding to the PCI one by one is used for the reference signal RS, and separation from the other cells is enabled by correlation using the code. The code for RS of the cell is derived from the PCI specified in Step ST1201, which makes it possible to detect the RS and measure the RS received power. Next, in Step ST1203, the cell having the best RS reception quality (for example, cell having the highest RS received power; best cell) is selected from one or more cells that have been detected up to Step ST1202. In Step ST1204, next, the PBCH of the best cell is received, and the BCCH that is the broadcast information is obtained. An MIB (Master Information Block) containing the cell configuration information is mapped on the BCCH over the PBCH. Examples of the MIB information include the DL (down link) system bandwidth (also referred to as transmission bandwidth configuration: dl-bandwidth), transmission antenna number and SFN (System Frame Number).

In Step ST1205, next, the DL-SCH of the cell is received based on the cell configuration information of the MIB, to thereby obtain an SIB (System Information Block) 1 of the broadcast information BCCH. The SIB1 contains the information regarding access to the cell, information related to cell selection and scheduling information of other SIB (SIBk; k is an integer that satisfies k≥2). In addition, the SIB1 contains a TAC (Tracking Area Code). In Step ST1206, next, the user equipment compares the TAC received in Step ST1205 with the TAC that has been already possessed in a TA (Tracking Area) list by the user equipment. In a case where the TAC received in Step ST 1205 is identical to the TAC included in the TA list as a result of comparison, the user equipment enters an idle state operation in the cell. In the comparison, when the TAC received in Step ST1205 is not included in the TA list, the user equipment requests a core network (EPC) (including the MME or the like) to change the TA through the cell to perform TAU (Tracking Area Update). The core network updates the TA list based on an identification number (such as a UE-ID) of the user equipment transmitted from the user equipment together with a TAU request signal. The core network transmits the updated TA list to the user equipment. The user equipment rewrites (updates) the TAC list possessed by the user equipment with the received TA list. After that, the user equipment enters the idle state operation in the cell.

In the LTE and UMTS (Universal Mobile Telecommunication System), the introduction of a CSG (Closed Subscriber Group) cell is studied. As described above, access is allowed for only one or a plurality of user equipments registered with the CSG cell. The CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access the other CSG cells of the CSG to which the registered CSG cell belongs. The Home-eNB in the LTE or the Home-NB in the UMTS is used as the CSG cell in some cases. The user equipment registered with the CSG cell has a whitelist. Specifically, the whitelist is stored in the SIM/USIM. The CSG information of the CSG cell with which the user equipment has been registered is listed in the whitelist. Specific examples of the CSG information include CSG-ID, TAI (Tracking Area Identity), TAC and the like. Any one of the CSG-ID and TAC is adequate as long as they are associated with each other. GCI is adequate as long as the CSG-ID, the TAC and GCI (global cell identity) are associated with each other. As can be seen from the above, the user equipment which does not have a whitelist (including a case where the whitelist is empty in the present invention) is not allowed that makes access the CSG cell but is allowed that makes access only the non-CSG cell. On the other hand, the user equipment which has a whitelist is allowed that makes access the CSG cell of the CSG-ID with which registration has been performed as well as the non-CSG cell.

3GPP discusses that all PCI (Physical Cell Identities) are split (referred to as PCI-split) into ones reserved for CSG cells and the others reserved for non-CSG cells (Non-Patent Document 5). Further, 3GPP discusses that the PCI split information is broadcast in the system information from the base station to the user equipments being served thereby. Disclosed here is the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP has determined that the PCIs for hybrid cells are not contained in the PCI range for CSG cells (Chapter 10.7 of Non-Patent Document 1).

The HeNB and HNB are required to support various types of service. For example, an operator causes the predetermined HeNB and HNB to register user equipments therein and permits only the registered user equipments to make access the cells of the HeNB and HNB, so that the user equipments increase the available radio resource for performing high-speed communication. In such service, the operator correspondingly configures a higher accounting fee compared with normal service. This is a service. In order to achieve the above-mentioned service, the CSG cell (Closed Subscriber Group cell) which the registered (subscribed or member) user equipments can access is introduced. It is required to install a large number of CSG cells (Closed Subscriber Group cells) in shopping malls, apartment buildings, schools, companies and the like. For example, the CSG cells are required to be installed for each store in shopping malls, for each room in apartment buildings, for each classroom in schools, and for each section in companies in such a manner that only the users who have registered the respective CSG cells are permitted to use those CSG cells. The HeNB/HNB is required not only to complement the communication outside the coverage of the macro cell but also to support various types of service as described above. This leads to a case where the HeNB/HNB is installed within the coverage of the macro cell.

As one technique studied by the LTE-A, heterogeneous networks (HetNets) are added. 3GPP handles a pico eNB (pico cell), a node for hot zone cell, an HeNB/HNB/CSG cell, a relay node, and a network node (local area range node, a local area node, and a local node) in a local-area range having a low-output power such as a remote radio head (RRH). Thus, a network in which such one or more local area range nodes are incorporated in a normal eNB (macro cell) is requested to be operated. The network in which one or more local area range nodes are incorporated in the normal eNB (macro cell) is referred to as a heterogeneous network, and an interference reducing method, a capacity improving method and the like are studied.

In 3GPP, lower power consumption (energy saving) of an infrastructure is being discussed.

The following is disclosed in Non-Patent Document 8. During downlink transmission, a base station must turn on a power supply of a transmitter power amplifier (PA). Thus, when a time for downlink transmission is shortened, the power supply of the transmitter power amplifier can be turned off, and lower power consumption of the base station can be provided. Signals required in a downlink for no-active UE are a CRS, a P-SS, an S-SS and a BCH. Among the signals or channels, a signal that maximally influences a downlink transmission time is the CRS. This is because the CRSs are transmitted in all subframes. Although the CRS normally has four symbols in a subframe except for the MBSFN subframe, the CRS in the MBSFN subframe has one symbol. The MBSFN subframe is a subframe that supports transmission using MBSFN. Thus, by using the MBSFN subframe, a CRS transmission time can be reduced. In this manner, lower power consumption of the base station can be provided.

As the MBSFN subframes, a maximum of six subframes can be configured in one radio frame (Non-Patent Document 2).

On the other hand, for lower power consumption, a new method called an extended cell DTX is proposed without using the MBSFN subframe. In the extended cell DTX, a CRS is transmitted in a first subframe (#0) per each radio frame, and no CRS is transmitted in the other subframes. In the user equipment, in order to measure cell reception quality (RSRP), it is proposed that the S-SS is used instead of using the CRS.

A problem to be solved by a first embodiment is described below.

Figure 1:
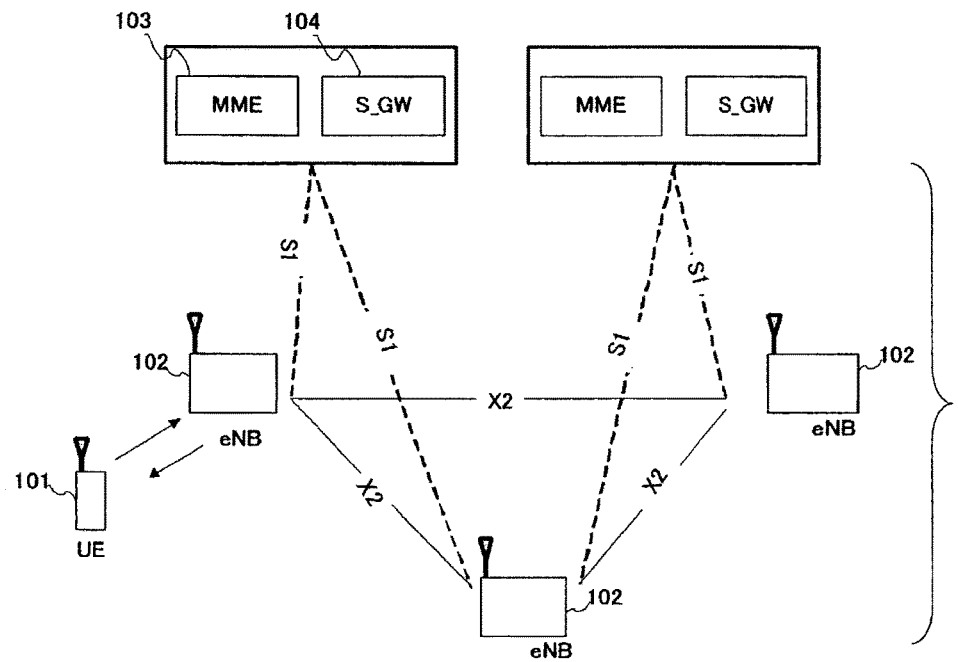
FIG. 1 is a diagram illustrating the configuration of an LTE communication system.
Figure 2:
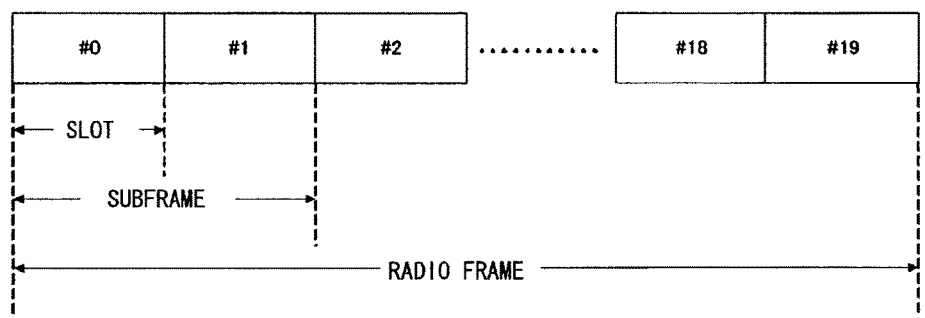
FIG. 2 is a diagram illustrating the configuration of a radio frame used in the LTE communication system.
Figure 13:
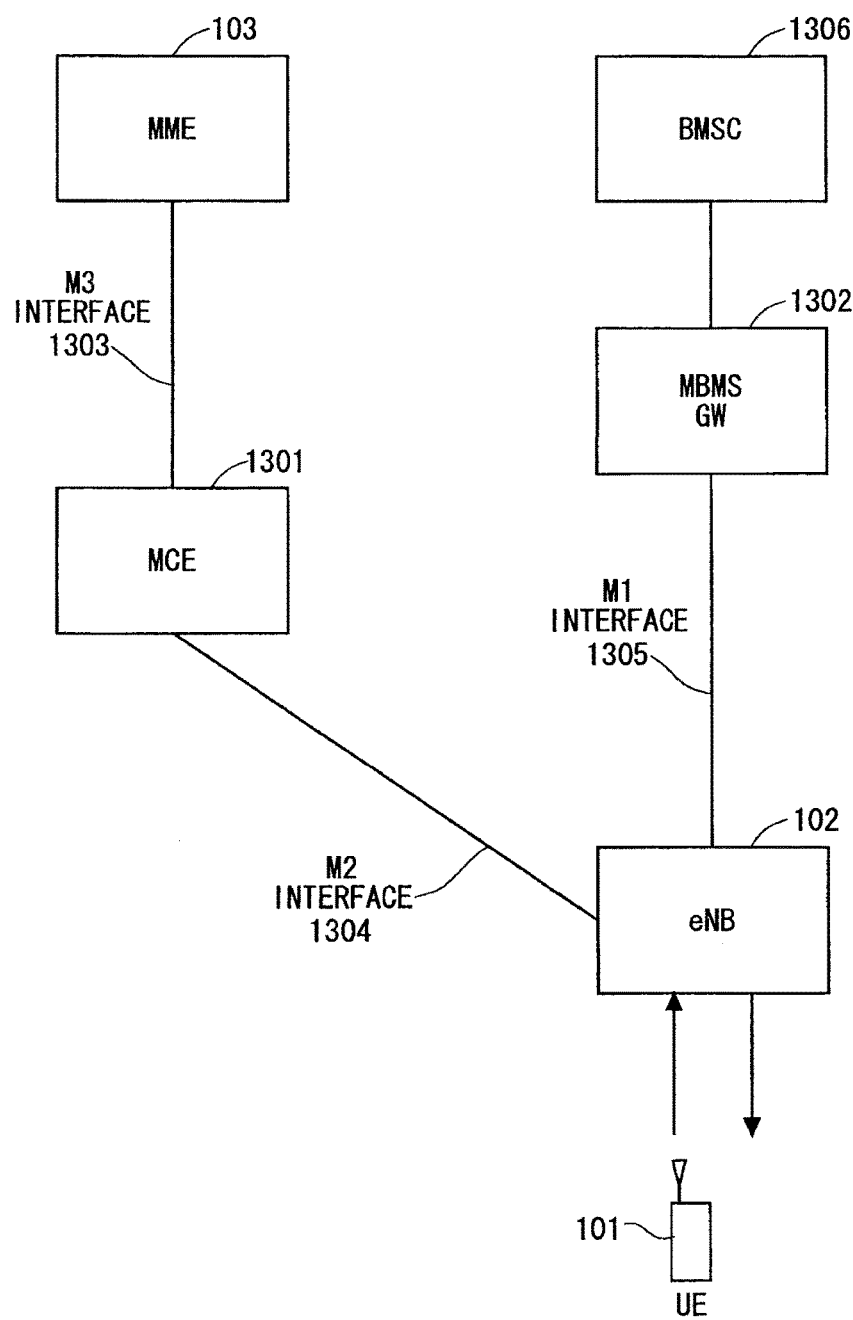
FIG. 13 is a diagram illustrating a theoretical architecture of E-MBMS currently under discussion of 3GPP.

A logical architecture of an E-MBMS discussed in 3GPP is as shown in FIG. 13. The same reference numerals as those of FIG. 1 denote the corresponding portions, which are not described. An MCE (Multi-cell/multicast Coordination Entity) 1301 is a logical element, or may be part of another network element. The MCE controls one or more base stations deployed under the control of the MCE. More specifically, admission control is performed and radio resources are allocated. The radio resources are radio resources used by all the base stations in an MBSFN area for multi-cell MBMS transmission used by an MBSFN operation. The MCE determines not only allocation of the radio resource of time and frequencies but also details of a radio configuration. The details of a radio configuration is a configuration related to, for example, a modulating scheme, a coding method or the like. The MCE executes signaling to a base station, and does not execute signaling to a user equipment.

An MBMS GW (E-MBMS Gateway) 1302 is a logical element, or may be part of another network element. The MBMS GW is present between a BMSC (Broadcast Multicast Service Center) 1306 and a base station.

The BMSC 1306 carries the function of user service of the MBMS. Specific examples of the function include a security function, a synchronization protocol function and the like. The synchronization protocol is a method to carry additional information that enables the base station to perform radio frame transmission and a packet loss detection. The MBMS GW transmits or broadcasts an MBMS packet to each base station that transmits a service.

An M3 interface 1303 is defined as an interface between the MME 103 and an MCE 1301. The interface is an interface of a control plane. The M3 interface 1303 is for MBMS session control signaling on an E-RAB level. The M3 interface 1303 is not used to transmit radio configuration data.

An M2 interface 1304 is defined as an interface between the MCE 1301 and an eNB 102. The interface is an interface of a control plane. The M2 interface 1304 is used to transmit radio configuration data for session control signaling to a base station in a multi-cell transmission mode.

An M1 interface 1305 is defined as an interface between the MBMS GW 1302 and an eNB 102. The M1 interface 1305 is an interface of a user plane. The M1 interface 1305 is to transmit user data.

A configuring method of an MBMS subframe discussed in 3GPP is as follows.

An MCE notifies a base station being served thereby, by using MBMS scheduling information, of an MBSFN subframe configuration. A base station notifies a user equipment of the MBSFN subframe configuration by using system information (SIB2) (Non-Patent Document 2 and Non-Patent Document 9).

Thus, in the conventional technique, the MBSFN subframe configuration is notified from the MCE to the base station, also to the user equipment through the base station, and commonly used by the base stations and the user equipments that are served by the MCE.

On the other hand, loading states of the base stations differ depending on the base stations. That is, a low-load state (to also be referred to as low-load (Non-Patent Document 10)) or a no-load state (to also be referred to as a no-load (Non-Patent Document 10)) in which the base station desires to shift to an lower power consumption (energy saving) operation is a state that is independently generated in each of the base stations.

Thus, in the conventional technique, when lower power consumption of the base stations is realized by using the MBSFN subframe, there arise problems that MBSFN subframe cannot be configured depending on the states of the base stations, and an efficient energy saving operation is impossible. Lower power consumption of the base station by using the MBSFN subframe is described below. When the base station performs lower power consumption, by using an MBSFN subframe in which less frequent transmission of CRSs is performed than that of a normal subframe (a subframe except for the MBSFN subframe), a period of the power supply of the transmitter power amplifier is shortened.

Non-Patent Document 11 discloses that making CRS transmission less frequent to save a network power makes it possible to configure a larger number of MBSFN subframes. However, more specifically, what a main subject of the configuration is, whether or not a larger number of MBSFN subframes can be configured, and a concrete method of enabling a large number of MBSFN subframes to be configured are not disclosed.

A solution in the first embodiment is described below.

The MCE indicates a number of a subframe to be used as an MBSFN subframe to a base station. The MBSFN subframe indicated by the MCE may be referred to as an MBSFN subframe (MCE) hereinafter. A user equipment is notified of a number of the subframe to be used as the MBSFN subframe (MCE) through a base station.

The base station designates, in addition to the MBSFN subframe (MCE), a number of a subframe to be used as an MBSFN subframe by the base station itself. The MBSFN subframe additionally designated by the base station itself may be referred to as an MBSFN subframe (eNB) hereinafter. The number of subframe to be used as the MBSFN subframe (eNB) is selected from subframe numbers except for the number of the subframe to be used as the MBSFN subframe (MCE). A user equipment is notified of the number of the subframe to be used as the MBSFN subframe (eNB) from a base station.

As a result, the base station can use the MBSFN subframe (eNB) besides the MBSFN subframe (MCE). In particular, by using the MBSFN subframe (MCE) and the MBSFN subframe (eNB), a CRS can be transmitted to a user equipment. In the MBSFN subframes, the CRS is transmitted less frequently than normal, and transmissions of the CRS performed in the infrastructure can be less frequent, and a power consumption of the infrastructure can be reduced.

When the MBSFN subframe (eNB) is used in energy saving, the MBSFN subframe (eNB) may also be referred to as a subframe for energy saving. In addition, only when the base station performs the energy saving operation, MBSFN subframe (eNB) may be additionally designated.

For descriptive convenience, subsequently, a subframe recognized by a user equipment as a subframe using an MBSFN subframe configuration may also be referred to as an MBSFN subframe (UE). Two specific examples of a method of configuring an MBSFN subframe of a base station are disclosed below.

(1) The base station notifies the user equipment of a configuration of an MBSFN subframe which includes the MBSFN subframe (MCE) and the MBSFN subframe (eNB). That is, the base station notifies of an MBSFN subframe (UE) configuration. Broadcast information is used at a notification of the configuration. Accordingly, an effect of enabling notification of the MBSFN subframe configuration can be obtained to not only a user equipment that is being connected (CONNECTED) but also a user equipment that is idling (Idle). More specifically, SIB2 in the broadcast information is used. In this manner, the same configuring method as a conventional method for an MBSFN subframe is obtained, a mobile communication system that is good in downward compatibility can be advantageously established.

(2) The base station notifies the user equipment of an MBSFN subframe (eNB) configuration independently of an MBSFN subframe (MCE) configuration. Independently of the MBSFN subframe configuration in SIB2 of the conventional technique, the base station newly sets a configuration of a subframe for the MBSFN subframe (eNB) to the user equipment. Alternatively, in the MBSFN subframe configuration in the SIB2 in the conventional technique, an indicator that indicates whether or not the configuration is for energy saving may be newly set. That is, the user equipment recognizes the subframe configured as the MBSFN subframe (MCE) and the MBSFN subframe (eNB) as the MBSFN subframe (UE).

A specific example of a method of selecting an MBSFN subframe (eNB) of the base station is disclosed below.

The base station configures a subframe different from the MBSFN subframe (MCE) as the MBSFN subframe (eNB). The base station may transmit MBMS data by a resource except for the CRS in the MBSFN subframe (MCE). Thus, even though the MBSFN subframe (MCE) is used for energy saving, in the resource except for the CRS, the base station must turn on the power supply of the transmitter power amplifier, and a less energy saving effect is obtained. Thus, by using this method, a subframe different from the MBSFN subframe (MCE) is configured as a subframe for energy saving to make it possible to establish a mobile communication system having a great effect for lower power consumption.

A specific operation example using the first embodiment is described with reference to FIG. 14.

In this operation example, a case where the specific example (2) is used in a method of configuring an MBSFN subframe of a base station is disclosed. A case where the specific example (2) is used in a method of selecting an MBSFN subframe (eNB) of a base station is disclosed.

In Step ST1401, the MCE notifies a base station (eNB1) being served thereby of the MBSFN subframe (MCE).

In Step ST1402, the MCE notifies a base station (eNB2) being served thereby of the MBSFN subframe (MCE). The MCE notifies all the base stations that perform the same MBMS transmission and are served thereby of the same MBSFN subframe (MCE). It is to support the MBSFN transmission. In this operation example, for example, it is assumed that a second subframe (#1) and a third subframe (#2) are configured as MBSFN subframes (MCE).

In Step ST1403, the base station (eNB1) judges whether or not to configure the MBSFN subframe (eNB). In the case of judging that the MBSFN subframe is configured, the flow shifts to Step ST1404. In the case of judging that the MBSFN subframe is not configured, the judgment in Step ST1403 is repeated. When the MBSFN subframe is used in an energy saving operation, in Step ST1403, it may be judged whether or not the energy saving operation is executed. In this case, when it is judged that the energy saving operation is executed, the flow shifts to Step ST1404. When it is judged that the energy saving operation is not executed, the judgment in Step ST1403 is repeated.

In Step ST1404, the base station (eNB1) selects the MBSFN subframe (eNB). In this operation example, a subframe different from #1 and #2 serving as the MBSFN subframes (MCE) is selected as the MBSFN subframe (eNB). In this operation example, for example, it is assumed that a seventh subframe (#6) and an eighth subframe (#7) are configured as MBSFN subframes (eNB).

In Step ST1405, the base station (eNB1) notifies a user equipment being served thereby of an MBSFN subframe (MCE) configuration. In this operation example, #1 and #2 are notified as subframes reserved for the MBSFN in a downlink.

In Step ST1406, the base station (eNB1) notifies a user equipment being served thereby of an MBSFN subframe (eNB) configuration. In this operation example, #6 and #7 are notified as subframes reserved for the MBSFN in a downlink.

In Step ST1407, the user equipment operates using the MBSFN subframe (MCE) received in Step ST1405 and the MBSFN subframe (eNB) received in Step ST1406 as subframes reserved for the MBSFN in a downlink. In this operation example, the user equipment operates using #1, #2, #6 and #7 as subframes reserved for the MBSFN in a downlink. The MBSFN frame configuration is the same as that in the conceptual diagram shown in FIG. 3.

The first embodiment can achieve the effects below.

Other than the configuration notified by the MCE to the base station, the base station can configure the MBSFN subframe by itself for a user equipment being served thereby. In this manner, the MBSFN subframe can be configured according to operation states which differ depending on base stations, and frequency of transmitting a CRS can be adjusted. An efficient energy saving operation that is suitable for each base station can be performed. The above operations can contribute to lower power consumption on the network side.

Although, in the above description, "the number of a subframe to be used as the MBSFN subframe (eNB) is selected from subframe numbers except for the number of a subframe to be used as the MBSFN subframe (MCE)". However, "the number of a subframe to be used as the MBSFN subframe (eNB) may be selected to be completely equal to the number of the MBSFN subframe (MCE) or to partially overlap the number of the MBSFN subframe (MCE)".

In this case, a specific example of a method of configuring an MBSFN subframe of a base station may be as follows.

When the number of the subframe to be used as the MBSFN subframe (MCE) is completely equal to the number of the subframe to be used as the MBSFN subframe (eNB), (1) the base station notifies a user equipment of the MBSFN subframe (MCE) configuration. (2) The base station notifies the user equipment of an MBSFN subframe (eNB) configuration.

In this case, the following portion may be referred to as a subframe for energy saving. (1) An MBSFN subframe (eNB) including an overlapping portion between a number of a subframe to be used as the MBSFN subframe (eNB) and a number of the MBSFN subframe (MCE) may be referred to as a subframe for energy saving. (2) Among the subframes configured as the MBSFN subframe (eNB), a subframe that does not overlap the number of the MBSFN subframe (MCE) may be referred to as a subframe for energy saving.

Also, the MBSFN subframe (MCE) may be included in the subframes for energy saving or configured as a subframe for energy saving. In this case, even when the base station receives MBMS data (control data and user data) to perform transmission in the MBSFN subframe (MCE), the base station may perform an energy saving operation. The base station may turn off transmission at a transmission timing except for the timing of the CRS in a subframe configured as the subframe for energy saving. Even when the base station receives MBMS data from the MBMS GW, the BMSC or the MCE to transmit a subframe for energy saving, the power supply of the transmitter power amplifier may be turned off in a radio resource for transmitting the MBMS data. In this manner, even though the base station cannot configure the MBSFN subframe for a user equipment being served thereby by itself, energy saving using the MBSFN subframe can be performed according to operation states which differ depending on base stations.

In addition, information representing whether or not the MBSFN subframe (MCE) can be used for energy saving may be configured, and the MCE may notify a base station of the information. On the basis of the information, the MBSFN subframes used for energy saving may be determined.

The case where the MBSFN subframe (eNB) is configured when the base station is in an energy saving operation state has been described above. However, the present invention is not limited to the case, and an MBSFN subframe (eNB) is configured depending on an operation state of a base station to make it possible to reduce a power consumption.

The case where the MBSFN subframe having a CRS transmission performed less frequent than that of a normal subframe having a CRS transmission performed frequently has been described. However, the present invention is not limited to the case, by using a radio resource having a CRS transmission performed less frequently than normal, it becomes possible to reduce a power consumption.

First Modification of First Embodiment

In a case where the first embodiment is used, the following problem occurs.

In the conventional technique, neighbor cell information includes information representing whether or not the MBSFN is supported (Non-Patent Document 2). The information is referred to as a neighbor cell configuration (Neigh Cell Config), and is included in the SIB3 and SIB5 of broadcast information or a measurement object. The information is expressed by two bits. The meanings of combinations of the bits are as follows. A combination "00" represents that the same MBSFN subframe configuration as that in a serving cell is not present in all the neighbor cells.

In other words, the neighbor cells include a cell having an MBSFN subframe configuration different from that of a serving cell. A combination "10" represents that each of all the neighbor cells has the same MBSFN subframe configuration as that of a serving cell or the MBSFN subframe configuration included in the MBSFN subframe configuration of the serving cell. A combination "01" represents that the MBSFN subframe is not configured in each of all the neighbor cells. A combination "11" represents that uplink allocation or downlink allocation different from that in the serving cell is present in the neighbor cell in a TDD (Time Division Duplex) system.

When the base station can configure a subframe except for the MBSFN subframe (MCE) as the MBSFN subframe (eNB) by using the first embodiment, the MBSFN subframe actually used by the base station may be mismatched with information that is notified as neighbor cell information by the neighbor cell of the base station to a user equipment being served thereby.

In the conventional technique, the user equipment measures reception quality (RSRP) of a cell by using the CRS. The CRS resources of the MBSFN subframes are different from the CRS resources of a subframe except for the MBSFN subframe.

Thus, when the MBSFN subframe actually used by the base station is mismatched with the information that notified as neighbor cell information by a neighbor cell of the base station to the user equipment, an error occurs in a measurement result of the neighbor cell obtained by the user equipment. This is because the user equipment may measure an RSRP as a CRS for a symbol for which the CRS is not actually transmitted. Furthermore, this is because the user equipment may not perform RSRP measurement to the CRS for a symbol for which the CRS is actually transmitted. Due to the error of the measurement result, the user equipment may hand over a cell different from an original best cell or may reselect a cell. In this manner, effective utilization of a radio resource cannot be provided, or a uselessly high uplink transmission power is used to disadvantageously increase uplink interference.

A specific example that causes problems is described with reference to FIG. 15. The same reference numerals as those of FIGS. 1 and 13 denote the corresponding portions, which are not described.

Location is described first. There are an eNB1 (102-1), an eNB2 (102-2) and eNB3 (102-3) that are served by the MCE 1301. The MCE 1301 and the eNB1 (102-1) are connected by an M2 interface 1304-1, the MCE 1301 and the eNB2 (102-2) are connected by an M2 interface 1304-2, and the MCE 1301 and the eNB3 (102-3) are connected by an M2 interface 1304-3. There is a user equipment 1 (101-1) being served by the eNB1 (102-1), there is a user equipment 2 (101-2) being served by the eNB2 (102-2), and there is a user equipment 3 (101-3) being served by the eNB3 (102-3). It is assumed that there are the eNB2 (101-2) and the eNB3 (101-3) as neighbor cells of the eNB1 (101-1). It is assumed that there are the eNB1 (101-1) and the eNB3 (101-3) as neighbor cells of the eNB2 (101-2). It is assumed that there are the eNB1 (101-1) and the eNB2 (101-2) as neighbor cells of the eNB3 (101-3).

A specific example that causes problems is described with reference to FIGS. 14 and 15. It is assumed that the eNB3 (101-3) in FIG. 15 is omitted in FIG. 14. The MCE 1301 notifies the eNB1 (102-1), the eNB2 (102-2) and the eNB3 (102-3) serving as base stations being served thereby of the MBSFN subframe (MCE) (corresponding to Step ST1401 and Step ST1402 in FIG. 14). For example, it is assumed that a second subframe (#1) and a third subframe (#2) are configured as MBSFN subframes (MCE). It is assumed that the eNB1 (102-1) executes an energy saving operation to configure the MBSFN subframe (eNB) (corresponding to Step ST1404 in FIG. 14). In this case, a subframe different from #1 and #2 serving as the MBSFN subframes (MCE) are configured as the MBSFN subframe (eNB). For example, it is assumed that a seventh subframe (#6) and an eighth subframe (#7) are configured as MBSFN subframes (eNB).

On the other hand, the eNB2 (102-2) having the eNB1 (102-1) as a neighbor cell has no way of knowing the MBSFN subframe (eNB) of the eNB1 (102-1). Thus, the eNB2 (102-2) may notify the user equipment 2 (101-2) being served thereby of signaling bits "10" as information (a type of neighbor cell information) representing whether or not the MBSFN is supported. The signaling bits "10" represents that each of all the neighbor cells (eNB1 and eNB3) has the same MBSFN subframe configuration as that of own cell (eNB2) or the MBSFN subframe configuration included in the MBSFN subframe configuration of own cell. The user equipment 2 (101-2) that receives the information (a type of neighbor cell information) representing whether or not the MBSFN is supported measures a reference symbol received power (RSRP) on the assumption that the eNB1 (101-1) and the eNB3 (101-3) have, as neighbor cells, the same MBSFN subframe configuration as that of a serving cell or an MBSFN subframe configuration included in the MBSFN subframe configuration of the serving cell. More specifically, the user equipment 2 measures RSRPs for #1 and #2 serving as the MBSFN subframes (MCE) notified from the MCE by using one symbol of CRS, and measures an RSRP for a subframe except for the MBSFN subframe (MCE) by using, for example, four symbols of CRS. On the other hand, the eNB1 (101-1) performs an operation for #1, #2, #6 and #7 by using the MBSFN subframe configuration. That is, the eNB1 (101-1) transmits one symbol of CRS for #1, #2, #6 and #7, and transmits four symbols of CRS to other subframes.

As described above, the following error occurs in measurement of the eNB1 in neighbor cell measurement performed by the user equipment 2. With respect to the subframes #6 and #7, the user equipment 2 includes three symbols for which the eNB1 does not actually transmit a CRS in measurement objects of the RSRP. Thus, the RSRP value of the eNB1 in the user equipment 2 may be lower than a real value. In this manner, even in a circumstance in which the best cell is the eNB1 for the user equipment 2, a cell other than the eNB1 may be reselected or handed over. In this manner, effective utilization of a radio resource cannot be provided, or a uselessly high uplink transmission power is used to disadvantageously increase uplink interference.

A solution in the first modification of the first embodiment is described below. Parts different from the solution of the first embodiment are mainly described below. Undescribed parts are the same as those in the first embodiment.

The base station notifies neighbor cells of an MBSFN subframe configuration of own cell. Neighbor cell information is updated on the basis of the information and the updated information is notified to the user equipment being served by the base station the configuration notified. The user equipment executes neighbor cell measurement by using the neighbor cell information.

Notification to neighbor cells may be executed only when the MBSFN subframe (eNB) is configured. The notification may be performed only when a subframe different from the MBSFN subframe (MCE) is configured as the MBSFN subframe (eNB).

Six specific examples of the MBSFN subframe configuration of which the neighbor cells are notified are disclosed below. (1) An MBSFN subframe (UE) obtained when the specific example (1) of a method of configuring an MBSFN subframe of a base station is used in the first embodiment. (2) An MBSFN subframe (eNB) obtained when the specific example (2) of a method of configuring an MBSFN subframe of a base station is used in the first embodiment. The MBSFN subframe (MCE) may also be notified. (3) Among the MBSFN subframes (eNB), a subframe different from the MBSFN subframe (MCE). (4) information representing whether or not the MBSFN subframe is configured independently of a notification of the MCE. That is, information representing whether or not a subframe different from that of a notification of the MCE is configured as the MBSFN subframe (eNB). (5) Information representing that the MBSFN subframe is configured independently of a notification of the MCE. That is, information representing that the MBSFN subframe (eNB) is configured independently of a notification of the MCE. (6) Information representing that the MBSFN subframe is not configured independently of a notification of the MCE. That is, information representing that a subframe different from that of a notification of the MCE is not configured as the MBSFN subframe (eNB).

Three specific examples of an interface used for notification to the neighbor cells are disclosed below. (1) The base station performs notification to the neighbor cells by using the X2 interface. (2) The base station performs notification to the MME by using the S1 interface. The MME performs notification to the neighbor cells of the base station by using the S1 interface. (3) The base station performs notification to the MCE by using the M2 interface. The MCE performs notification to the MME by using the M3 interface. The MME performs notification to the neighbor cells of the base station by using the S1 interface.

Five specific examples of a method of selecting a neighbor cell are disclosed below. (1) A determination is made based on a measurement result of a neighbor radio environment of the base station. As a specific example of the neighbor radio environment, a measurement result of a neighbor cell is given. As specific examples of a measurement result of a neighbor cell, reception quality, a received power, a path loss and the like are given. When, in the measurement result of the neighbor radio environment, reception quality or a received power of a certain base station is a certain threshold value or more (or larger than the threshold value), the base station selects the certain base station as neighbor cell that performs notification of the MBSFN subframe configuration of own cell. When, in the measurement result of the neighbor radio environment, a path loss of a certain base station is smaller than a certain threshold value (or equal to the threshold value or less), the base station selects the certain base station as neighbor cell that performs notification of the MBSFN subframe configuration of own cell. (2) A judgment is made by a measurement report from a user equipment being served by the base station. For example, according to the measurement report, a cell reported to be good in reception quality by own cell is selected as a neighbor cell that performs notification of the MBSFN subframe configuration of own cell. The good reception quality includes, for example, a case where a received power is higher than that of own cell, a case where a path loss is smaller than that of own cell, and the like. (3) A cell that has been selected by a handover target (to be also referred to as a target cell) is selected as a neighbor cell that performs notification of the MBSFN subframe configuration of own cell. (4) A cell that has been selected by a cell reselect target is selected as a neighbor cell that performs notification of the MBSFN subframe configuration of own cell. (5) A base station including the corresponding base station in a neighbor cell is selected.

Two specific examples of a main body that updates neighbor cell information are disclosed below. (1) The base station that receives the notification updates the neighbor cell information. This example has a high affinity to the specific example (1) of the interface used for notification to the neighbor cell. This is because the notification is directly given to the base station without through the MME. (2) The MME that receives the notification updates neighbor cell information of a base station having the base station that transmits the notification as a neighbor cell. This example has a high affinity to the specific examples (2) and (3) of the interface used for notification to the neighbor cell. This is because the notification is performed through the MME.

A specific operation example using the first modification of the first embodiment is described with reference to FIG. 16. The same reference numerals as those of FIG. 14 denote the corresponding portions, which are not described. Location is the same as the location described with reference to FIG. 15, which are not described.

In this operation example, a case where the specific example (3) is used in the MBSFN subframe configuration of which neighbor cells are notified is disclosed. A case where the specific example (2) is used in an interface used in notification to the neighbor cells are disclosed below. A case where a specific example (5) is used in the method of selecting a neighbor cell is disclosed below. A case where the specific example (2) is used in a main body that updates neighbor cell information is disclosed below.

In Step ST1601, the base station (eNB1) notifies the MME of a subframe different from the MBSFN subframe (MCE) of the MBSFN subframes (eNB) as information of the MBSFN subframe configuration. In this operation example, the MBSFN subframe (MCE) are #1 and #2. The MBSFN subframes (eNB) are #6 and #7. Thus, pieces of information of which the base station (eNB1) notifies the MME become #6 and #7. The S1 interface is used for the notification.

In Step ST1602, the MME selects a neighbor cell that performs notification of the MBSFN subframe configuration of the base station (eNB1). A base station including the base station (eNB1) in a neighbor cell is selected. In this operation example, the eNB1 (101-1) and the eNB3 (101-3) are present as neighbor cells of the eNB2 (101-2), and the eNB1 (101-1) and the eNB2 (101-2) are present as neighbor cells of the eNB3 (101-3). Thus, in Step ST1602, the MME selects the eNB2 (101-2) and the eNB3 (101-3). Subsequently, the eNB3 (101-3) is considered to be equal to the eNB2 (101-2), which is not described.

In Step ST1603, the MME updates the neighbor cell information of the base station selected in Step ST1602. Information representing whether or not the MBSFN serving as the neighbor cell information is supported is updated. The MME may perform determination based on the information received in Step ST1601. In Step ST1601, the MME can judge that the eNB1 configures a subframe different from the MBSFN subframe (MCE) as the MBSFN subframe configuration. In this operation example, the MBSFN subframe configuration of the eNB2 (101-2) is the MBSFN subframe (MCE) received in Step ST1401. Thus, the subframes become #1 and #2. Thus, the information (neighbor cell information of the eNB2) representing whether or not the MBSFN is supported is changed (updated) by the MME into information representing that the same MBSFN subframe configuration as that of the serving cell (eNB2) is not included in all the neighbor cells. If a conventional technique is used as the neighbor cell information, the information is changed (updated) into signaling bits "00".

In Step ST1604, the MME notifies the base station selected in Step ST1602 of the neighbor cell information updated in Step ST1603. The S1 interface may be used for the notification.

In Step ST1605, the eNB2 (103-2) that receives the updated neighbor cell information notifies the user equipment 2 being served thereby of the updated neighbor cell information.

In Step ST1607, the user equipment 2 that receives the updated neighbor cell information performs neighbor cell measurement by using the updated neighbor cell information. As a specific example, the user equipment 2 performs the neighbor cell measurement on the assumption that a base station that performs an MBSFN subframe configuration different from that of the serving cell (eNB2) is included in the neighbor cells.

The first modification of the first embodiment can achieve the effects below in addition to those of the first embodiment. In addition to the configuration notified by the MCE to the base station, even when the base station can configure the MBSFN subframe for a user equipment being served thereby by itself, neighbor cell information notified from the neighbor cell of the base station can be updated. Thus, in a user equipment being served by a neighbor cell of the base station that configures the MBSFN subframe by itself, in neighbor cell measurement that targets the base station that configures the MBSFN subframe by itself, an RSRP measurement error caused by configuring the MBSFN subframe by itself does not occur. In this manner, the user equipment can be prevented from being handed over to or reselecting a cell different from the original best cell. Thus, a useless radio resource can be prevented from occurring, and a uselessly high uplink transmission power can be prevented from being used.

Second Modification of First Embodiment

In a case where the first embodiment is used, a new problem occurs as follows.

Since data that must be transmitted per unit time and is related to an MBMS increases, it is discussed that the MCE changes configurations to increase the MBSFN subframe (MCE).

By increasing MBMS data, configurations are changed to increase the MBSFN subframe (MCE) configured in the MCE. Accordingly, if any device is not used, MBSFN subframe configuration that is notified from the base station being served by the MCE to the user equipment being served by the base station must be changed. In this manner, a change of system information occurs. Thus, the base station notifies the user equipment of a system information change (systemInfoModification) by paging (Non-Patent Document 2). The user equipment that receives the system information change by paging must receive the updated system information even though the user equipment is being in, for example, an idle state (Non-Patent Document 2). Lower power consumption is provided such that the user equipment being in an idle state performs intermittent reception. By interrupting the intermittent reception for receiving system information, an increase in power consumption of the user equipment occurs.

Figure 17:
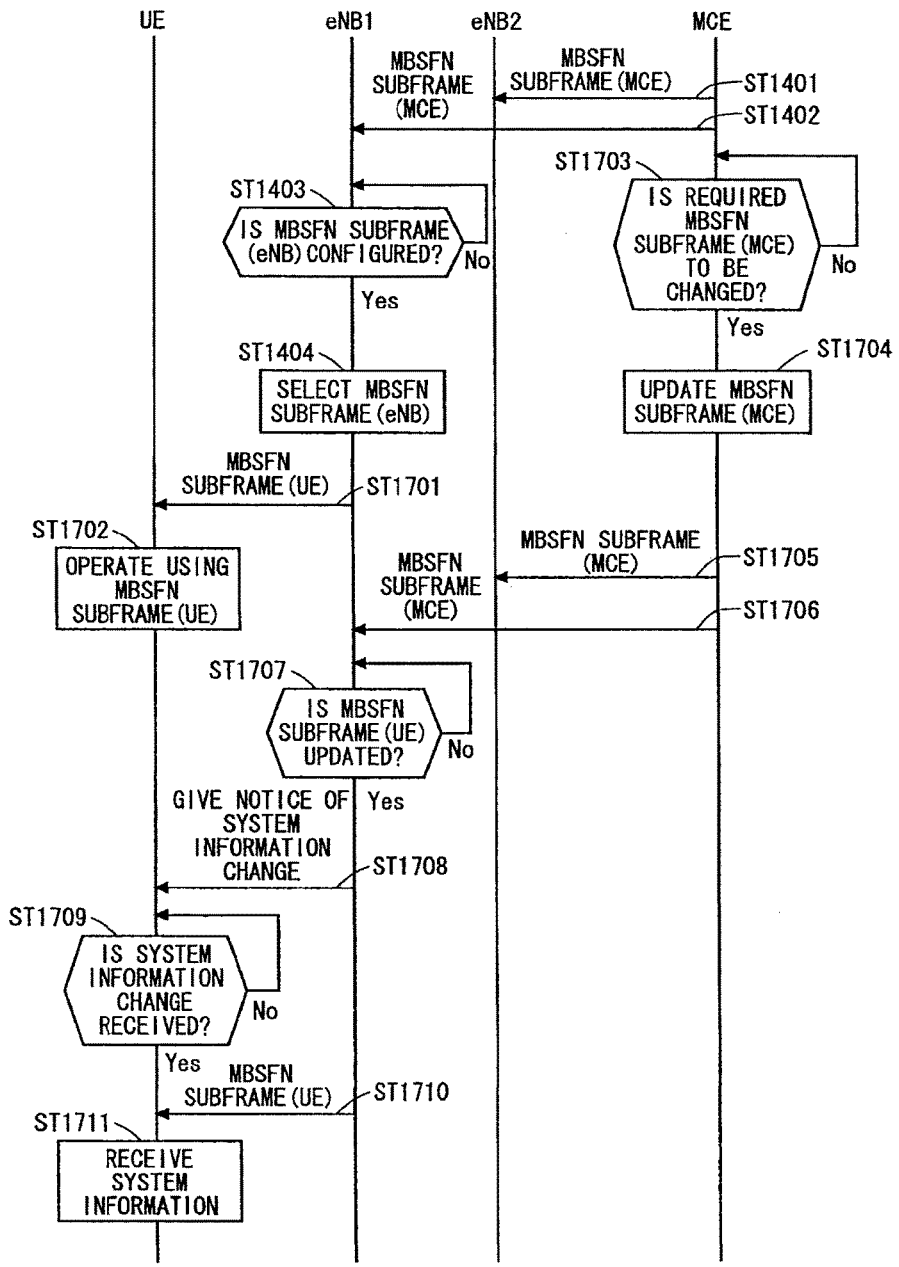
FIG. 17 is a diagram illustrating a sequence of a mobile communication system for explaining a problem of a second modification of the first embodiment.

A specific example that causes problems is described with reference to FIG. 17. The same reference numerals as those of FIG. 14 denote the corresponding portions, which are not described.

In this specific example, as a method of configuring an MBSFN subframe of a base station in the first embodiment, an MBSFN subframe including the MBSFN subframe (MCE) and the MBSFN subframe (eNB) are configured for the user equipment. That is, a case where the base station employs the specific example (1) that configures the MBSFN subframe (UE) is described below.

In Step ST1701, the base station (eNB1) notifies the user equipment being served thereby of the MBSFN subframe (MCE) received in Step ST1402 and the MBSFN subframe (UE) including the MBSFN subframe (eNB) selected in Step ST1404. In this specific example, #1, #2, #6 and #7 are notified as subframes reserved for the MBSFN in a downlink.

In Step ST1702, the user equipment operates using the MBSFN subframe (UE) received in Step ST1701 as a subframe reserved for the MBSFN in a downlink. In this specific example, the user equipment operates using #1, #2, #6 and #7 as subframes reserved for the MBSFN in a downlink. The MBSFN frame is configured like the MBSFN frame in the conceptual diagram shown in FIG. 3.

In Step ST1703, the MCE judges whether or not the configuration of the MBSFN subframe (MCE) must be changed. When the change is required, the flow shifts to Step ST1704. When the change is not required, the judgment in Step ST1703 is repeated. In addition to this, it may be judged whether or not the MBSFN subframe (MCE) must be increased. In this case, when the increase is required, the flow shifts to Step ST1704. When the increase is not required, the judgment in Step ST1703 is repeated.

In Step ST1704, the MCE updates the MBSFN subframe (MCE). In this specific example, it is assumed that #1, #2 and #8 are selected as the MBSFN subframes (MCE). More specifically, it is assumed that #8 is added as the MBSFN subframe (MCE).

In Step ST1705, the MCE notifies the base station (eNB2) being served thereby of the updated MBSFN subframe (MCE) updated in Step ST1704.

In Step ST1706, the MCE notifies the base station (eNB1) being served thereby of the updated MBSFN subframe (MCE) updated in Step ST1704. Subsequently, the eNB2 is considered to be equal to the eNB1, which is not described.

In Step ST1707, the base station (eNB1) judges whether or not the MBSFN subframe (UE) must be updated. When the updating is required, the flow shifts to Step ST1708. When the updating is not required, the judgment in Step ST1707 is repeated. In this specific example, subframes that are notified to the user equipment being served by the base station in Step ST1701 and are reserved for the MBSFN in a downlink are #1, #2, #6 and #7. On the other hand, in Step ST1706, #1, #2 and #8 are received as the MBSFN subframe (MCE) by the MCE. Thus, as the MBSFN subframe (MCE) and the MBSFN subframe (UE) including the MBSFN subframe (eNB) selected in Step ST1404, #1, #2, #6, #7 and "#8" are given. Thus, in this specific example, in Step ST1707, the base station (eNB1) judges that the MBSFN subframe (UE) must be updated.

In Step ST1708, the base station (eNB1), by using paging for the user equipment being served thereby, performs system information change notification to the user equipment being served thereby.

In Step ST1709, the user equipment judges whether or not the system information change notification is received. When the system information change notification is received, the flow shifts to Step ST1711. When the system information change notification is not received, the judgment in Step ST1709 is repeated. In this specific example, since the system information change notification is performed in Step ST1708, it is judged in Step ST1709 that the system information change notification is received, the flow shifts to Step ST1711.

In Step ST1710, the base station (eNB1) notifies the user equipment being served thereby of the MBSFN subframe (MCE) received in Step ST1706 and the MBSFN subframe (UE) including the MBSFN subframe (eNB) selected in Step ST1404. In this specific example, #1, #2, #6, #7 and "#8" are notified as subframes reserved for the MBSFN in a downlink.

The user equipment in Step ST1711 receives system information. This reception is executed even though the user equipment is being in, for example, an idle state.

As described above, if any device is not used, a system information change of the base station is performed each time an amount of data of MBMS varies, and intermittent reception performed by the user equipment to receive the updated system information is interrupted. In this manner, an increase in power consumption of the user equipment occurs.

A solution in the second modification of the first embodiment is described below. Parts different from the solution of the first embodiment are mainly described below. Undescribed parts are the same as those in the first embodiment.

The base station notifies the MCE of an MBSFN subframe configuration of own cell. When the MCE updates the MBSFN subframe configuration, the MCE performs adjustment by using the information.

Notification to the MCE may be executed only when the MBSFN subframe (eNB) is configured. The notification may be performed only when a subframe different from the MBSFN subframe (MCE) is configured as the MBSFN subframe (eNB).

Three specific examples of the MBSFN subframe configuration of which the MCE notifies are disclosed below. (1) An MBSFN subframe (UE) obtained when the specific example (1) of a method of configuring an MBSFN subframe of a base station is used in the first embodiment. (2) An MBSFN subframe (eNB) obtained when the specific example (2) of a method of configuring an MBSFN subframe of a base station is used in the first embodiment. The MBSFN subframe (MCE) may also be notified. (3) Among the MBSFN subframes (eNB), a subframe different from the MBSFN subframe (MCE).

Two specific examples of adjustment performed by the MCE are disclosed below. (1) When the MCE increases the MBSFN subframe (MCE), it is judged whether or not, in the MBSFN subframe configuration of the base station that receives notification from the base station, a subframe except for a subframe currently used as the MBSFN subframe (MCE) is present. When the subframe is present, the subframe is selected as an MBSFN subframe (MCE) that increases the subframe. (2) When the MCE reduces the MBSFN subframe (MCE), it is judged whether or not, in the MBSFN subframe (eNB) that receives notification from the base station, a subframe currently used as the MBSFN subframe (MCE) is present. When the subframe is present, the subframe is selected as an MBSFN subframe (MCE) that reduces the subframe. The adjustment may be similarly performed between a plurality of base stations being served by the MCE.

Three specific examples of a notification timing from the base station to the MCE are disclosed below. (1) Notification is periodically performed. (2) When the MBSFN subframe configuration in the base station is changed, the notification is performed. Alternatively, when the MBSFN subframe (eNB) is changed, the notification is performed.

As an example of an interface used for notification from the base station to the MCE, an M2 interface between the base station and the MCE is given. (3) When an MBSFN subframe (eNB) notification request is received from the MCE, the notification is performed. In order to recognize a specific subframe that is configured by the base station being served by the MCE as the MBSFN subframe (eNB), the MCE may notify the base station of the MBSFN subframe (eNB) notification request prior to the change of the MBSFN subframe (MCE). The base station that receives the MBSFN subframe (eNB) notification request from the MCE notifies the MCE of the MBSFN subframe (eNB).

Figure 18:
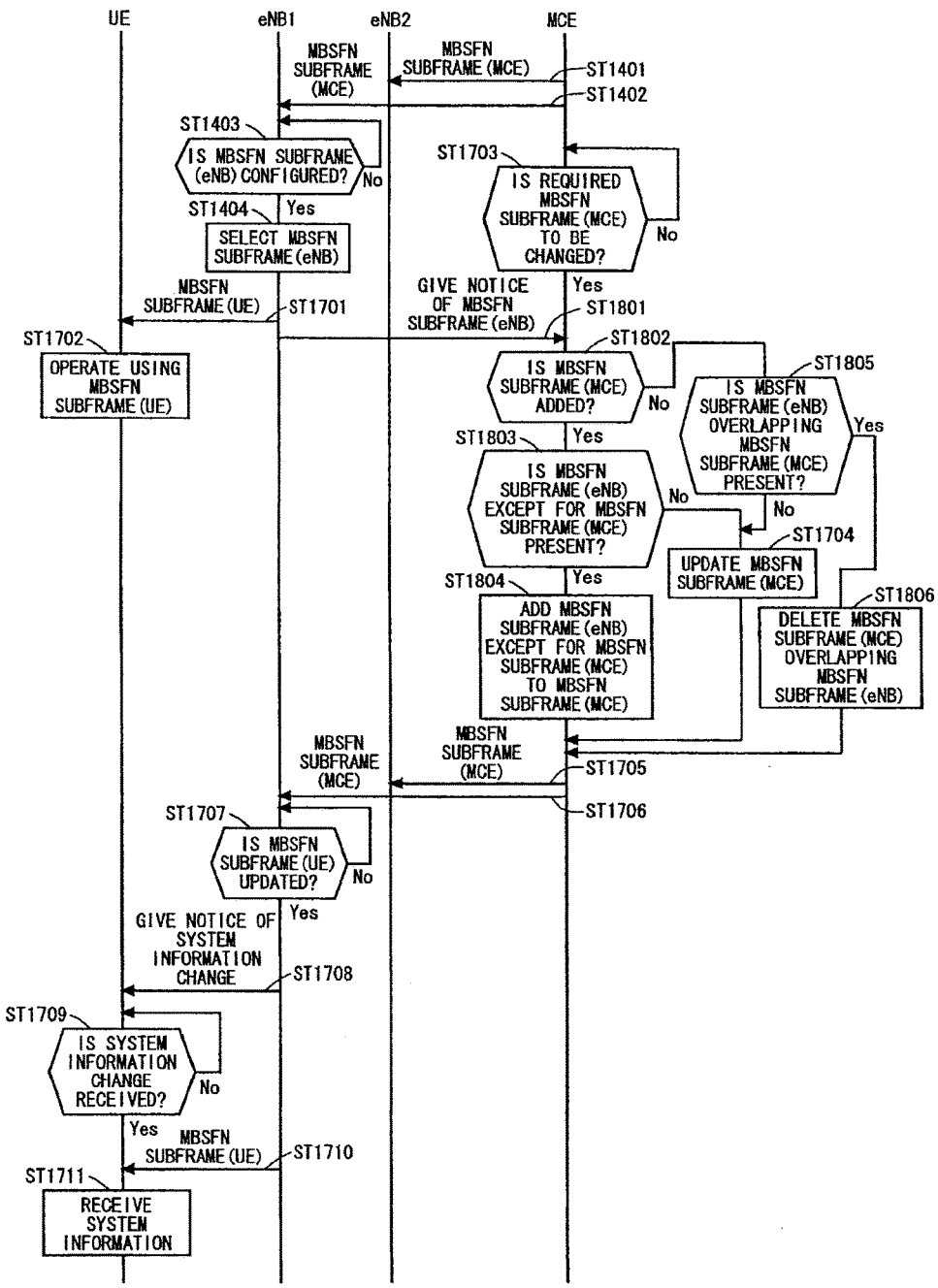
FIG. 18 is a diagram illustrating a sequence of a mobile communication system when a solution of the second modification of the first embodiment is used.

A specific operation example using the second modification of the first embodiment is described with reference to FIG. 18. The same reference numerals as those of FIG. 14 and FIG. 17 denote the corresponding portions, which are not described.

In this operation example, a case where the specific example (2) is used in the MBSFN subframe configuration of which the MCE is notified is disclosed. A case where the base station (2) is used at a notification timing from the base station to the MCE is disclosed below.

In Step ST1801, the base station (eNB1) notifies the MCE of the MBSFN subframe (eNB) as information of the MBSFN subframe configuration. In this operation example, the MBSFN subframe (MCE) notified in Step ST1401 and Step ST1402 are defined as #1 and #2. The MBSFN subframes (eNB) selected in Step ST1404 are defined as #2, #6 and #7. Thus, pieces of information given from the base station (eNB1) to the MCE in Step ST1801 are #2, #6 and #7. The notification uses the M2 interface.

In Step ST1802, the MCE judges whether or not the MBSFN subframe (MCE) must be added. When the addition is required, the flow shifts to Step ST1803. When the addition is not required, the flow shifts to Step ST1805.

Subsequently, a case where the MCE increases the MBSFN subframe (MCE) is described first. More specifically, in Step ST1802, since the MCE judges that the MBSFN subframe (MCE) must be added, the flow shifts to Step ST1803.

In Step ST1803, the MCE judges whether or not, in the MBSFN subframe (eNB) of a base station that receives the notification from the base station, a subframe except for the subframe currently used as the MBSFN subframe (MCE) is present. When the subframe is present, the flow shifts to Step ST1804. When the subframe is not present, the flow shifts to Step ST1704. In Step ST1704, the MCE updates the MBSFN subframe (MCE). In this operation example, as subframes except for the subframe currently used as the MBSFN subframe (MCE) in the MBSFN subframe (eNB), #6 and #7 are present. Thus, in Step ST1803, it is judged that the subframe is present, and the flow shifts to Step ST1804.

In Step ST1804, the MCE selects, as a subframe added to the MBSFN subframe (MCE), a subframe except for the subframe currently used as the MBSFN subframe (MCE) in the MBSFN subframe (eNB). In this operation example, it is assumed that #6 is selected.

Even though the MBSFN subframe (MCE) is updated by performing the process, the MBSFN subframe (UE) need not be updated in the base station (eNB1). Thus, in Step ST1707, it is judged that the MBSFN subframe (UE) need not be updated. In this manner, a system information change does not occur.

In Step ST1706, the MCE notifies the base station (eNB1) being served thereby of the updated MBSFN subframe (MCE) updated in Step ST1704 or in Step ST1804. In this operation example, as the MBSFN subframes (MCE), notification of #1, #2 and #6 is performed.

In Step ST1707, the base station (eNB1) judges whether or not the MBSFN subframe (UE) must be updated. In this operation example, subframes that are notified to the user equipment being served by the base station in Step ST1701 and are reserved for the MBSFN in a downlink are #1, #2, #6 and #7. On the other hand, in Step ST1706, #1, #2 and #6 are received as the MBSFN subframe (MCE) by the MCE. Thus, as the MBSFN subframe (MCE) and the MBSFN subframe (UE) including the MBSFN subframe (eNB) (#2, #6 and #7) selected in Step ST1404, #1, #2, #6 and #7 are given. Thus, it is judged that the MBSFN subframe (UE) need not be updated. In this manner, a system information change does not occur, and shift to Step ST1708 does not occur.

A case where the MCE reduces the MBSFN subframe (MCE) is described below. More specifically, in Step ST1802, since the MCE judges that the MBSFN subframe (MCE) need not be added, the flow shifts to Step ST1805.

In Step ST1805, the MCE judges whether or not, in the MBSFN subframe (eNB) of a base station that receives the notification from the base station, a subframe currently used as the MBSFN subframe (MCE) is present. When the subframe is present, the flow shifts to Step ST1806. When the subframe is not present, the flow shifts to Step ST1704. In Step ST1704, the MCE updates the MBSFN subframe (MCE). In this operation example, as a subframe currently used as the MBSFN subframe (MCE) in the MBSFN subframe (eNB), #2 is present. Thus, in Step ST1805, it is judged that the subframe is present, and the flow shifts to Step ST1806.

In Step ST1806, the MCE selects, as a subframe deleted from the MBSFN subframe (MCE), a subframe currently used as the MBSFN subframe (MCE) in the MBSFN subframe (eNB). In this operation example, it is assumed that #2 is selected. Even though the MBSFN subframe (MCE) is updated by performing the process, the MBSFN subframe (UE) need not be updated in the base station (eNB1). Thus, in Step ST1707, it is judged that the MBSFN subframe (UE) need not be updated. In this manner, a system information change does not occur.

In Step ST1706, the MCE notifies the base station (eNB1) being served thereby of the updated MBSFN subframe (MCE) updated in Step ST1704 or in Step ST1806. In this operation example, as the MBSFN subframes (MCE), notification of #1 and #6 is performed.

In Step ST1707, the base station (eNB1) judges whether or not the MBSFN subframe (UE) must be updated. In this operation example, subframes that are notified to the user equipment being served by the base station in Step ST1701 and are reserved for the MBSFN in a downlink are #1, #2, #6 and #7. On the other hand, in Step ST1706, #1 and #6 are received as the MBSFN subframe (MCE) by the MCE. Thus, as the MBSFN subframe (MCE) and the MBSFN subframe (UE) including the MBSFN subframe (eNB) (#2, #6 and #7) selected in Step ST1404, #1, #2, #6 and #7 are given. Thus, it is judged that the MBSFN subframe (UE) need not be updated. In this manner, a system information change does not occur, and shift to Step ST1708 does not occur.

Note that the number of MBSFN subframes to be updated is not limited to one and may be two or more.

In the modification, an example obtained by combining the first embodiment to the modification is mainly described. However, a combination between the first modification of the first embodiment and the modification can be used.

The second modification of the first embodiment can achieve the effects below in addition to those of the first embodiment.

Even when addition of the MBSFN subframe (MCE) is required by increasing data of the MBMS, the MCE performs adjustment to make it possible to minimize a change of definition (MBSFN subframe Configuration) of a subframe reserved for the MBSFN using broadcast information from a base station being served by the MCE to a user equipment. In this manner, a change of system information can be suppressed. Thus, reception of the system information with discontinuous reception interruption of the user equipment can be suppressed. In this manner, an increase in power consumption of the user equipment can be prevented.

Third Modification of First Embodiment

In a case where the second modification of the first embodiment is used, the following problem occurs.

The MBSFN subframe configuration notified from the base station to the MCE may not include a subframe except for the subframe currently used in the MBSFN subframe (MCE). In this case, adjustment cannot be performed by the MCE disclosed in the second modification of the first embodiment, and a problem of the second modification of the first embodiment occurs again.

When the MBSFN subframe (eNB) is configured for each base stations, and a plurality of base stations are served by the MCE, the problem more dominantly appears. This is because, when a large number of MBSFN subframe configurations notified from a large number of base stations being served by the MCE to the MCE do not include a subframe except for a subframe currently used as the MBSFN subframe (MCE), the effects of adjustment obtained by the MCE disclosed in the second modification of the first embodiment do not influence all the base stations.

A solution in the third modification of the first embodiment is described below. Parts different from the solution of the first embodiment are mainly described below. Undescribed parts are the same as those in the first embodiment.

The MCE notifies a base station being served thereby of information of a priority order of a subframe configured as the MBSFN subframe (MCE). When the base station that receives the information executes or changes a configuration of the MBSFN subframe (eNB), adjustment is performed by using the information of the priority order. The adjustment may be commonly performed by a plurality of base stations being served by the MCE.

In the conventional technique, a maximum of six MBSFN subframes can be configured in one radio frame. Subframes that can be configured as MBSFN subframes are a second subframe (#1), a third subframe (#2), a fourth subframe (#3), a seventh subframe (#6), an eighth subframe (#7) and a ninth subframe (#8) (Non-Patent Document 2). A specific example of information of a priority order when the third modification of the first embodiment in the conventional technique is shown in FIG. 19.

FIG. 19 shows a correspondence between a subframe configured as the MBSFN subframe (MCE) and a priority order. As the MBSFN subframe (MCE), a subframe configured to have the first priority order is the second subframe (#1). As the MBSFN subframe (MCE), a subframe set to have the second priority order is the third subframe (#2). As the MBSFN subframe (MCE), a subframe set to have the third priority order is the seventh subframe (#6). As the MBSFN subframe (MCE), a subframe set to have the fourth priority order is the eighth subframe (#7). As the MBSFN subframe (MCE), a subframe set to have the fifth priority order is the fourth subframe (#3). As the MBSFN subframe (MCE), a subframe set to have the sixth priority order is the ninth subframe (#8). A plurality of subframes may have the same priority order.

The priority order may be statically determined or may be semi-statically determined on the network side. For example, two notifying methods to a base station being served by the MCE when the priority order is semi-statically determined in the MCE are disclosed below. (1) The MCE performs notification to the base station being served thereby by using the M2 interface. (2) The MCE notifies the MME of the priority order by using an M3 interface, and the MME notifies the base station of the priority order by using the S1 interface.

Two specific examples of adjustment performed by the base station are disclosed below. (1) When the base station increases the MBSFN subframe (eNB), in a subframe except for a subframe currently used in the MBSFN subframe (eNB), a subframe having the highest priority order received from the MCE is preferentially configured. When the base station is free from a load, or when the base station is in a low-loading state, the MBSFN subframe (eNB) may be increased. (2) When the base station reduces the MBSFN subframe (eNB), in the subframe currently used as the MBSFN subframe (eNB), a subframe having the lowest priority order received from the MCE is preferentially configured. When a load is generated in a state in which the base station is free from a load, or when the base station is in a high-load state, the MBSFN subframe (eNB) may be reduced.

A specific operation example using the third modification of the first embodiment is described with reference to FIG. 20. The same reference numerals as those of FIG. 14, FIG. 17 and FIG. 18 denote the corresponding portions, which are not described.

In this operation example, a priority order of a subframe set as the MBSFN subframe (MCE) is semi-statically determined, and a case where the MCE performs notification to the base station being served thereby by using the M2 interface is disclosed below.

In Step ST2001, the MCE notifies a base station (eNB1) being served thereby of a priority order of a subframe set as the MBSFN subframe (MCE). In this operation example, it is assumed that notification of a priority order shown in FIG. 19 is performed.

In Step ST2002, the MCE notifies a base station (eNB2) being served thereby of a priority order of a subframe set as the MBSFN subframe (MCE). The MCE may notify all the base stations that perform the same MBMS transmission and are served thereby of the priority order of the subframes set as the same MBSFN subframe (MCE).

In this operation example, the MBSFN subframe (MCE) notified in Step ST1401 and Step ST1402 are defined as #1 and #2. By the base station (eNB1), it is assumed that #1 and #2 have been already selected as the MBSFN subframes (eNB). More specifically, the MBSFN subframes (UE) given from the base station (eNB1) to the user equipment being served thereby are #1 and #2.

In Step ST2003, the base station (eNB1) judges whether or not the MBSFN subframe (eNB) must be added. When the addition is required, the flow shifts to Step ST2004. When the addition is not required, the flow shifts to Step ST2005.

Subsequently, a case where the base station (eNB1) increases the MBSFN subframe (eNB) is described first. More specifically, in Step ST2003, since the base station (eNB1) judges that the MBSFN subframe (eNB) must be added, the flow shifts to Step ST2004.

In Step ST2004, the base station (eNB1) selects, from subframes except for the subframe currently used as the MBSFN subframe (eNB), a subframe that is configured as the MBSFN subframe (MCE) received in Step ST2002 and has the highest priority order of the subframes as the MBSFN subframe (eNB). In this operation example, the MBSFN subframes currently used as the MBSFN subframes (eNB) are #1 and #2. Thus, of subframes except for the subframe currently used as the MBSFN subframe (eNB), a subframe that is configured as the MBSFN subframe (MCE) and has the highest priority order of the subframes is "#6" (see FIG. 19).

In this manner, the MBSFN subframes (UE) "#1 and #2" are updated to "#1, #2 and #6". Thus, in Step ST1707, the base station (eNB1) judges that the MBSFN subframe (UE) must be updated, and processes subsequent to Step ST1708 occur.

On the other hand, in Step ST1802, the MCE judges whether or not the MBSFN subframe (MCE) must be added. When the addition is required, the flow shifts to Step ST2006. When the addition is not required, the flow shifts to Step ST2007. In this case, it is assumed that, for example, the MCE judges that the MBSFN subframe (MCE) must be added.

In Step ST2006, the MCE selects, from subframes except for the subframe currently used as the MBSFN subframe (MCE), a subframe that is configured as the MBSFN subframe (MCE) and has the highest priority order of the subframes as the MBSFN subframe (MCE). In this operation example, the MBSFN subframes currently used as the MBSFN subframes (MCE) are #1 and #2. Thus, of subframes except for the subframe currently used as the MBSFN subframe (MCE), a subframe that is configured as the MBSFN subframe (MCE) and has the highest priority order of the subframes is "#6" (see FIG. 19).

In this manner, in Step ST1705, the MCE notifies the base station (eNB2) being served thereby of the updated MBSFN subframe (MCE) updated in Step ST2006. In Step ST1706, the MCE notifies the base station (eNB1) being served thereby of the updated MBSFN subframe (MCE) updated in Step ST2006.

In Step ST1707, the base station (eNB1) judges whether or not the MBSFN subframe (UE) must be updated. At this time, since the MBSFN subframes (UE) have been already "#1, #2 and #6", it is judged that the updating need not be performed, and a system information change does not occur.

In this manner, the MCE and the base station being served by the MCE perform adjustment depending on the same priority order to make it possible to suppress the repetition-number of system information change of the base station being served thereby.

Furthermore, for example, in Step ST1802, it is assumed that the MCE judges that the MBSFN subframe (MCE) need not be added.

In Step ST2007, the MCE selects, from subframes currently used as the MBSFN subframes (MCE), a subframe that is configured as the MBSFN subframe (MCE) and has the lowest priority order of the subframes as the subframe that is deleted from the MBSFN subframes (MCE). In this operation example, the subframes currently used as the MBSFN subframes (MCE) are #1 and #2. Thus, of the subframes currently used as the MBSFN subframes (MCE), a subframe that is configured as the MBSFN subframe (MCE) and has the lowest priority order of the subframes is "#2" (see FIG. 19).

In this manner, in Step ST1705, the MCE notifies the base station (eNB2) being served thereby of the updated MBSFN subframe (MCE) updated in Step ST2007. In Step ST1706, the MCE notifies the base station (eNB1) being served thereby of the updated MBSFN subframe (MCE) updated in Step ST2007.

In Step ST1707, the base station (eNB1) judges whether or not the MBSFN subframe (UE) must be updated. At this time, since the MBSFN subframes (UE) have been already "#1, #2 and #6", it is judged that the updating need not be performed, and a system information change does not occur.

In this manner, the MCE and the base station being served by the MCE perform adjustment depending on the same priority order to make it possible to suppress the repetition-number of system information change of the base station being served thereby.

A case where the base station (eNB1) reduces the MBSFN subframe (eNB) is described below. More specifically, in Step ST2003, since the base station (eNB1) judges that the MBSFN subframe (eNB) need not be added, the flow shifts to Step ST2005.

In Step ST2005, the base station (eNB1) selects, from subframes used as the MBSFN subframes (eNB), a subframe that is configured as the MBSFN subframe (MCE) received in Step ST2002 and has the lowest priority order of the subframes as the subframe deleted from the MBSFN subframes (eNB). In this operation example, the MBSFN subframes currently used as the MBSFN subframes (eNB) are #1 and #2. Thus, of the subframes currently used as the MBSFN subframes (eNB), a subframe that is configured as the MBSFN subframe (MCE) and has the lowest priority order of the subframes is "#2" (see FIG. 19).

The MBSFN subframes (MCE) are still "#1 and #2". In this manner, the MBSFN subframes (UE) are "#1 and #2", and are not updated. Thus, in Step ST1707, the base station (eNB1) judges that the MBSFN subframe (UE) need not be updated, and a system information change does not occur.

In this manner, the MCE and the base station being served by the MCE perform adjustment depending on the same priority order to make it possible to suppress the repetition-number of system information change of the base station being served thereby.

Note that the number of MBSFN subframes to be updated is not limited to one and may be two or more.

In the modification, an example obtained by combining the first embodiment to the modification is mainly described. However, a combination between the first modification of the first embodiment and the modification can be used.

The third modification of the first embodiment can achieve the effects below in addition to those of the first embodiment.

When a plurality of base stations are served by the MCE, even though the numbers of configured MBSFN subframes (eNB) of the respective base stations are different from each other, the MCE and the base station being served by the MCE perform adjustment depending on the same priority order to make it possible to minimize a change of an MBSFN subframe configuration given from the base station to a user equipment. In this manner, a change of system information can be suppressed. Thus, reception of the system information with intermittent reception interruption of the user equipment can be suppressed. In this manner, an increase in power consumption of the user equipment can be prevented.

Fourth Modification of First Embodiment

In a case where the first embodiment is used, the following problem occurs.

Since data that must be transmitted per unit time and is related to an MBMS increases, it is discussed that the MCE changes configurations to increase the MBSFN subframe (MCE).

By increasing MBMS data, configurations are changed to increase the MBSFN subframe (MCE) configured in the MCE. Accordingly, if any device is not used, the MCE may select, as an additional MBSFN subframe (MCE), the MBSFN subframe (eNB) configured by the base station being served thereby to realize energy saving. In this case, even an MBSFN subframe (eNB) configured by the base station to realize energy saving, when the subframe is selected as the MBSFN subframe (MCE), the base station must perform transmission of an MCH transport channel using the MBSFN. Thus, even in the MBSFN subframe (eNB) configured to realize energy saving, transmission except for the transmission of one symbol of CRS occurs. In this manner, even in the MBSFN subframe (eNB) configured to realize energy saving, the power supply of the transmitter power amplifier cannot be turned off. A problem in which the base station cannot realize lower power consumption is posed.

A specific example that causes problems is described with reference to FIG. 21.

In Step ST1401, the MCE notifies a base station (eNB2) being served thereby of the MBSFN subframe (MCE).

In Step ST1402, the MCE notifies a base station (eNB1) being served thereby of the MBSFN subframe (MCE). In this specific example, it is assumed that a second subframe (#1) and a third subframe (#2) are configured as MBSFN subframes (MCE).

In Step ST2101, the base station (eNB1) judges whether or not an energy saving operation is executed. When it is judged that the energy saving operation is executed, the flow shifts to Step ST1403. When it is judged that the energy saving operation is not executed, the judgment in Step ST2101 is repeated.

In Step ST1404, the base station (eNB1) selects the MBSFN subframe (eNB). In this specific example, a subframe different from #1 and #2 serving as the MBSFN subframes (MCE) is selected as the MBSFN subframe (eNB). In this operation example, for example, it is assumed that a seventh subframe (#6) and an eighth subframe (#7) are configured as MBSFN subframes (eNB).

That is, in Step ST2102, the base station (eNB1), in the subframes #1 and #2, executes transmission of an MCH transport channel using the MBSFN. In Step ST2103, the base station (eNB1), in the subframes #6 and #7, executes only transmission of one symbol of CRS for lower power consumption and does not execute a transmitting operation in other radio resources. More specifically, the power supply of the transmitter power amplifier or the like is turned off for except the transmission of the one symbol of CRS in the MBSFN subframe (eNB).

In Step ST1703, the MCE judges whether or not the configuration of the MBSFN subframe (MCE) must be changed. When the change is required, the flow shifts to Step ST1704. When the change is not required, the judgment in Step ST1703 is repeated. In addition to this, it may be judged whether or not the MBSFN subframe (MCE) must be increased. In this case, when the increase is required, the flow shifts to Step ST1704. When the increase is not required, the judgment in Step ST1703 is repeated.

In Step ST1704, the MCE updates the MBSFN subframe (MCE). In the specific example, it is assumed that #1, #2 and #7 are selected as the MBSFN subframes (MCE). More specifically, it is assumed that #7 is added as the MBSFN subframe (MCE).

In Step ST1705, the MCE notifies the base station (eNB2) being served thereby of the updated MBSFN subframe (MCE) updated in Step ST1704.

In Step ST1706, the MCE notifies the base station (eNB1) being served thereby of the updated MBSFN subframe (MCE) updated in Step ST1704. Subsequently, the eNB2 is considered to be equal to the eNB1, which is not described.

That is, in Step ST2104, the base station (eNB1), in the subframes #1, #2 and #7, must execute transmission of an MCH transport channel using the MBSFN. In Step ST2105, the base station (eNB1), in the subframes #6, executes only transmission of one symbol of CRS for lower power consumption and does not execute a transmitting operation in other radio resources. An operation for lower power consumption is executed for only the subframe #6. In this manner, the base station (eNB1) is due to execute an energy saving operation for two subframes. However, the number of subframes for energy saving disadvantageously reduces against the intension of the base station (eNB1).

As described above, if any device is not used, an effect of lower power consumption of the base station varies each time an amount of data of the MBMS varies.

A solution in the fourth modification of the first embodiment is described below. Parts different from the solution of the first embodiment are mainly described below. Undescribed parts are the same as those in the first embodiment.

The base station notifies the MCE of an MBSFN subframe configuration of own cell. When the MCE updates the MBSFN subframe configuration, the MCE performs adjustment by using the information.

Notification to the MCE may be executed only when the MBSFN subframe (eNB) is configured. The notification may be performed only when a subframe different from the MBSFN subframe (MCE) is configured as the MBSFN subframe (eNB).

A specific example of the MBSFN subframe configuration of which the MCE is notified are similar to that of the second modification of the first embodiment, which is not described.

Two specific examples of adjustment performed by the MCE are disclosed below. (1) When the MCE increases the MBSFN subframe (MCE), it is judged whether or not a subframe except for a subframe currently used as the MBSFN subframe (MCE) is present in except for the MBSFN subframe (eNB) that receives the notification from the base station. When the subframe is present, the subframe is selected as an MBSFN subframe (MCE) that increases the subframe. (2) When the MCE reduces the MBSFN subframe (MCE), it is judged whether or not a subframe currently used as the MBSFN subframe (MCE) is present in the MBSFN subframe (eNB) that receives notification from the base station. When the subframe is present, the subframe is selected as an MBSFN subframe (MCE) that reduces the subframe. The adjustment may be commonly performed by a plurality of base stations being served by the MCE.

A specific example of a notification timing from the base station to the MCE is similar to that of the second modification of the first embodiment, which is not described.

A specific example of an interface used for notification from the base station to the MCE is similar to that of the second modification of the first embodiment, which is not described.

A specific operation example using the fourth modification of the first embodiment is described with reference to FIG. 18.

In Step ST1401, the MCE notifies a base station (eNB1) being served thereby of the MBSFN subframe (MCE).

In Step ST1402, the MCE notifies a base station (eNB2) being served thereby of the MBSFN subframe (MCE). In this operation example, for example, it is assumed that a second subframe (#1) and a third subframe (#2) are configured as MBSFN subframes (MCE).

In Step ST1403, the base station (eNB1) judges whether or not an energy saving operation is executed. When it is judged that the energy saving operation is executed, the flow shifts to Step ST1404. When it is judged that the energy saving operation is not executed, the judgment in Step ST1403 is repeated.

In Step ST1404, the base station (eNB1) selects the MBSFN subframe (eNB). In this operation example, for example, it is assumed that the third subframe (#2), the seventh subframe (#6) and an eighth subframe (#7) are configured as MBSFN subframes (eNB).

That is, the base station (eNB1), in the subframes #1 and #2, executes transmission of an MCH transport channel using the MBSFN. In the subframes #6 and #7, the base station executes only transmission of one symbol of CRS and does not execute a transmitting operation in other radio resources. More specifically, the power supply of the transmitter power amplifier or the like is turned off for except the transmission of the one symbol of CRS.

In Step ST1801, the base station (eNB1) notifies the MCE of the MBSFN subframe (eNB) as information of the MBSFN subframe configuration. In this operation example, the MBSFN subframes are #2, #6 and #7. The notification uses the M2 interface.

Subsequently, a case where the MCE increases the MBSFN subframe (MCE) is described first. More specifically, in Step ST1802, since the MCE judges that the MBSFN subframe (MCE) must be added, the flow shifts to Step ST1803.

In Step ST1803, the MCE judges whether or not a subframe except for the subframe currently used as the MBSFN subframe (MCE) is present in except the MBSFN subframe (eNB) that receives the notification from the base station. When the subframe is present, the flow shifts to Step ST1804. When the subframe is not present, the flow shifts to Step ST1704. In Step ST1704, the MCE updates the MBSFN subframe (MCE). In this operation example, as subframes except for the subframe currently used as the MBSFN subframe (MCE) in except the MBSFN subframe (eNB), #3 and #8 are present. Thus, in Step ST1803, it is judged that the subframe is present, and the flow shifts to Step ST1804.

In Step ST1804, the MCE selects, as a subframe added to the MBSFN subframe (MCE), a subframe except for the subframe currently used as the MBSFN subframe (MCE) in except the MBSFN subframe (eNB). In this operation example, it is assumed that #8 is selected.

Even though the MBSFN subframe (MCE) is updated, by performing the process, the MBSFN subframe (eNB) that configured by the base station (eNB1) for energy saving is not selected as the MBSFN subframe (MCE). Thus, transmission of the MCH transport channel need not be executed in the MBSFN subframe (eNB) configured for energy saving.

A case where the MCE reduces the MBSFN subframe (MCE) is described below. More specifically, in Step ST1802, since the MCE judges that the MBSFN subframe (MCE) need not be added, the MCE shifts to Step ST1805.

In Step ST1805, the MCE judges whether or not, in the MBSFN subframe (eNB) of a base station that receives the notification from the base station, a subframe currently used as the MBSFN subframe (MCE) is present. When the subframe is present, the flow shifts to Step ST1806. When the subframe is not present, the flow shifts to Step ST1704. In Step ST1704, the MCE updates the MBSFN subframe (MCE). In this operation example, as a subframe currently used as the MBSFN subframe (MCE) in the MBSFN subframe (eNB), #2 is present. Thus, in Step ST1805, it is judged that the subframe is present, and the flow shifts to Step ST1806.

In Step ST1806, the MCE selects, as a subframe deleted from the MBSFN subframe (MCE), a subframe currently used as the MBSFN subframe (MCE) in the MBSFN subframe (eNB). In this operation example, it is assumed that #2 is selected. When the MBSFN subframe (MCE) is updated, by performing the above process, the MBSFN subframe (eNB) configured for energy saving in the base station (eNB1) need not execute transmission of the MCH transport channel without changing the MBSFN subframe (eNB).

Note that the number of MBSFN subframes to be updated is not limited to one and may be two or more.

In the modification, an example obtained by combining the first embodiment to the modification is mainly described. However, a combination between the first modification of the first embodiment and the modification can be used.

The fourth modification of the first embodiment can achieve the effects below in addition to those of the first embodiment.

Even though addition of the MBSFN subframe (MCE) is required by increasing data of the MBMS, the MCE performs adjustment to make it possible to minimize selection of the MBSFN subframe (eNB) configured by the base station being served by the MCE to realize energy saving as an additional MBSFN subframe (MCE). In this manner, transmission of the MCH transport channel can be executed in the MBSFN subframe (eNB) configured to realize energy saving, and lower power consumption of the base station can be achieved as an effect.

Fifth Modification of First Embodiment

In a case where the fourth modification of the first embodiment is used, a new problem occurs as follows.

A case where the MBSFN subframes (eNB) are independently configured for the base stations being served by the MCE, respectively. In a subframe except for a plurality of MBSFN subframes (eNB) designated by a plurality of base stations being served by the MCE, the possibility that a subframe except for the subframe currently used as the MBSFN subframe (MCE) is not present increases. In this manner, the problem of the fourth modification of the first embodiment is posed again.

A solution in the fifth modification of the first embodiment is described below. Parts different from the solution of the first embodiment are mainly described below. Undescribed parts are the same as those in the first embodiment.

The MCE notifies a base station being served thereby of information of a priority order of a subframe configured as the MBSFN subframe (MCE). When the base station that receives the information executes or changes a configuration of the MBSFN subframe (eNB), adjustment is performed by using the information of the priority order. The adjustment may be commonly performed by a plurality of base stations being served by the MCE.

A specific example of information of a priority order when the fifth modification of the first embodiment in the conventional technique is shown in FIG. 19. The description in FIG. 19 is similar to that of the third modification of the first embodiment, which is not described.

The priority order may be statically determined or may be semi-statically determined on the network side. For example, the notifying method to a base station being served by the MCE when the priority order is semi-statically determined in the MCE is similar to that of the third modification of the first embodiment, which is not described.

Two specific examples of adjustment performed by the base station are disclosed below. (1) When the base station increases the MBSFN subframe (eNB), in a subframe except for a subframe currently used in the MBSFN subframe (eNB), a subframe having the lowest priority order received from the MCE is preferentially configured. When the base station is free from a load, or when the base station is in a low-loading state, the MBSFN subframe (eNB) may be increased. (2) When the base station reduces the MBSFN subframe (eNB), in the subframe currently used as the MBSFN subframe (eNB), a subframe having the highest priority order received from the MCE is preferentially configured. When a load is generated in a state in which the base station is free from a load, or when the base station is in a high-load state, the MBSFN subframe (eNB) may be reduced.

A specific operation example using the fifth modification of the first embodiment is described with reference to FIG. 20.

In this operation example, a priority order of a subframe configured as the MBSFN subframe (MCE) is semi-statically determined, and a case where the MCE performs notification to the base station being served thereby by using the M2 interface is disclosed below.

In Step ST2001, the MCE notifies a base station (eNB1) being served thereby of a priority order of a subframe configured as the MBSFN subframe (MCE). In this operation example, it is assumed that notification of a priority order shown in FIG. 19 is performed.

In Step ST2002, the MCE notifies a base station (eNB2) being served thereby of a priority order of a subframe configured as the MBSFN subframe (MCE). The MCE may notify all the base stations that perform the same MBMS transmission and are served thereby of the priority order of the subframes configured as the same MBSFN subframe (MCE).

In this operation example, the MBSFN subframe (MCE) notified in Step ST1401 and Step ST1402 are defined as #1 and #2. By the base station (eNB1), it is assumed that #3 and #8 have been already selected as the MBSFN subframes (eNB). More specifically, the MBSFN subframes (UE) designated from the base station (eNB1) to the user equipment being served thereby are #1, #2, #3 and #8. That is, the base station (eNB1), in the subframes #1 and #2, executes transmission of an MCH transport channel using the MBSFN. In order to achieve lower power consumption in the subframes #3 and #8, only transmission of one symbol of CRS is performed, and a transmission operation is not performed in other radio resources. More specifically, the power supply of the transmitter power amplifier or the like is turned off for except the transmission of the one symbol of CRS.

In Step ST2003, the base station (eNB1) judges whether or not the MBSFN subframe (eNB) must be added. When the addition is required, the flow shifts to Step ST2004. When the addition is not required, the flow shifts to Step ST2005.

Subsequently, a case wherein the base station (eNB1) increases the MBSFN subframe (eNB) is described first. More specifically, in Step ST2003, since the base station (eNB1) judges that the MBSFN subframe (eNB) must be added, the flow shifts to Step ST2004.

In Step ST2004, the base station (eNB1) selects, from subframes except for the subframe currently used as the MBSFN subframe (eNB), a subframe that has the lowest priority order of the subframes configured as the MBSFN subframe (MCE) received in Step ST2002 as the MBSFN subframe (eNB). In this operation example, the subframes currently used as the MBSFN subframes (eNB) are #3 and #8. Thus, of subframes except for the subframe currently used as the MBSFN subframe (eNB), a subframe that has the lowest priority order of the subframes configured as the MBSFN subframe (MCE) is "#7" (see FIG. 19). According to the process, a subframe slightly selected as the MBSFN subframe (MCE) by the MCE can be made the MBSFN subframe (eNB) selected for energy saving. In this manner, against the intension of the base station (eNB1), reducing the number of subframes for energy saving can be performed less frequently.

On the other hand, in Step ST1802, the MCE judges whether or not the MBSFN subframe (MCE) must be added. When the addition is required, the flow shifts to Step ST2006. When the addition is not required, the flow shifts to Step ST2007. In this case, it is assumed that, for example, the MCE judges that the MBSFN subframe (MCE) must be added.

In Step ST2006, the MCE selects, from subframes except for the subframe currently used as the MBSFN subframe (MCE), a subframe that is configured as the MBSFN subframe (MCE) and has the highest priority order of the subframes as the MBSFN subframe (MCE). In this operation example, the subframes currently used as the MBSFN subframes (MCE) are #1 and #2. Thus, of subframes except for the subframe currently used as the MBSFN subframe (MCE), a subframe that is configured as the MBSFN subframe (MCE) and has the highest priority order of the subframes is "#6" (see FIG. 19).

In this manner, in Step ST1705, the MCE notifies the base station (eNB2) being served thereby of the updated MBSFN subframe (MCE) updated in Step ST2006. In Step ST1706, the MCE notifies the base station (eNB1) being served thereby of the updated MBSFN subframe (MCE) updated in Step ST2006.

The base station (eNB1) executes transmission of an MCH transport channel about not only #1 and #2 but also #6. However, thus, the subframes do not overlap #7, #3 and #8 that are the MBSFN subframes (eNB) configured to realize energy saving.

In this manner, the MCE and the base station being served by the MCE perform adjustment depending on the same priority order to make it possible to realize designed lower power consumption of the base station being served thereby.

Furthermore, for example, in Step ST1802, it is assumed that the MCE judges that the MBSFN subframe (MCE) need not be added.

In Step ST2007, the MCE selects, from subframes currently used as the MBSFN subframes (MCE), a subframe that is configured as the MBSFN subframe (MCE) and has the lowest priority order of the subframes as the subframe that is deleted from the MBSFN subframes (MCE). In this operation example, the subframes currently used as the MBSFN subframes (MCE) are #1 and #2. Thus, of the subframes currently used as the MBSFN subframes (MCE), a subframe that is configured as the MBSFN subframe (MCE) and has the lowest priority order of the subframes is "#2" (see FIG. 19).

In this manner, in Step ST1705, the MCE notifies the base station (eNB2) being served thereby of the updated MBSFN subframe (MCE) updated in Step ST2007. In Step ST1706, the MCE notifies the base station (eNB1) being served thereby of the updated MBSFN subframe (MCE) updated in Step ST2007.

The base station (eNB1) executes transmission of an MCH transport channel in #1. However, thus, #7, #3 and #8 that are the MBSFN subframes (eNB) configured to realize energy saving are not influenced.

In this manner, the MCE and the base station being served by the MCE perform adjustment depending on the same priority order to make it possible to realize designed lower power consumption of the base station being served thereby.

A case where the base station (eNB1) reduces the MBSFN subframe (eNB) is described below. More specifically, in Step ST2003, since the base station (eNB1) judges that the MBSFN subframe (eNB) need not be added, the flow shifts to Step ST2005.

In Step ST2005, the base station (eNB1) selects, from subframes currently used as the MBSFN subframes (eNB), a subframe that is configured as the MBSFN subframe (MCE) received in Step ST2002 and has the highest priority order of the subframes as the subframe deleted from the MBSFN subframes (eNB). In this operation example, the subframes currently used as the MBSFN subframes (eNB) are #3 and #8. Thus, of the subframes currently used as the MBSFN subframes (eNB), a subframe that is configured as the MBSFN subframe (MCE) and has the highest priority order of the subframes is "#3" (see FIG. 19).

Subframes that are configured as the MBSFN subframes (MCE) and have higher priority orders are deleted from the MBSFN subframes for energy saving, more stable lower power consumption of a base station that is not easily influenced by the addition of the MBSFN subframe (MCE) by an increase of MBMS data can be realized.

In this manner, the MCE and the base station being served by the MCE perform adjustment depending on the same priority order to make it possible to realize designed lower power consumption of the base station being served thereby.

Note that the number of MBSFN subframes to be updated is not limited to one and may be two or more.

In the modification, an example obtained by combining the first embodiment to the modification is mainly described. However, a combination between the first modification of the first embodiment and the modification can be used.

The fifth modification of the first embodiment can achieve the effects below in addition to those of the first embodiment.

When a plurality of base stations are served by the MCE, even though the numbers of configured MBSFN subframes (eNB) of the respective base stations are different from each other, the MCE and the base station being served by the MCE perform adjustment depending on the same priority order to make it possible to minimize selection of the MBSFN subframe (eNB) configured to realize energy saving by the base station as the added MBSFN subframe (MCE). In this manner, transmission of the MCH transport channel can be executed in the MBSFN subframe (eNB) configured to realize energy saving, and lower power consumption of the base station can be achieved as an effect.

It may be statically or semi-statically determined as a mobile communication system whether adjustment (the second modification of the first embodiment and the third modification of the first embodiment) that reduces the change of the system information or adjustment (the fourth modification of the first embodiment and the fifth modification of the first embodiment) that can easily obtain the effect of energy saving should be performed.

When the determination is semi-statically made, two specific examples of a main body that determines whether or not one of the adjusting methods should be selected are disclosed below. (1) The MCE makes a determination. (2) The MME makes a determination.

A base station being served by the MCE is notified of the adjusting method used when the MCE makes a determination by using the M2 interface. Alternatively, the MME is notified of the adjusting method by using the M3 interface, and the base station being served thereby is notified of the adjusting method by using the S1 interface.

A base station being served by the MCE is notified of the adjusting method used when the MME makes a determination by using the S1 interface.

Second Embodiment

A problem to be solved by a second embodiment is described below.

Non-Patent Document 11 discloses that CRS transmission is made less frequent to save a network power to make it possible to configure a larger number of MBSFN subframes. However, a concrete main subject of the configuration, whether or not a larger number of MBSFN subframes can be configured, and a concrete method of increasing the number of MBSFN subframes are not disclosed.

In the embodiment, a concrete method that can configure a larger number of MBSFN subframes is disclosed below.

A solution in the second embodiment is described below.

In the conventional technique, as the MBSFN subframes, a maximum of six subframes can be configured in one radio frame (Non-Patent Document 2).

In the second embodiment, MBSFN subframes the number of which is larger than that in the conventional technique can be configured in one radio frame. More specifically, subframes the number of which is larger than 6 can be configured in one radio frame as MBSFN subframes. A subframe except for a subframe that can transmits the P-SS, the S-SS and the BCH can be configured as an MBSFN subframe. In this manner, lower power consumption can be enhanced while maintaining transmission of the P-SS, the S-SS and the BCH serving as signals used in cell-search. A subframe except for the first subframe (#0) and the sixth subframe (#5) can be configured as the MBSFN subframe. In the conventional technique, #0 and #5 are radio resources to which the P-SS, the S-SS and the BCH are mapped. Thus, in this manner, lower power consumption can be enhanced while maintaining transmission of the P-SS, the S-SS and the BCH serving as signals used in cell-search.

As the MBSFN subframes, a maximum of eight subframes can be configured in one radio frame. A maximum of eight subframes except for the first subframe (#0) and the sixth subframe (#5) can be configured as the MBSFN subframes.

The second embodiment can be used in combination with the first embodiment, the first modification of the first embodiment, the second modification of the first embodiment, the third modification of the first embodiment, the fourth modification of the first embodiment and the fifth modification of the first embodiment.

The second embodiment can achieve effects below.

Effective lower power consumption achieved by a base station can be realized while maintaining transmission of the CRS, the P-SS/S-SS and the BCH serving as necessary signals in a downlink for an inactive user equipment (no-active UE).

First Modification of Second Embodiment

In a case where the second embodiment is used, a new problem occurs as follows.

In a PDCCH that schedules a paging message, a subframe in which a P-RNTI (Paging Radio Network Temporary Identifier) may be present is referred to as paging occasion (PO) (Non-Patent Document 3). An occurrence pattern of paging occasion is as shown in FIG. 22 (Non-Patent Document 3). Parameters in FIG. 22 are described below with reference to Equations (1), (2) and (3).

$$Ns = \max(1, nB/T) \quad \text{Equation (1)}$$

$$UE\_ID = IMSI \bmod 1024 \quad \text{Equation (2)}$$

$$N = \min(T, nB) \quad \text{Equation (3)}$$

$$i\_s = \text{floor}(UE\_ID/N) \bmod Ns \quad \text{Equation (4)}$$

The "T" included in Equation (1) is DRX (Discontinuous Reception) cycle of a user equipment. The "T" is determined by a DRX value unique to the shortest user equipment if allocation is performed by a higher layer, and an initial DRX value is broadcasted in the system information. If the DRX unique to the user equipment is set by the higher-level layer, the initial value is applied. The "nB" included in Equation (1) is broadcasted in the system information. As the "nB", 4T, 2T, T, T/2, T/4, T/8, T/16 and T/32 are given. The "Ns" is given as the large one of 1 and nB/T according to Equation (1).

The "IMSI" included in Equation (2) is an international mobile subscriber identity. The "UE-ID" is given as a remainder obtained when the IMSI is divided by "1024" according to Equation (2).

The "N" is given as the small one of T and nB according to Equation (3).

The "i_s" is given as a remainder obtained when a value obtained by dividing UE-ID by N (rounded value) is divided by Ns according to Equation (4).

More specifically, when the second embodiment is executed without any device, for example, when a paging occasion is a subframe number #9 or #4, the base station cannot notify the user equipment of paging because the base station is in a lower power consumption state.

A solution in the first modification of the second embodiment is described below.

When the base station receives a paging message from the MME, the base station releases the energy saving operation. Alternatively, when the base station receives the paging message from the MME, the base station may set the number of subframes that can be set in one radio frame to a number of the conventional technique. Alternatively, when the base station receives the paging message from the MME, the base station may set the number of subframes that can be set in one radio frame to six as in the conventional technique.

In the first modification of the second embodiment, a combination to the second embodiment is mainly described. However, combinations to the first embodiment, the first modification of the first embodiment, the second modification of the first embodiment, the third modification of the first embodiment, the fourth modification of the first embodiment and the fifth modification of the first embodiment can be used.

The first modification of the second embodiment can achieve the effects below in addition to those of the second embodiment. Effective lower power consumption achieved by the base station can be realized while solving a problem in which notification of the paging to the user equipment cannot be performed.

Second Modification of Second Embodiment

In the second modification of the second embodiment, the same problem as that in the first modification of the second embodiment is solved by a method different from that in the first modification of the second embodiment.

A solution in the second modification of the second embodiment is described below.

The base station can use a subframe except for the paging occasion as the MBSFN subframe. A subframe except for the subframes corresponding to the P-SS, the S-SS, and the paging occasion can also be used as the MBSFN subframe.

A specific example of a method of selecting a subframe except for the paging occasion is described below. It is assumed that the technique disclosed in the second modification of the second embodiment is applied to the conventional technique. As described in the first modification of the second embodiment, "Ns" is determined by the parameters "T" and "nB". The base station broadcasts the parameters "T" and "nB" to the user equipment being served thereby using the system information. Thus, the base station can know the values of "T" and "nB". From the values, the base station can also know the value of "Ns". By the value of Ns, an occurrence pattern of the paging occasion in FIG. 22 is confirmed. For example, when "Ns" is "1", the paging occasion is only the subframe number #9. When "Ns" is "2", the paging occasions are the subframe numbers #4 and #9. When "Ns" is "4", the paging occasions are subframe numbers #0 and #4, #5 and #9. As described above, the base station confirms the parameters "T" and "nB" of own cell to calculate "Ns", confirms the subframe number of the paging occasion, and selects a subframe except for the paging occasion.

As the MBSFN subframes, a maximum of seven subframes can be configured in one radio frame. A maximum of seven subframes except for the first subframe (#0), the sixth subframe (#5) and the tenth subframe (#9) can be configured as the MBSFN subframes. This is because, even though "Ns" has any value, the subframe number #9 corresponds to the paging occasion (see FIG. 22). The base station can use a subframe except for the paging occasion as the MBSFN subframe.

In the second modification of the second embodiment, a combination to the second embodiment is mainly described. However, combinations to the first embodiment, the first modification of the first embodiment, the second modification of the first embodiment, the third modification of the first embodiment, the fourth modification of the first embodiment and the fifth modification of the first embodiment can be used.

The second modification of the second embodiment can achieve the effects below in addition to those of the second embodiment. Effective lower power consumption in which an energy saving operation is not executed uselessly can be realized while solving a problem in which notification of the paging to the user equipment cannot be performed.

Third Embodiment

A problem to be solved by a third embodiment is described below.

In the conventional technique, an MBSFN (Multimedia Broadcast multicast service Single Frequency Network) is supported for the MCH transport channel (Non-Patent Document 1). In an MBSFN synchronization area, all base station belonging to the area are synchronized with each other, and MBSFN transmission can be executed (Non-Patent Document 1). Transmission using the MBSFN is transmitted in the MBSFN subframe. The MBSFN synchronization area is semi-statically configured by, for example, an operator (Non-Patent Document 1).

More specifically, in the conventional technique, in order to cause the base station to configure the MBSFN subframe, the base station must belong to the MBSFN synchronization area. A problem in which a base station that does not belong to the MBSFN synchronization area cannot execute an energy saving operation using the MBSFN subframe is posed.

A solution in the third embodiment is described below.

Even the base station that does not belong to the MBSFN synchronization area can configure the MBSFN subframe to a user equipment being served thereby. Alternatively, even the base station that is not connected to the MCE can configure the MBSFN subframe to a user equipment being served thereby. Alternatively, even the base station that does not receive a configuration related to the MBSFN subframe from the MCE can configure the MBSFN subframe to a user equipment being served thereby.

The third embodiment can be used in combination with the first embodiment, the first modification of the first embodiment, the second modification of the first embodiment, the third modification of the first embodiment, the fourth modification of the first embodiment, the fifth modification of the first embodiment, the second embodiment, the first modification of the second embodiment and the second modification of the second embodiment.

Cases where the third embodiment is combined to the second modification of the first embodiment and the fourth modification of the first embodiment are described below. In the second modification of the first embodiment and the fourth modification of the first embodiment, the base station notifies the MCE of the MBSFN subframe configuration of own cell by using the M2 interface. In the combination with the third embodiment, the M2 interface is not present. Thus, the base station notifies the MME of the MBSFN subframe configuration of own cell by using the S1 interface. The MME notifies the MCE of the MBSFN subframe configuration of the cell by using an M3 interface.

A specific operation example using a combination between the third embodiment and the first modification of the first embodiment is described with reference to FIG. 23. The same reference numerals as those of FIG. 14 and FIG. 16 denote the corresponding portions, which are not described. Location is the same as the location described with reference to FIG. 15, which are not described. A neighbor cell is notified of the MBSFN subframe configuration of own cell. In this operation example, a case where information representing whether or not a subframe different from a subframe indicated by the MCE of the specific example (4) is configured as an MBSFN subframe configuration is used in the MBSFN subframe configuration of which the neighbor cell is notified is disclosed. A case where, in an interface used for notification to the neighbor cells, the base station of the specific example (2) uses the S1 interface to the MME, and the MME uses the S1 interface to the neighbor cells of the base station is disclosed. A case where a base station including the base station of the specific example (5) as a neighbor cell is selected by a method of selecting a neighbor cell is disclosed. A case where the MME of the specific example (2) is used as a main subject that updates neighbor cell information is disclosed.

In Step ST2301, the base station (eNB1) selects the MBSFN subframe (eNB). In this operation example, for example, it is assumed that the seventh subframe (#6) and the eighth subframe (#7) are configured as MBSFN subframes (eNB).

In Step ST2302, the user equipment operates using the MBSFN subframe (eNB) received in Step ST1406 as a subframe reserved for the MBSFN in a downlink. In this operation example, the user equipment operates using #6 and #7 as subframes reserved for the MBSFN in a downlink.

In the Step ST2303, the base station (eNB1) notifies the MME of information representing whether or not a subframe different from a subframe indicated by the MCE is configured as an MBSFN subframe configuration as information of the MBSFN subframe configuration. In this operation example, a subframe different from a subframe indicated by the MCE is configured as the MBSFN subframe configuration is notified. The S1 interface is used for the notification.

In Step ST2304, the MME updates the neighbor cell information of the base station selected in Step ST1602. Information representing whether or not the MBSFN serving as the neighbor cell information is supported is updated. The MME may perform determination of the update based on the information received in Step ST2303. In Step ST2303, the MME can judge that the eNB1 has configured a subframe different from a subframe indicated by the MCE as an MBSFN subframe configuration. Thus, the MME changes (updates) the information representing whether or not the MBSFN serving as the neighbor cell information of the eNB2 is supported into information representing that the same MBSFN subframe configuration as that of the serving cell (eNB2) is not included in all the neighbor cells. If a conventional technique is used as the neighbor cell information, the information is changed (updated) into "00".

In Step ST1604, the MME notifies the base station selected in Step ST1602 of the neighbor cell information updated in Step ST2304. The S1 interface may be used for the notification.

In Step ST1605, the eNB2 (103-2) that receives the updated neighbor cell information notifies the user equipment 2 being served thereby of the updated neighbor cell information.

In Step ST1607, the user equipment 2 that receives the updated neighbor cell information performs neighbor cell measurement by using the updated neighbor cell information. As a specific example, the user equipment 2 performs the neighbor cell measurement on the assumption that a base station that performs an MBSFN subframe configuration different from that of the serving cell (eNB2) is included in the neighbor cells.

The third embodiment can achieve the effects below.

Even a base station that does not belong to the MBSFN synchronization area can execute an energy saving operation using the MBSFN subframe.

In addition, in discussion of a current 3GPP, it is determined that the HeNB does not support the MBMS (Non-Patent Document 1). Thus, in the mobile communication system, the HeNB does not belong to the MBSFN synchronization area and the HeNB is not connected to the MCE. Even in the system, according to the third embodiment, the HeNB can also configure the MBSFN subframe. Thus, the HeNB can also realize energy saving using the MBSFN subframe.

In this manner, an effect that an energy saving operation performed by a base station like the HeNB that does not belong to the MBSFN synchronization area can be realized while obtaining an effect of maintaining downward compatibility using the MBSFN subframe can be obtained. It is assumed that the HeNBs the number of which is larger than the number of macro cells are installed. The feasibility of the energy saving operation of the HeNB considerably contributes to lower power consumption on the network side.

First Modification of Third Embodiment

A problem to be solved by a first modification of the third embodiment is described below.

In a case where the third embodiment is executed, a problem occurs as follows.

In particular, when the third embodiment is used in combination with the first modification of the first embodiment, even though information representing whether or not the MBSFN is supported as the neighbor cell information is "00", a case where the neighbor cell belongs to the MBSFN synchronization area or a case where the neighbor cell does not belong to the MBSFN synchronization area is conceivable.

When all cells included in the neighbor cell information belong to the same MBSFN synchronization area as that of own cell, a user equipment that receives the neighbor cell information can omit a synchronization procedure with the neighbor cells. For example, a description is performed by using a flow chart showing an outline from cell search to an idle state operation performed by a user equipment (UE) in the LTE communication system shown in FIG. 12. If all the cells included in the neighbor cell information belong to the same MBSFN synchronization area as that of own cell, all the cells included in the neighbor cell information may be synchronized with own cell. That is, the Step ST1201 in which a slot timing and a frame timing are synchronized respectively can be omitted.

When all cells included in the neighbor cell information belong to the same MBSFN synchronization area as that of own cell, a user equipment that receives the neighbor cell information can not omit a synchronization procedure with the neighbor cells in neighbor cell measurement.

However, when notification of the information "00" representing whether or not the MBSFN is supported as neighbor cell information is performed, a user equipment being served by the cell cannot have the way of knowing whether or not a cell that does not belong to the MBSFN synchronization area is included in the cells included in the neighbor cell information.

Thus, when the information "00" representing whether or not the MBSFN is supported as neighbor cell information is received, the user equipment cannot omit the synchronization procedure with a neighbor cell. In this manner, even in a state in which the synchronization procedure can be originally omitted, more specifically, even though all the cells included in the neighbor cell information belong to the same MBSFN synchronization area as that of own cell, the user equipment must perform the synchronization procedure with the neighbor cell.

As described above, an useless operation occurs in cell search of a user equipment or neighbor cell measurement.

A solution in the first modification of the third embodiment is described below.

Information of an MBSFN synchronization area of a neighbor cell is newly set. The base station notifies neighbor cells of information of an MBSFN synchronization area of own cell. Notification to the neighbor cells may be executed only when the MBSFN subframe (eNB) is configured. On the basis of the information, the information of the MBSFN synchronization area of the neighbor cell is updated, and the updated information is notified to the user equipment being served by the base station the configuration notified. The user equipment that receives the broadcast information judges whether or not a synchronization procedure with the neighbor cell is executed on the basis of the broadcast information.

Three specific examples of information of an MBSFN synchronization area of the neighbor cell are disclosed below. (1) Information representing whether or not the neighbor cell includes a cell that does not belong to the MBSFN synchronization area. (2) Information representing that the neighbor cell includes a cell that does not belong to the MBSFN synchronization area. (3) Information representing that the neighbor cell does not include a cell that does not belong to the MBSFN synchronization area.

The user equipment may be notified of information of the MBSFN synchronization area of the neighbor cell by using the broadcast information. The information may be newly set in SIB3 in the broadcast information, SIB5 in the broadcast information or a measurement object. The user equipment may be notified of the information. The information may be newly set in a neighbor cell configuration (NeighCellConfig). The user equipment can receive parameters used in the neighbor cell measurement or the like at once, and effects such as a reduction in processing load or prevention of control delay of the user equipment can be obtained.

Three specific examples of information of an MBSFN synchronization area of own cell are disclosed below. (1) Information representing whether or not own cell belongs to the MBSFN synchronization area. (2) Information representing that own cell does not belong to the MBSFN synchronization area. (3) Information representing that own cell belongs to the MBSFN synchronization area.

A specific example of judgment based on the information of the MBSFN synchronization area of a neighbor cell of a user equipment is disclosed below. When the neighbor cell includes a cell that does not belong to the MBSFN synchronization area, a synchronization procedure with the neighbor cell is performed. When the neighbor cell does not include a cell that does not belong to the MBSFN synchronization area, a synchronization procedure with the neighbor cell is omitted.

A specific example of an interface used for notification to a neighbor cell is the same as that in the first modification of the first embodiment, which is not described.

A specific example of a method of selecting a neighbor cell is the same as that in the first modification of the first embodiment, which is not described.

A specific example of a main subject that updates neighbor cell information is the same as that in the first modification of the first embodiment, which is not described.

A specific operation example using the first modification of the third embodiment is described with reference to FIG. 24.

Figure 23:
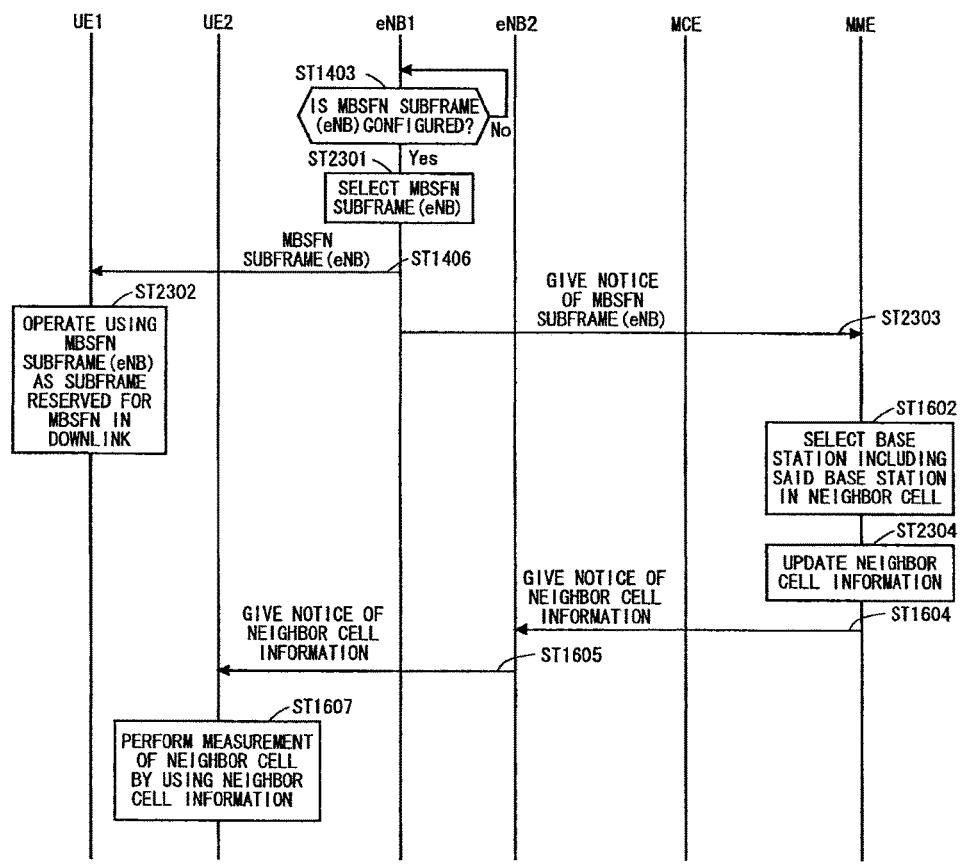
FIG. 23 is a diagram illustrating a sequence of a mobile communication system when a combination of the third embodiment and the first modification of the first embodiment is used.

The same reference numerals as those of FIG. 14, FIG. 16 and FIG. 23 denote the corresponding portions, which are not described. Location is the same as the location described with reference to FIG. 15, which are not described. In this operation example, a case where, in an interface used for notification to the neighbor cells, the base station of the specific example (2) uses the S1 interface to the MME, and the MME uses the S1 interface to the neighbor cells of the base station is disclosed. A case where a base station including the base station of the specific example (5) as the neighbor cell is selected by a method of selecting a neighbor cell is disclosed.

In Step ST2401, the base station (eNB1) notifies the MME of the information of the MBSFN synchronization area. In this operation example, it is assumed that the base station (eNB1) does not belong to the MBSFN synchronization area. In Step ST2401, the base station (eNB1) notifies the MME of the information representing that the base station does not belong to the MBSFN synchronization area. The S1 interface is used for the notification.

In Step ST2304, the MME updates the neighbor cell information of the base station selected in Step ST1602. Furthermore, the information of the MBSFN synchronization area of a neighbor cell of the base station selected in Step ST1602 is updated. For example, the neighbor cell configuration (NeighCellConfig) is updated. The MME may perform determination of the update based on the information received in Step ST2401. In Step ST2401, the MME receives the information representing that the base station does not belong to the MBSFN synchronization area from the eNB1. Thus, the MME changes (updates) the information of the MBSFN synchronization area of the neighbor cells of the eNB2 into information representing that the neighbor cells include a cell that does not belong to the MBSFN synchronization area.

In Step ST2402, the user equipment 2 that receives the updated neighbor cell information judges whether or not the neighbor cells include a cell that does not belong to the MBSFN synchronization area by using the updated neighbor cell information. When it is judged that the neighbor cells include a cell that does not belong to the MBSFN synchronization area, the flow shifts to Step ST2403. When it is judged that the neighbor cells do not include a cell that does not belong to the MBSFN synchronization area, the flow shifts to Step ST2404.

In Step ST2403, the user equipment 2 executes a synchronization procedure with a neighbor cell in neighbor cell measurement.

In Step ST2404, the user equipment 2 omits the synchronization procedure in neighbor cell measurement.

In the first modification of the third embodiment, a combination to the third embodiment is mainly described. However, combinations to the first embodiment, the first modification of the first embodiment, the second modification of the first embodiment, the third modification of the first embodiment, the fourth modification of the first embodiment, the fifth modification of the first embodiment, the second embodiment, the first modification of the second embodiment and the second modification of the second embodiment can be used.

The first modification of the third embodiment can achieve the effects below in addition to those of the third embodiment.

Information of the MBSFN synchronization area of the neighbor cell is newly set to make it possible to cause the user equipment to recognize the information of the MBSFN synchronization area of the neighbor cell. In this manner, on the basis of the information of the MBSFN synchronization area of the neighbor cell, the user equipment can judge whether or not the synchronization procedure with the neighbor cell is executed in neighbor cell measurement or the like. An useless operation can be omitted in cell search or neighbor cell measurement of the user equipment. Effects such as lower power consumption of a user equipment and a reduction in control delay can be obtained.

Second Modification of Third Embodiment

A problem to be solved by a second modification of the third embodiment is described below.

In a case where the first modification of the third embodiment is executed, a problem occurs as follows.

When own cell does not belong to the MBSFN synchronization area, even though a user equipment being served thereby receives the information of the MBSFN synchronization area of the neighbor cell as broadcast information, a problem occurs as follows.

A case where, when the information of the MBSFN synchronization area of the neighbor cell represents that the neighbor cells do not include a cell that does not belong to the MBSFN synchronization area, by using the first modification of the third embodiment, a user equipment being served by own cell omits a synchronization procedure with the neighbor cell is considered. In this case, since own cell does not belong to the MBSFN synchronization area, own cell is not synchronized with the neighbor cell. Thus, on the assumption that synchronization is executed, the user equipment fails in search for a neighbor cell in neighbor cell measurement of the user equipment that omits the synchronization process. In this manner, a power consumption of the user equipment increases, and a problem of an increase in control delay occurs.

A solution in the second modification of the third embodiment is described below.

Information of the MBSFN synchronization area of own cell is newly set.

A user equipment that receives the information of the MBSFN synchronization area of own cell and the information of the MBSFN synchronization area of the neighbor cell disclosed in the first modification of the third embodiment judges whether or not a synchronization procedure with the neighbor cell is performed on the basis of the two pieces of information. Alternatively, the user equipment that receives the information of the MBSFN synchronization area of own cell may judge whether or not the synchronization procedure with the neighbor cell on the basis of the information.

Three specific examples of the information of the MBSFN synchronization area of own cell are disclosed below. (1) Information representing whether or not own cell belongs to the MBSFN synchronization area. (2) Information representing that own cell does not belong to the MBSFN synchronization area. (3) Information representing that own cell belongs to the MBSFN synchronization area.

The base station may notify information of the MBSFN synchronization area of own cell of the user equipment being served thereby by using the broadcast information.

The information may be newly set in the SIB2 in the broadcast information. In the conventional technique, an MBSFN subframe configuration is mapped to the SIB2 (Non-Patent Document 2). Thus, the user equipment can acquire information related to the MBSFN subframe by performing a receiving process once, and an effect of preventing control delay of the user equipment can be obtained.

The information may be newly set in the SIB3, the SIB4 or the SIB5 in the broadcast information. In the conventional technique, information related to cell reselect is mapped to the SIB3, the SIB4 and the SIB5 (Non-Patent Document 2). The information of the MBSFN synchronization area of own cell in the second modification of the third embodiment is used when it is judged whether or not the synchronization procedure with the neighbor cell is performed in the user equipment. More specifically, the information of the MBSFN synchronization area of own cell may also be information related to measurement of a neighbor cell in a user equipment. Thus, the user equipment can acquire information related to the measurement of the neighbor cell by performing a receiving process once, and an effect of preventing control delay of the user equipment can be obtained.

Alternatively, another piece of information may mean "information of an MBSFN area of own cell" without newly setting the information of the MBSFN area of own cell. In this manner, new information need not be added, and a mobile communication system having excellent downward compatibility can be structured. Effective utilization of a radio resource can be advantageously obtained.

Two specific examples of the other piece of information are disclosed below. (1) In the conventional technique, information required to acquire MBMS control information is mapped to SIB13 (Non-Patent Document 2). In the conventional technique, in order to cause the base station to configure the MBSFN subframe, the base station must belong to the MBSFN synchronization area. Thus, when the SIB13 is broadcasted, it is assumed that the base station represents that the base station "belongs to the MBSFN synchronization area". On the other hand, when the SIB13 is not broadcasted, it is assumed that the base station represents that the base station "does not belong to the MBSFN synchronization area". (2) In the conventional technique, the name of HeNB is mapped to SIB9 (Non-Patent Document 2). It is determined that the HeNB does not support the MBMS (Non-Patent Document 1). Thus, the HeNB does not have the configuration of the mobile communication system belonging to the MBSFN synchronization area. Thus, when the SIB9 is broadcasted, it is assumed that the base station represents that the base station "does not belong to the MBSFN synchronization area".

A specific operation example using the second modification of the third embodiment is described with reference to FIG. 25.

The same reference numerals as those of FIG. 14, FIG. 16, FIG. 23 and FIG. 24 denote the corresponding portions, which are not described. Location is the same as the location described with reference to FIG. 15, which are not described. In this operation example, a case where, in an interface used for notification to the neighbor cells, the base station of the specific example (2) uses the S1 interface to the MME, and the MME uses the S1 interface to the neighbor cells of the base station is disclosed. A case where a base station including the base station of the specific example (5) as a neighbor cell is selected by a method of selecting a neighbor cell is disclosed.

In Step ST2501, the base station (eNB2) judges whether or not own cell belongs to the MBSFN synchronization area.

In Step ST2502, the eNB2 (103-2) notifies the user equipment 2 being served thereby of the information of the MBSFN synchronization area of own cell judged in Step ST2501.

In Step ST2503, the user equipment 2 that receives information of an MBSFN synchronization area of a serving cell in Step ST2502 judges whether or not the serving cell belongs to the MBSFN synchronization area by using the information. When it is judged that the serving cell belongs to the MBSFN synchronization area, the flow shifts to Step ST2402. When it is judged that the serving cell does not belong to the MBSFN synchronization area, the flow shifts to Step ST2404. The judgment in Step ST2402 may be omitted.

In the second modification of the third embodiment, a combination to the third embodiment and the first modification of the third embodiment is mainly described. However, combinations to the first embodiment, the first modification of the first embodiment, the second modification of the first embodiment, the third modification of the first embodiment, the fourth modification of the first embodiment, the fifth modification of the first embodiment, the second embodiment, the first modification of the second embodiment and the second modification of the second embodiment can be used.

The second modification of the third embodiment can achieve the effects below in addition to those of the third embodiment.

Information of the MBSFN synchronization area of own cell is newly set to make it possible to cause the user equipment to recognize the information of the MBSFN synchronization area of the serving cell. In this manner, on the basis of the information of the MBSFN synchronization area of own cell, the user equipment can judge whether or not the synchronization procedure with the neighbor cell is executed in neighbor cell measurement or the like. An useless operation can be omitted in cell search or neighbor cell measurement of the user equipment. Effects such as lower power consumption of a user equipment and a reduction in control delay can be obtained.

One or more MBSFN resources can be used for one or more purposes. As a specific example of a purpose using the MBSFN resource, an MBMS or positioning is known (Non-Patent Document 1).

For example, it is discussed that the MBSFN resource is used for a backhaul link which is set between a donor cell and a relay node. Even in a case where the MBSFN subframe is used as the backhaul link, the first embodiment to the third embodiment including modifications can be applied. The number of relay nodes being served by a donor cell and the number of user equipments being served by a relay node vary. That is, a radio resource required for the backhaul link may change depending on donor cells. By using the present invention, the radio resource required for the backhaul link can be set by the donor cells, respectively.

Fourth Embodiment

Up to the second modification of the third embodiment, the case using the MBSFN subframe for energy saving is disclosed mainly, the present invention can be applied to a case using the MBSFN subframe to avoid downlink interference occurring between cells. As described above, the resource of the MBSFN subframe can be used for one or more purposes. As a purpose except for energy saving, the MBSFN subframe may also be used to avoid downlink interference between the cells. The present invention can be applied to the case.

For example, in addition to the MBSFN subframe (MB-SFN subframe (MCE)) configured by the MCE for multi-cell transmission disclosed in the first embodiment, an MBSFN subframe is configured by a base station. More specifically, the base station has a function of configuring an MBSFN subframe therein. The MBSFN subframe (eNB) configured by the base station is used to avoid downlink interference between the cells. As another example, even a base station that is disclosed in the third embodiment and does not have a configuration related to the MBSFN subframe from the MCE for multi-cell transmission configures an MBSFN subframe. More specifically, the base station has a function of configuring an MBSFN subframe therein. The MBSFN subframe (eNB) configured by the base station is used to avoid downlink interference between the cells.

For example, in a state in which downlink interference occurs between a normal eNB (macro cell) and a low-output-power local node, e.g., a pico cell, in order to avoid inter-cell downlink interference, the normal eNB (macro cell) configures an MBSFN subframe. In the macro cell, only the first one or two symbols in the configured MBSFN subframe are used for a uni-cast, and transmission of a PMCH is not carried out in symbols except for the symbols used in the uni-cast. On the other hand, as for a pico cell, the MBSFN subframe configured by the normal eNB is a normal subframe, and normal uni-cast communication is performed to a user equipment to which interference occurs as a problem. In this manner, in an MBSFN subframe that a normal base station (macro cell) has configured, since PMCH transmission from the macro cell is not performed in symbols except for the symbols for uni-cast, interference to the pico cell can be reduced.

Since the low-output-power local node performs uni-cast communication to a user equipment to which interference occurs as a problem in the MBSFN subframe configured by the normal eNB (macro cell), the configuration of the MBSFN subframe must be recognized. As a method for the purpose, the method to which a base station notifies a neighbor cell of an MBSFN subframe configuration of own cell as disclosed in the present invention can be applied. For example, the method disclosed in the first modification of the first embodiment can be applied. In the first modification of the first embodiment, the case having neighbor cell measurement of a user equipment as an object is disclosed. However, to not only the object, the present invention can also be applied to cause a base station that configures an MBSFN subframe to notify a neighbor base station of the MBSFN subframe configuration in order to avoid inter-cell interference. A normal eNB (macro cell) that configures an MBSFN subframe notifies a neighbor cell of the MBSFN subframe configuration. A neighbor cell (low-output-power local node in the example) that receives the notification of the MBSFN subframe configuration from the normal eNB (macro cell) performs scheduling the resource of the MBSFN subframe for normal uni-cast communication to a user equipment to which interference from the macro cell occurs as a problem. In this manner, the interference from the macro cell can be avoided.

In the above description, although a pico cell is used as a cell notified of the MBSFN subframe configuration, not only the pico cell, but also another low-power local node such as a normal base station or an HeNB may be used. Similarly, the present invention can be applied, and inter-cell downlink interference can be avoided.

As a method of selecting a neighbor base station that performs notification of an MBSFN subframe configuration, the method disclosed in the present invention can be applied. For example, the method in the first modification of the first embodiment can be applied. In addition to this, the MME may determine an MBSFN subframe and notifies a base station that configures the MBSFN subframe of the MBSFN subframe configuration. The MME may receive a neighbor cell measurement result from a base station (normal eNB or low-power local node) being served thereby in advance to determine a neighbor base station which a predetermined base station should notify of the MBSFN subframe configuration. The base station being served by the MME may notify the MME of the neighbor cell measurement result.

For example, an HeNB is served by the MME, the HeNB performs the neighbor cell measurement and notifies the MME of the measurement result. The neighbor cell measurement and the notification of the result thereof by the HeNB may be performed in registration of the HeNB or may be regularly or periodically performed.

A report of a neighbor cell measurement obtained by a user equipment being served by the base station may be used without causing the base station being served by the MME to perform neighbor cell measurement.

In this manner, when the method disclosed in the present invention is applied when location of a cell is performed flexibly, inter-cell downlink interference can be avoided.

As a case where an MBSFN subframe is used to avoid downlink interference occurring between cells, a case where the method disclosed in the first embodiment is applied is disclosed. However, not only the first embodiment, but also the embodiments and the modifications of the present invention can be applied.

In this manner, by using the method of causing a base station to configure an MBSFN subframe as disclosed in the present invention, inter-cell downlink interference can be avoided by using the MBSFN subframe.

In the embodiment, as a base station that configures an MBSFN subframe, not only the eNB/NB but also another local node such as an HeNB, HNB, or a pico eNB can be applied. When any one of the local nodes is applied, the same effects obtained by applying the eNB/NB can be obtained.

Fifth Embodiment

When an MBSFN subframe is used to avoid downlink interference between the cells, a base station to which interference occurs as a problem may request a neighbor base station of configuration of an MBSFN subframes for avoiding downlink interference.

The base station has received the request configures an MBSFN subframe in own base station and notifies the neighbor base station of the MBSFN subframe configuration. As the method, the method disclosed above can be applied.

As a specific example of judgment whether or not a base station requests a neighbor base station of configuration of an MBSFN subframe and a method of selecting the neighbor base station, for example, the methods disclosed in the specific examples (1) and (2) of the method of selecting a neighbor cell in the first modification of the first embodiment can be applied. As another method, when a base station wants to preferentially reserve a subframe with which the base station performs scheduling to a user equipment being served thereby, the base station may judge that the base station requests a neighbor base station of configuration of an MBSFN subframe. In this case, as the method of selecting a neighbor base station, the methods disclosed in the specific examples (1) to (5) of the method of selecting a neighbor cell in the first modification of the first embodiment can be applied.

As a specific example of an interface used to notify a neighbor base station of an MBSFN subframe configuration request for avoiding downlink interference, the methods disclosed in the specific examples (1) to (3) of the interface used for notification to a neighbor cell in the first modification of the first embodiment can be applied. The request is included in a signaling message used on each interface or a signaling message for the request is newly set to perform notification by using the interfaces. In addition to the notification of the request, notification of an identifier (cell identifier) of a base station serving as a destination of the request, a cell identifier of own cell, or a requested resource may be performed. Notification of combinations of the identifiers and the resource may be performed. As the identifier of the base station serving as a destination or a cell identifier of own cell, a CGI, a PCI or the like may be used. As a specific example of the requested resource, the number of MBSFN subframes may be used. A base station that receives notification of the requested resource can use the notification as information for judgment used when the number of MBSFN subframes is configured.

As an example, a concrete operation performed when a base station to which interference occurs as a problem is an HeNB is shown. The HeNB, for example, by a measurement report of a user equipment being served thereby, recognizes that reception quality from a certain base station exceeds a predetermined threshold value. In this manner, the HeNB judges that the HeNB should request the base station of an MBSFN subframe configuration. The HeNB notifies the MME of the request message by using the S1 interface. When an MCE may not be connected to the HeNB because an MBMS is not supported for the HeNB, an X2 interface is not supported for the HeNB. In such a case, notification to a base station can be performed through an MME by using the S1 interface.

The HeNB may perform, in addition to the notification of the request message, notification of the identifier of a base station serving as a destination. The MME that receives the request message from the HeNB and the identifier of the base station serving as a destination can selectively notify the base station of the request message from the HeNB on the basis of the identifier of the base station. The notification of the message uses the S1 interface.

The base station that receives the request message from the HeNB through the MME configures an MBSFN subframe for avoiding inter-cell downlink interference. The base station that configures the MBSFN subframe notifies neighbor cells of the MBSFN subframe configuration. As a method of selecting a neighbor base station that performs notification of the configuration, a method disclosed above may be used. Alternatively, the neighbor base station that is performed notification of the configuration may be a base station (HeNB in the example) that requests an MBSFN subframe configuration. This is possible when notification of a request message and a cell identifier of own base station is performed. The HeNB that receives the MBSFN subframe configuration performs scheduling a resource of the MBSFN subframe for normal uni-cast communication to the user equipment to which interference from the base station occurs as a problem. As the user equipment to which interference from the base station occurs as a problem, a user equipment that performs notification of a measurement report representing that reception quality from the base station exceeds a predetermined threshold value may be used. In this manner, the interference from the base station can be avoided.

The example shows the case where the base station to which interference occurs as a problem is HeNB. However, not only the HeNB, but also a normal base station or another low-power local node such as a pico cell may be used. The present invention can be similarly applied to any one of low-power local nodes, and inter-cell downlink interference can be avoided. A base station serving as a destination of an MBSFN subframe configuration request is not limited to a normal base station, and a low-power local node may be used. A base station serving as a destination of an MBSFN subframe configuration request may be a base station having an MBSFN subframe configuration function. The base station broadcasts information representing that whether or not own cell has the MBSFN subframe configuration function as the system information. The base station to which an interference problem occurs may judge whether or not the cell has the MBSFN subframe configuration function by receiving system information of each cell in radio-wave environment measurement of a neighbor cell in own base station. The judgment may be added to the method of selecting a neighbor base station. Own base station does not perform measurement to receive system information, and a user equipment being served thereby may receive system information of each cell in radio-wave environment measurement of neighbor cells to acquire information representing whether or not each of the cells has the MBSFN subframe configuration function. The user equipment notifies a base station by which the user equipment is served of the information together with a report of measurement, and then the base station judges whether or not the neighbor base station has the MBSFN subframe configuration function. The user equipment may judge a base station having the MBSFN subframe configuration function on the basis of the information to notify the base station of a measurement report for an MBSFN subframe configuration request that is limited to the base station having the MBSFN subframe configuration function. The base station needs not to judge whether or not the base station has the MBSFN subframe configuration function, and an amount of information of signaling of a measurement report from a user equipment being served thereby or a signaling amount can be reduced.

Since the method disclosed in the embodiment is applied to make it possible to notify a base station that causes interference of an MBSFN subframe configuration request from a base station that is interfered, judgment of the MBSFN subframe configuration in the base station can be more dynamically executed. Thus, inter-cell downlink interference avoidance using the MBSFN subframe can be more dynamically realized.

In the base station that receives a request notification of the MBSFN subframe configuration, if an MBSFN subframe is configured in response to the request, a radio resource allocated to a user equipment being served by own cell may come short. Although the radio resource allocated to the user equipment being served by own cell come short, when the MBSFN subframe is configured, communication with the user equipment being served by own cell cannot be performed to make it impossible to provide a service. In order to solve the problem, a base station that receives the request notification of the MBSFN subframe configuration may judge that the MBSFN subframe is not configured to the request notification of the MBSFN subframe configuration and perform notification representing that MBSFN subframe configuration is rejected to the base station serving as a request source. In this manner, communication with the user equipment being served by own cell is secured to make it possible to provide a service.

The shortage of the radio resource may not be the shortage of a radio resource allocated to a user equipment being served by own cell but the shortage of the radio resource allocated to a user equipment that performs communication for a service having a high priority order or performs communication requiring high QoS. In this manner, the MBSFN subframe configuration can be more preferential than radio resource allocation to a user equipment having a low priority order or a low QoS, and interference to another cell can be reduced.

The base station to which interference occurs as a problem may perform notification of information related to a priority order of a service of a interfered user equipment being served thereby or information related to the QoS together with a request message of the MBSFN subframe configuration. The base station that receives a request notification of the MBSFN subframe configuration can judge whether or not the MBSFN subframe configuration is performed on the basis of the information.

As a specific example of an interface used to perform notification of rejection of the MBSFN subframe configuration, the methods disclosed in the specific examples (1) to (3) of the interface used for notification to a neighbor cell in the first modification of the first embodiment described above can be applied. The information representing that the MBSFN subframe configurations is rejected is included in a signaling message used on each interface or a signaling message to perform notification of the rejection is newly set to perform notification by using the interfaces.

The base station that receives a request notification of the MBSFN subframe configuration cannot recognize time until the base station serving as a request source requires the MBSFN subframe configuration. In this case, when the base station configures the MBSFN subframe on the basis of the configuration request of the MBSFN subframe, the base station cannot determine the time until the configuration of the MBSFN subframe need to be maintained. Even when the MBSFN subframe configuration is unnecessary in such a case where the user equipment that is interfered by the base station serving as a request source ends communication, the base station that receives the request consequently continues the MBSFN subframe configuration. This wastes resources to cause a reduction in capacity of a cell or a decrease in communication speed. In order to solve the problem, a base station that performs notification of a request of an MBSFN subframe configuration may perform notification representing that the request is ended.

The base station that performs notification of the request of the MBSFN subframe configuration judges whether or not the base station requests a neighbor base station of the MBSFN subframe configuration as above described. When the base station judges that the MBSFN subframe configuration is not requested, notification representing the request is ended is performed. The notification representing that the request is ended may be performed to the base station that performs notification of a request of an MBSFN subframe configuration. The base station that performs notification of a request of an MBSFN subframe configuration may judge whether or not a neighbor base station is requested of an MBSFN subframe configuration, regularly, periodically, or by using as a trigger a report of a measurement result from a user equipment being served thereby.

The base station that receives a request end notification of the MBSFN subframe configuration inactivates the MBSFN subframe configuration configured on the basis of the request end notification. More specifically, a subframe configured as an MBSFN subframe is configured to be used in normal uni-cast communication.

In this manner, the base station can improve efficiency of using a resource to make it possible to increase a capacity of a cell or increase a communication speed.

The base station that receives a request of an MBSFN subframe configuration or a notification representing that the request is ended may notify a base station serving as a request source that the request or the request end notification is received. Alternatively, notification representing that an MBSFN subframe is configured based on the request notification or notification representing that the MBSFN subframe configuration is inactivated on the basis of the request end notification may be performed. In this manner, the base station serving as the request source can clearly recognize a configuration state of an MBSFN subframe of a base station serving as a request destination and can correctly judge whether or not the base station serving as the request source performs notification of a request of an MBSFN subframe configuration or notification of a request end. For this reason, the system can be prevented from being erroneously operated, and a stable communication system can be provided.

In the above description, the base station that receives a request end notification of the MBSFN subframe configuration inactivates the MBSFN subframe configuration configured on the basis of the request end notification. Unless the base station that configures an MBSFN subframe receives the request end notification, the MBSFN subframe configuration cannot be inactivated. In this case, since resource allocation cannot be performed when communication with a user equipment being served by own cell is required to be preferentially performed, a problem that makes communication impossible is posed. In order to solve the problem, a base station that configures MBSFN subframe may determine to end the MBSFN subframe configuration. The base station that has determined to end the MBSFN subframe configuration inactivates the MBSFN subframe configuration. The base station that inactivates the MBSFN subframe configuration may notify a base station serving as a request source of the MBSFN subframe configuration that the MBSFN subframe configuration is inactivated.

As a judgment condition for inactivating the MBSFN subframe configuration, whether or not a radio resource allocated to a user equipment being served by own cell comes short may be used. The shortage of the radio resource, as described above, may not be the shortage of a radio resource allocated to a user equipment being served by own cell but the shortage of the radio resource allocated to a user equipment that performs communication for a service having a high priority order or performs communication requiring high QoS.

In this manner, the base station that configures the MBSFN subframe can allocate a resource when communication with a user equipment being served by own cell is required to be preferentially performed, and a service can be provided to the user equipment being served by own cell.

When the base station that receives the request notification of the MBSFN subframe configuration continuously uselessly configures the MBSFN subframe, a useless resource, consequently, a reduction in capacity of a cell or a decrease in communication speed is caused. Another method of solving the problem is disclosed. A period in which an MBSFN subframe is configured is limited. The base station inactivates the MBSFN subframe configuration a predetermined period after the MBSFN subframe is configured. The predetermined period may be used as a timer. The predetermined period may be statically determined in advance, semi-statically determined or dynamically determined.

When the predetermined period is statically determined, the predetermined period may be determined as a specification. The predetermined period can be recognized by all the base stations. Since signaling to notify the base station of the predetermined period is not required, an amount of signaling can be reduced.

When the predetermined period is semi-statically determined, the predetermined period may be determined by the MME. The MME may notify each of the base stations of the predetermined period. The MME may notify the base station of the predetermined period by the S1 message through the S1 interface. When the MME notifies the HeNB, the MME may perform notification in registration of the HeNB.

The predetermined period is semi-statically determined, the predetermined period may be determined by the base station. The base station broadcasts it as system information. A base station that requests an MBSFN subframe configuration must recognize an MBSFN subframe configuration period of the base station that configures the MBSFN subframe. As this method, a method in which the base station that requests the MBSFN subframe configuration receives system information to be broadcasted from a base station that causes interference, i.e., a base station serving as a request destination of the MBSFN subframe configuration or a method of receiving the system information from a user equipment being served by the base station that requests the MBSFN subframe configuration is used. In the method of receiving from the user equipment, the user equipment may receive the system information broadcasted from a base station that causes interference to acquire the predetermined period and notify a serving cell of the predetermined period together with a measurement report. In this manner, the predetermined period in which the MBSFN subframe is configured can be determined depending on a status of use of a radio resource of each base station.

When the predetermined period is dynamically determined, a base station that receives request notification of the MBSFN subframe configuration may perform the notification to a base station serving as a request source. As a response to the request notification of the MBSFN subframe configuration, the notification of the predetermined period may be performed. In this manner, the base station can determine the predetermined period in which the MBSFN subframe is configured depending on a status of use of the radio resource at a time when the base station receives the MBSFN subframe configuration request.

The base station that configures the MBSFN subframe inactivates the MBSFN subframe after the predetermined period has elapsed. However, in the predetermined period, when the MBSFN subframe configuration request is received, the MBSFN subframe may be configured in the predetermined period from the time. When the predetermined period is used as a timer, a base station that receives an MBSFN subframe configuration request starts the timer by using, as start time, time when the MBSFN subframe is configured. When the time for the timer runs out, the MBSFN subframe configuration is inactivated to reset the timer. When the MBSFN subframe configuration request is received before the time for the timer runs out, the timer may be restarted from the time.

The base station that performs notification of the MBSFN subframe configuration request may perform processing based on the predetermined period. For example, from time when the notification of the MBSFN subframe configuration request is performed or from time when a notification representing that the MBSFN subframe is configured based on the request notification is received, after the predetermined period has elapsed, a configuration request is performed if the configuration request is necessary again. The configuration request may be performed again before the predetermined period has elapsed. When the predetermined period is used as a timer, the timer may be started by using, as start time, time when the notification of the MBSFN subframe configuration request is performed or time when a notification representing that the MBSFN subframe is configured based on the request notification is received. When the time for the timer runs out, the timer is reset and a configuration request is performed if the configuration request is necessary again. The configuration request may be performed again before the time for the timer runs out. In this case, the timer may be restarted by using, as start time, time when notification of the configuration request is performed again or time when a notification representing that the MBSFN subframe is configured again based on the configuration request is received. When notification of an MBSFN subframe configuration request end is performed before the time for the timer runs out, the timer may be reset when the notification of the request end is performed or when notification representing that the MBSFN subframe configuration is inactivated on the basis of the request notification.

When the time management is performed as described above, even in the base station that performs notification of the MBSFN subframe configuration request or the base station that receives the MBSFN subframe configuration request, efficiency of using a resource can be improved, a capacity of each cell and a communication speed can be increased.

The method disclosed in the embodiment can also be applied to a case where an MME configures an MBSFN subframe (will be described later). Processing performed by a base station that configures an MBSFN subframe and signaling performed with a base station that configures an MBSFN subframe may be alternatively performed by the MME.

Sixth Embodiment

The embodiments and the modifications described above disclose the method of causing a base station to configure an MBSFN subframe. The MME may configure the MBSFN subframe without causing the base station to configure the MBSFN subframe. In other words, the MME may have a function of configuring an MBSFN subframe. The MME notifies one or a plurality of base stations of the MBSFN subframe configuration. A base station serving as a notification object may be a base station being served by another MME. In this case, notification of the MBSFN subframe configuration is performed through the other MME. The base station that receives the MBSFN subframe configuration configures an MBSFN subframe according to the MBSFN subframe configuration. All the base stations that receive the MBSFN subframe configuration need not configure MBSFN subframes according to the MBSFN subframe configuration. When the MBSFN subframe configuration is recognized, the MBSFN subframe may be used in other applications.

For example, when the MBSFN subframe is used to avoid downlink interference between cells, the MME notifies a normal eNB (macro cell) that gives interference and a low transmission power local node that receives interference of an MBSFN subframe configuration. A normal eNB (macro cell) that gives interference configures an MBSFN subframe, and a low transmission power local node that is interfered by the eNB uses the MBSFN subframe in uni-cast communication. The resource of the MBSFN subframe is scheduled for a user equipment to which interference occurs as a problem to make it possible to reduce inter-cell downlink interference.

The example described above shows the case where interference between the macro cell and the low transmission power local node occurs. However, the present invention can be similarly applied to not only the interference but also interference between normal base stations or interference between low-power local nodes. The inter-cell downlink interference can be avoided. In this manner, in place of the base station, the MME configures the MBSFN subframe to make it easy to configure the same MBSFN subframes in a plurality of base stations.

Each of the number of base stations that give interference and the number of base stations that are interfered may be one or more.

As a method of notifying a plurality of base stations of an MBSFN subframe configuration, a technique (conventional technique) that causes an MCE to configure an MBSFN subframe to notify the plurality of base stations of the MBSFN subframe is used.

However, in this case, the plurality of base stations serving as notification targets are all base stations that are present in one MBSFN area. Consequently, the MBSFN subframes are configured to all the base stations that are present in one MBSFN area managed by the MCE. Thus, when the MCE configures an MBSFN subframe for not only multi-cell transmission but also avoiding inter-cell downlink interference, regardless of a base station to which interference occurs as a problem, all the base stations that are present in the MBSFN area are notified of the MBSFN subframe configuration. This cause useless signaling. When interference avoidance is required to be performed with a base station that is not present in the MBSFN area, in order to prevent the base station that is not present in the MBSFN area is not notified of the MBSFN subframe configuration, and thus interference avoidance with the base station becomes impossible. Furthermore, the HeNB may not be connected to the MCE. In this case, when the MCE configures an MBSFN subframe, the HeNB cannot be directly notified of the MBSFN subframe configuration.

As a method of solving the problem, the MCE may notify the HeNB of the MBSFN subframe configuration through the MME. The MCE notifies the MME of the MBSFN subframe configuration by using the M3 interface, and the MME notifies the HeNB of the MBSFN subframe configuration by using the S1 interface. In this manner, the HeNB that does not have a direct interface with the MCE can be notified of the MBSFN subframe configured by the MCE.

However, according to the method, signaling the notification of which is temporarily performed through the MME increases.

When the method in which the MME configures an MBSFN subframe is used, the problems can be solved. More specifically, when the MME configures the MBSFN subframe, regardless of a base station in the MBSFN area, a base station to which interference occurs as a problem can be notified of the MBSFN subframe configuration. A base station that does not belong to the MBSFN area can also be notified of the MBSFN subframe configuration. Furthermore, the MCE needs not to notify the MME of the MBSFN subframe configuration, a signaling amount is not increased.

Thus, when a base station except for a base station belonging to one MBSFN area needs to be notified of an MBSFN subframe, the MME advantageously configures MBSFN subframe.

As described above, since a cell using the MBSFN subframe or a cell that performs notification of the MBSFN subframe configuration can be flexibly configured, the MBSFN subframe is advantageously used in another application except for multi-cell MBMS transmission.

As a method of selecting a neighbor cell that performs notification of an MBSFN subframe configured by the MME, a method of selecting a neighbor cell used when a base station configures an MBSFN subframe as described above can be applied.

As a method of adjusting an MBSFN subframe performed in the MCE and a method of configuring an MBSFN subframe performed in the MME, the methods disclosed in from the second modification of the first embodiment to the fifth modification of the first embodiment can be applied. In place of the eNB, the MME may be used. Notification between the MME and the MCE may be performed by using the M3 interface. In this manner, the MCE can adjust the MBSFN subframe (MCE) by using the MBSFN subframe information configured by the MME, and the MME can configure the MBSFN subframe by using information or the like of the priority order of the MBSFN subframes notified from the MCE.

As the MBSFN subframe configured by the MME, the methods disclosed in from the second embodiment to the second modification of the second embodiment may be applied. In this manner, the same effect as described above can be obtained.

When the MME configures the MBSFN subframe to a base station that does not belong to an MBSFN synchronization area, a base station that is not connected to the MCE or a base station that does not receive notification of the MBSFN subframe configuration from the MCE, the method disclosed in the third embodiment may be applied. The M3 interface may be used for the notification of the MBSFN subframe configuration from the MME to the MCE, and the S1 interface may be used for the notification of the MBSFN subframe configuration from the MME to the eNB. In this manner, the same effect as described above can be obtained.

When an MBSFN subframe is used to avoid downlink interference between the cells, a base station to which interference occurs as a problem may request the MME to configure an MBSFN subframes for avoiding downlink interference. The MME that receives the request configures an MBSFN subframe and notifies the neighbor base station of the MBSFN subframe configuration. The S1 interface may be used for the notification. The request is included in a signaling message used on the S1 interface, or a signaling message for the request is newly set to perform notification. In addition to the notification of the request, notification of an identifier (cell identifier) of a base station serving as a source of the request, a cell identifier of own cell, or a requested resource may be performed. Notification of combinations of the identifiers and the resource may be performed. As the identifier of the base station serving as a destination or a cell identifier of own cell, a CGI, a PCI or the like may be used. As a specific example of the requested resource, the number of MBSFN subframes may be used. An MME that receives notification of the requested resource can use the notification as information for judgment used when the number of MBSFN subframes is configured.

As a specific example of a judgment whether or not the base station requests a neighbor base station of the MBSFN subframe configuration and a method of selecting a neighbor base station, the above described same methods used when a base station to which interference occurs as a problem requests the neighbor base station of the MBSFN subframe configuration can be applied. The MME that receives the request from the base station to which interference occurs as a problem configures an MBSFN subframe for avoiding inter-cell downlink interference. The MME that configures the MBSFN subframe notifies neighbor cells of the configuration.

The MME may discriminate a base station that performs the MBSFN subframe configuration from a base station that performs only notification without performing the configuration. The base station that gives interference may perform an MBSFN subframe configuration, and the base station that receives interference may perform only the notification of the MBSFN subframe configuration.

Information representing whether or not the MBSFN subframe configuration is performed may be configured. The MME may notify the base station of the information. In this manner, the MME can discriminate a base station that causes the base station that performs a notification of an MBSFN subframe configuration to perform the MBSFN subframe configuration from other base stations.

For example, the information representing whether or not the MBSFN subframe configuration is performed is used as an indicator. For example, when 1-bit information is "1", the MBSFN subframe may be configured. When the 1-bit information is "0", the MBSFN subframe need not be configured. The base station that gives interference may be notified of an indicator set to "1", and the base station that receives interference may be notified of an indicator set to "0".

The base station that receives the MBSFN subframe configuration and information representing that MBSFN subframe configuration is performed from the MME configures an MBSFN subframe according to the MBSFN subframe configuration. The base station notifies the user equipment being served thereby of the configuration. The base station that receives an MBSFN subframe configuration and information representing that the MBSFN subframe configuration is not performed, on the basis of the MBSFN subframe configuration, schedules a resource of an MBSFN subframe for uni-cast communication to a user equipment to which interference occurs as a problem. As the user equipment to which interference from the base station occurs as a problem, a user equipment that performs notification of a measurement report representing that reception quality from the base station exceeds a predetermined threshold value may be used. In this manner, the interference from the base station can be avoided.

When a method disclosed in the embodiment is applied, inter-cell downlink avoidance using the MBSFN subframe by the MME can be more dynamically realized.

While the LTE system (E-UTRAN) and the LTE advanced (LTE-Advanced) have mainly been described in the present invention, the present invention is applicable to the W-CDMA system (UTRAN, UMTS).

The invention claimed is:
1. A mobile communication system comprising:
 at least one user equipment;
 a plurality of base stations that perform radio communication with the at least one user equipment; and
 a radio network controller that controls the plurality of base stations, wherein
 said radio network controller indicates a resource that is a radio resource for transmitting to said user equipment a reference signal less frequently than normal to said base stations, the reference signal being transmitted to measure power,
 a base station of the plurality of base stations designates, in addition to the resource indicated by said radio network controller, a resource that is a radio resource for transmitting said reference signal to said user equipment less frequently than normal,
 said base station transmits said reference signal to said user equipment less frequently than normal in the resource indicated by said radio network controller and the resource additionally designated by said base station itself, and said user equipment receives said reference signal from said base station less frequently than normal in the resource indicated by said radio network controller and the resource additionally designated by said base station.

2. A base station that performs radio communication with user equipment in response to a control by a radio network controller, wherein said radio network controller indicates a low-frequency resource that is a radio resource for transmitting to said user equipment a reference signal less frequently than normal to said base station, the reference signal being transmitted to measure power, the base station designates, in addition to the low-frequency resource indicated by said radio network controller, a low-frequency resource that is a radio resource for transmitting said reference signal to said user equipment less frequently than normal, and said base station transmits said reference signal to said user equipment less frequently than normal in the low-frequency resource indicated by said radio network controller and the low-frequency resource additionally designated by said base station itself.

3. The base station according to claim 2, wherein said base station notifies a neighbor base station of the low-frequency resource additionally designated by said base station itself.

4. The base station according to claim 2, wherein said base station notifies said radio network controller of the low-frequency resource additionally designated by said base station itself.

5. The base station according to claim 2, wherein said base station additionally designates the low-frequency resource in addition to the low-frequency resource indicated by said radio network controller depending on an operation state.

6. The base station according to claim 5, wherein, when said base station operates in an energy-saving mode having an operation power lower than a normal operation power, said base station additionally designates the low-frequency resource in addition to the low-frequency resource indicated by said radio network controller.

7. The base station according to claim 2, wherein said low-frequency resource is a subframe to transmit multimedia data of a radio frame.

8. A radio network controller that controls the plurality of base stations that perform radio communication with user equipment, wherein said radio network controller indicates a low-frequency resource that is a radio resource for transmitting to said user equipment a reference signal less frequently than normal to said base stations, the reference signal being transmitted to measure power, and said radio network controller changes the low-frequency resource indicated to said base station on the basis of a low-frequency resource additionally designated by said base station.

9. The radio network controller according to claim 8, wherein said low-frequency resource is a subframe to transmit multimedia data of a radio frame.

10. A user equipment that performs radio communication with a base station controlled by a radio network controller, wherein said user equipment receives a reference signal less frequently than normal in a resource indicated by said radio network controller and a resource additionally designated by said base station, the reference signal being received to measure power, said user equipment performs a reception Dower measurement to determine a reception quality of signals from the base stations, the user equipment determines whether to connect to the base station based on the reception quality determined, and the user equipment connects to the base station based on a result of the determination of reception quality, wherein the resource indicated by said radio network controller is changed to another resource based on the additionally designated resource by the base station, and the changed resource is indicated to the user equipment.

* * * * *